US012621106B2

(12) United States Patent
Khoshkholgh Dashtaki et al.

(10) Patent No.: US 12,621,106 B2
(45) Date of Patent: May 5, 2026

(54) SOUNDING REFERENCE SIGNAL TRANSMISSION AND RECEPTION IN NON-TERRESTRIAL NETWORKS

(71) Applicant: Ofinno, LLC, Reston, VA (US)

(72) Inventors: Mohammad Ghadir Khoshkholgh Dashtaki, Reston, VA (US); Ali Cagatay Cirik, Chantilly, VA (US); Esmael Hejazi Dinan, McLean, VA (US); Hua Zhou, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 19/082,362

(22) Filed: Mar. 18, 2025

(65) Prior Publication Data

US 2025/0247191 A1     Jul. 31, 2025

Related U.S. Application Data

(63) Continuation of application No. PCT/US2023/033507, filed on Sep. 22, 2023.
(Continued)

(51) Int. Cl.
*H04L 5/00*          (2006.01)
*H04W 56/00*         (2009.01)

(52) U.S. Cl.
CPC ....... *H04L 5/0051* (2013.01); *H04W 56/0045* (2013.01)

(58) Field of Classification Search
CPC .......................... H04L 5/0051; H04W 56/0045
(Continued)

(56)                References Cited

U.S. PATENT DOCUMENTS

| | | | |
|---|---|---|---|
| 11,096,129 B2 | 8/2021 | Wigard et al. | |
| 2021/0068065 A1 | 3/2021 | Wigard et al. | |

(Continued)

FOREIGN PATENT DOCUMENTS

| | | |
|---|---|---|
| EP | 4 329 389 A1 | 2/2024 |
| WO | 2021/164579 A1 | 8/2021 |

(Continued)

OTHER PUBLICATIONS

3GPP TS 38.211 V17.2.0 (Jun. 2022); Technical Specification; 3rd Generation Partnership Project; Technical Specification Group Radio Access Network; NR; Physical channels and modulation; (Release 17).
(Continued)

*Primary Examiner* — Chi Tang P Cheng

(74) *Attorney, Agent, or Firm* — Peter Flanagan; Kavon Nasabzadeh; Jacob L. Mangan

(57)                ABSTRACT

A method can include receiving, by a wireless device, a first message that includes one or more first non-terrestrial network (NTN) configuration parameters corresponding to a first NTN node of a cell; one or more second NTN configuration parameters corresponding to a second NTN node of the cell; and two or more NTN configurations parameters of NTN neighbor cells. The method can also include receiving a second message comprising configurations parameters of at least one sounding reference signal (SRS) resource of the cell. The method can further include transmitting, via the first NTN node and the at least one SRS resource of the cell, a first SRS transmission based on a first timing advance (TA) value of the wireless device. The first TA value can be determined based on the one or more first NTN configuration parameters.

20 Claims, 24 Drawing Sheets

Related U.S. Application Data

(60) Provisional application No. 63/409,468, filed on Sep. 23, 2022.

(58) Field of Classification Search
   USPC .......................................................... 370/329
   See application file for complete search history.

(56) References Cited

U.S. PATENT DOCUMENTS

| | | | |
|---|---|---|---|
| 2021/0274414 A1 | 9/2021 | Maattanen et al. | |
| 2021/0377825 A1 | 12/2021 | Deenoo et al. | |
| 2022/0046504 A1 | 2/2022 | Shrestha et al. | |
| 2022/0232503 A1 | 7/2022 | Cheng et al. | |
| 2023/0049008 A1* | 2/2023 | Nishio .............. | H04W 56/0045 |
| 2023/0136011 A1* | 5/2023 | Ly ........................ | H04B 7/0695 |
| | | | 370/329 |
| 2023/0199685 A1* | 6/2023 | Ghanbarinejad . | H04W 72/0446 |
| | | | 370/329 |
| 2023/0254851 A1 | 8/2023 | Prasad et al. | |
| 2023/0269685 A1 | 8/2023 | Park et al. | |
| 2023/0397060 A1 | 12/2023 | Rune et al. | |
| 2024/0031960 A1 | 1/2024 | Wu | |
| 2024/0056176 A1* | 2/2024 | Kim ................... | H04B 7/18539 |
| 2024/0204866 A1 | 6/2024 | Ciochina et al. | |
| 2025/0048291 A1* | 2/2025 | Shin .................. | H04W 56/0045 |

FOREIGN PATENT DOCUMENTS

| | | |
|---|---|---|
| WO | 2023/173935 A1 | 9/2023 |
| WO | 2024/211462 A1 | 10/2024 |

OTHER PUBLICATIONS

3GPP TS 38.212 V17.2.0 (Jun. 2022); Technical Specification; 3rd Generation Partnership Project; Technical Specification Group Radio Access Network; NR; Multiplexing and channel coding; (Release 17).

3GPP TS 38.213 V17.2.0 (Jun. 2022); Technical Specification; 3rd Generation Partnership Project; Technical Specification Group Radio Access Network; NR; Physical layer procedures for control (Release 17).

3GPP TS 38.214 V17.2.0 (Jun. 2022); Technical Specification; 3rd Generation Partnership Project; Technical Specification Group Radio Access Network; NR; Physical layer procedures for data; (Release 17).

3GPP TS 38.300 V17.1.0 (Jun. 2022); Technical Specification; 3rd Generation Partnership Project; Technical Specification Group Radio Access Network; NR; NR and NG-RAN Overall Description; Stage 2; (Release 17).

3GPP TS 38.306 V17.0.0 (Mar. 2022); Technical Specification; 3rd Generation Partnership Project; Technical Specification Group Radio Access Network; NR; User Equipment (UE) radio access capabilities; (Release 17).

3GPP TS 38.321 V17.1.0 (Jun. 2022); Technical Specification; 3rd Generation Partnership Project; Technical Specification Group Radio Access Network; NR; Medium Access Control (MAC) protocol specification; (Release 17).

3GPP TS 38.331 V17.1.0 (Jun. 2022); Technical Specification; 3rd Generation Partnership Project; Technical Specification Group Radio Access Network; NR; Radio Resource Control (RRC) protocol specification; (Release 17).

R1-1803571; 3GPP TSG RAN WG1 Meeting #92bis; Sanya, China, Apr. 16-20, 2018; Source: MCC Support; Title: Final Report of 3GPP TSG RAN WG1 #92 v1.0.0 (Athens, Greece, Feb. 26-Mar. 2, 2018); Document for: Approval.

R1-1800237; 3GPP TSG RAN WG1 Meeting AH 1801; Vancouver, Canada, Jan. 22-26, 2018; Source: CATT; Title: Remaining issues on codebook based UL transmission; Agenda Item: 7.2.1.2; Document for: Discussion and Decision.

R1-1801041; 3GPP TSG RAN WG1 Meeting AH 1801; Vancouver, Canada, Jan. 22-26, 2018; Source: Intel Corporation; Title: Summary on Codebook Based UL Transmission; Agenda item: 7.2.1.2; Document for: Discussion.

R1-1801716; 3GPP TSG RAN WG1 Meeting #92; Athens, Greece, Feb. 26-Mar. 2, 2018; Source: CATT; Title: Remaining issues on codebook based UL transmission; Agenda Item: 7.1.2.1.2; Document for: Discussion and Decision.

R1-1802095; 3GPP TSG RAN WG1 Meeting #92; Athens, Greece, Feb. 26-Mar. 2, 2018; Source: OPPO; Title: Remaining issues on codebook based UL transmission; Agenda Item: 7.1.2.1.2; Document for: Discussion and Decision.

R1-1802553; 3GPP TSG-RAN WG1 Meeting #92; Athens, Greece, Feb. 26-Mar. 2, 2018; Agenda item: 7.1.2.1.2; Source: Nokia, Nokia Shanghai Bell; Title: Remaining issues on UL codebook based transmission; Document for: Discussion and Decision.

R1-1802818; 3GPP TSG RAN WG1 Meeting #92; Feb. 26-Mar. 2, 2018; Athens, Greece; Agenda item: 7.2.1.2.2; Source: Qualcomm Incorporated; Title: Maintenance for Codebook Based UL Transmission; Document for: Discussion/Decision.

R1-1802818; 3GPP TSG RAN WG1 Meeting #92; Feb. 26-Mar. 2, 2018; Athens, Greece; Agenda item: 7.1.2.1.2; Source: Qualcomm Incorporated; Title: Maintenance for Codebook Based UL Transmission; Document for: Discussion/Decision.

R1-1803321; 3GPP TSG RAN WG1 Meeting #92; Athens, Greece, Feb. 26-Mar. 2, 2018; Source: Intel Corporation; Title: Offline Discussion Summary on Codebook Based UL Transmission; Agenda item: 7.1.2.1.2; Document for: Discussion.

R2-2207628; 3GPP TSG-RAN WG2 Meeting #119 electronic; Online, Aug. 2022; Source: vivo; Title: Remaining issue on UL synchronization in NR NTN; Agenda Item: 6.10.2.1; Document for: Discussion and Decision.

R2-2208560; 3GPP TSG-RAN WG2 Meeting #119 Electronic; Elbonia, Aug. 17-26, 2022; Agenda item: 6.10.2.1; Source: Nokia, Nokia Shanghai Bell; Title: On issues for Timing Advance Report MAC CE; WID/SID: NR_NTN_solutions-Core—Release 17; Document for: Discussion and Decision.

R2-2208561; 3GPP TSG-RAN WG2 Meeting #119 Electronic; Elbonia, Aug. 17-26, 2022; Agenda item: 6.10.2.2; Source: Nokia, Nokia Shanghai Bell; Title: On Msg3 blind retransmission and UE behaviour upon validity timer expiry; WID/SID: NR_NTN_solutions-Core—Release 17; Document for: Discussion and Decision.

International Search Report and Written Opinion of the International Searching Authority mailed Apr. 8, 2024, in International Application No. PCT/US2023/033507.

R1-2207631; 3GPP TSG RAN WG1 Meeting #110; Toulouse, France, Aug. 22-26, 2022; Agenda Item: 9.12.2; Source: Moderator (Thales); Title: FL Summary #4: Network verified UE location for NR NTN; Document for: Discussion.

3GPP TS 38.211 V17.3.0 (Sep. 2022); Technical Specification; 3rd Generation Partnership Project; Technical Specification Group Radio Access Network; NR; Physical channels and modulation; (Release 17).

W. Liu, X. Hou, J. Wang, L. Chen and S. Yoshioka, "Uplink Time Synchronization Method and Procedure in Release-17 NR NTN," 2022 IEEE 95th Vehicular Technology Conference: (VTC2022—Spring), Helsinki, Finland, 2022, pp. 1-5.

3GPP TR 38.821 V16.0.0 (Dec. 2019); Technical Report; 3rd Generation Partnership Project; Technical Specification Group Radio Access Network; Solutions for NR to support non-terrestrial networks (NTN); (Release 16).

3GPP TS 38.214 V17.3.0 (Sep. 2022); Technical Specification; 3rd Generation Partnership Project; Technical Specification Group Radio Access Network; NR; Physical layer procedures for data; (Release 17).

European Office Action mailed Jan. 26, 2026 in EP Patent Application No. 23790466.9.

* cited by examiner

IP Packets

QoS Flows

SDAP
215/225

QoS Flow Handling

Radio Bearers

PDCP
214/224

| Header Comp., Ciphering | Header Comp., Ciphering |

| Reordering, Retransmission | Reordering, Retransmission |

RLC Channels

RLC
213/223

| Segmentation, ARQ | Segmentation, ARQ |

Logical Channels

Multiplexing

MAC
212/222

HARQ

Transport Channel

PHY
211/221

Coding, Resource Mapping

FIG. 6

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

| DCI format | Usage |
|---|---|
| 0_0 | Scheduling of PUSCH in one cell |
| 0_1 | Scheduling of one or multiple PUSCH in one cell, or indicating CG-DFI for configured grant PUSCH |
| 0_2 | Scheduling of PUSCH in one cell |
| 1_0 | Scheduling of PDSCH in one cell |
| 1_1 | Scheduling of PDSCH in one cell, and/or triggering one shot HARQ-ACK codebook feedback |
| 1_2 | Scheduling of PDSCH in one cell |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |
| 2_4 | Notifying a group of UEs of the PRB(s) and OFDM symbol(s) where UE cancels the corresponding UL transmission from the UE |
| 2_5 | Notifying the availability of soft resources |
| 2_6 | Notifying the power saving information outside DRX Active Time for one or more UEs |
| 3_0 | Scheduling of NR sidelink in one cell |
| 3_1 | Scheduling of LTE sidelink in one cell |

FIG. 17

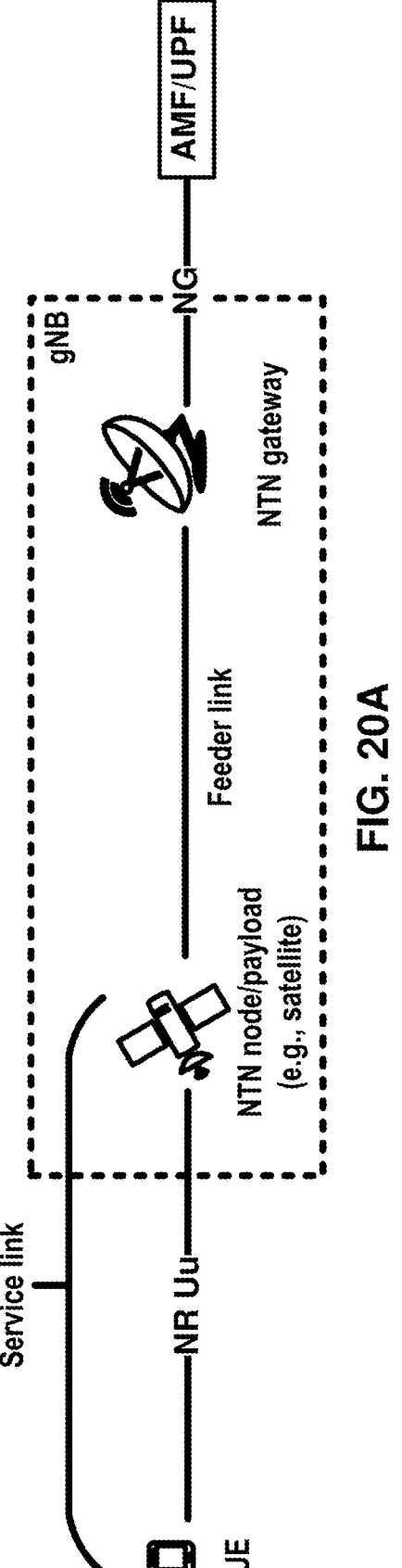

FIG. 20A

Types of NTN platforms/nodes/payloads

| NTN Platforms | Altitude range | Orbit | Typical beam footprint size |
|---|---|---|---|
| LEO satellite | 300 – 1500 km | Circular around the earth | 100 – 1000 km |
| MEO satellite | 7000 – 25000 km | | 100 – 1000 km |
| GEO satellite | 35,786 km | Notional station keeping position fixed in terms of elevation/azimuth with respect to a given earth point | 200 – 3500 km |
| UAS platform | 8-50 km (20km for HAPS) | | 5 – 200 km |
| HEO platform | 400 – 50000km | Elliptical around the earth | 200 – 3500 km |

FIG. 20B

| Class of Orbit | Elevation angle (degrees) | | |
|---|---|---|---|
| Altitude (km) | 0 | 10 | 90 |
| LEO satellite | Propagation delay  – satellite to UE (ms) | | |
| 800 | 11.0 | 7.9 | 2.7 |
| 1400 | 14.8 | 11.6 | 4.7 |
| MEO satellite | Propagation delay  – satellite to UE (ms) | | |
| 8000 | 43.0 | 39.4 | 26.7 |
| GEO satellite | Propagation delay  – satellite to UE (ms) | | |
| 35,786 | 138.9 | 135.3 | 119.3 |

SOUNDING REFERENCE SIGNAL TRANSMISSION AND RECEPTION IN NON-TERRESTRIAL NETWORKS

CROSS REFERENCE TO RELATED APPLICATIONS

This application is a continuation of International Application No. PCT/US2023/033507, filed Sep. 22, 2023, which claims the benefit of U.S. Provisional Application No. 63/409,468, filed Sep. 23, 2022, all of which are hereby incorporated by reference in their entireties.

BRIEF DESCRIPTION OF THE DRAWINGS

Examples of several of the various embodiments of the present disclosure are described herein with reference to the drawings.

FIG. 6 is an example diagram showing RRC state transitions of a UE.

FIG. 17 shows several DCI formats.

FIG. 20A shows an example of a non-terrestrial network.

FIG. 20B is an example figure of different types of NTN platforms.

DETAILED DESCRIPTION

Figures 1A, 1B:
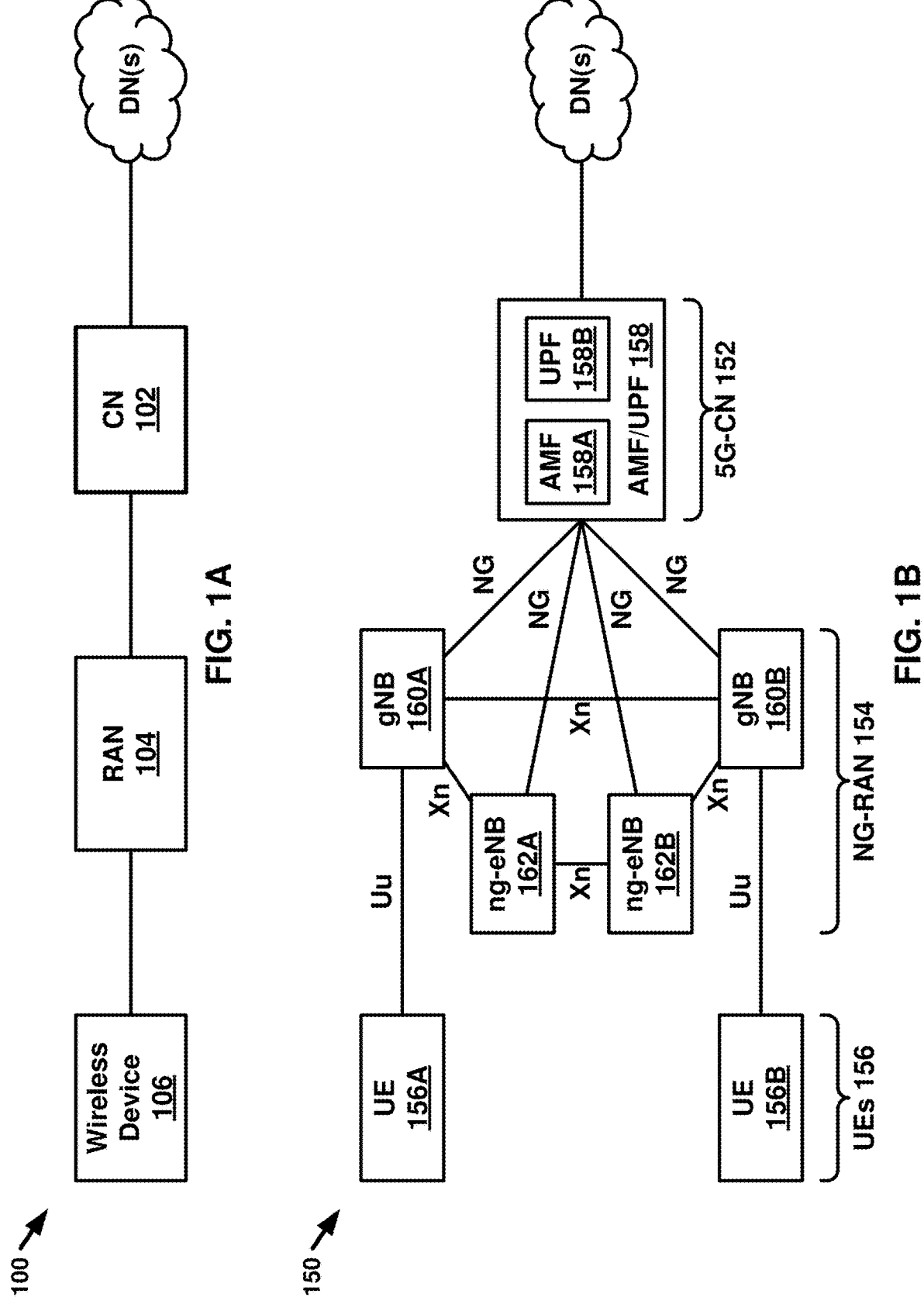
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that affect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle roadside unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, Wi-Fi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QOS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
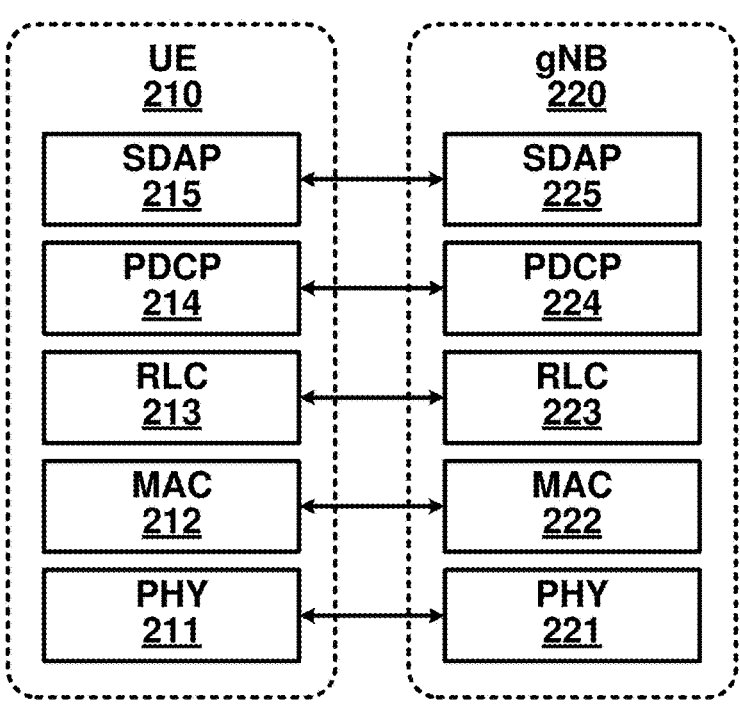
FIG. 2A and FIG. 2B respectively illustrate a New Radio (NR) user plane and control plane protocol stack.
Figure 2B:
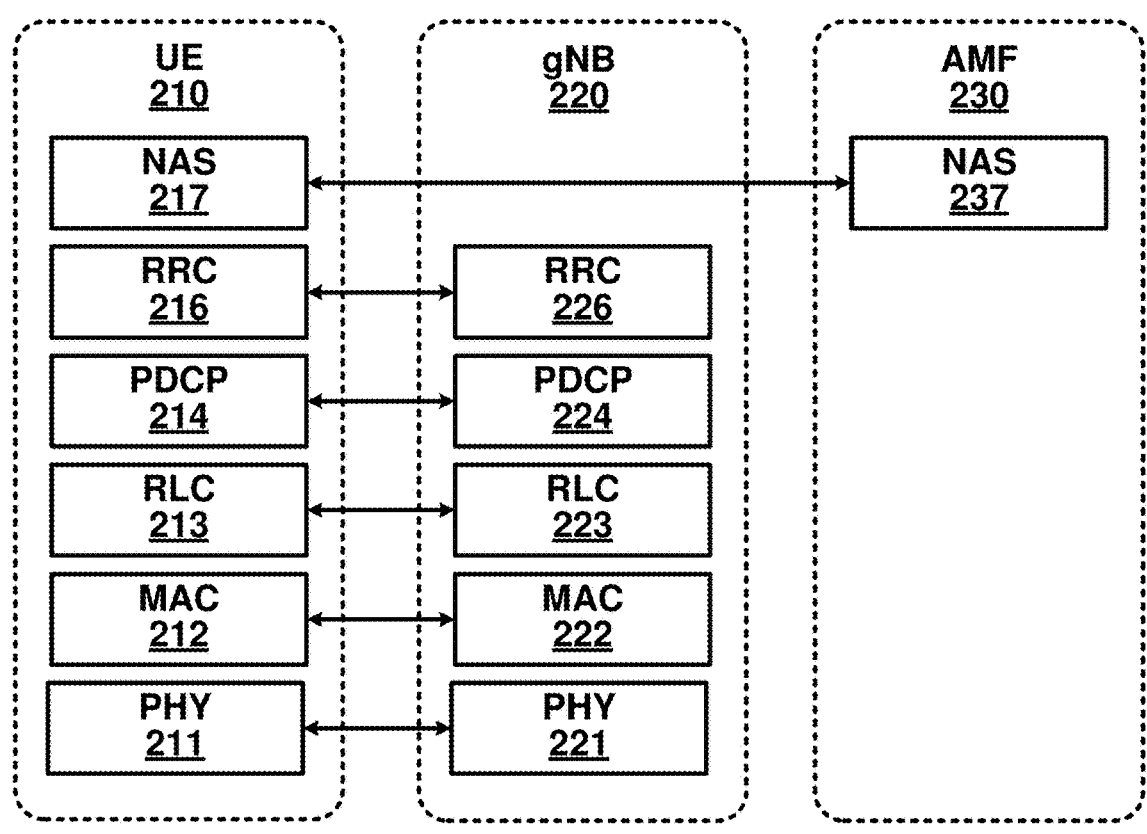

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
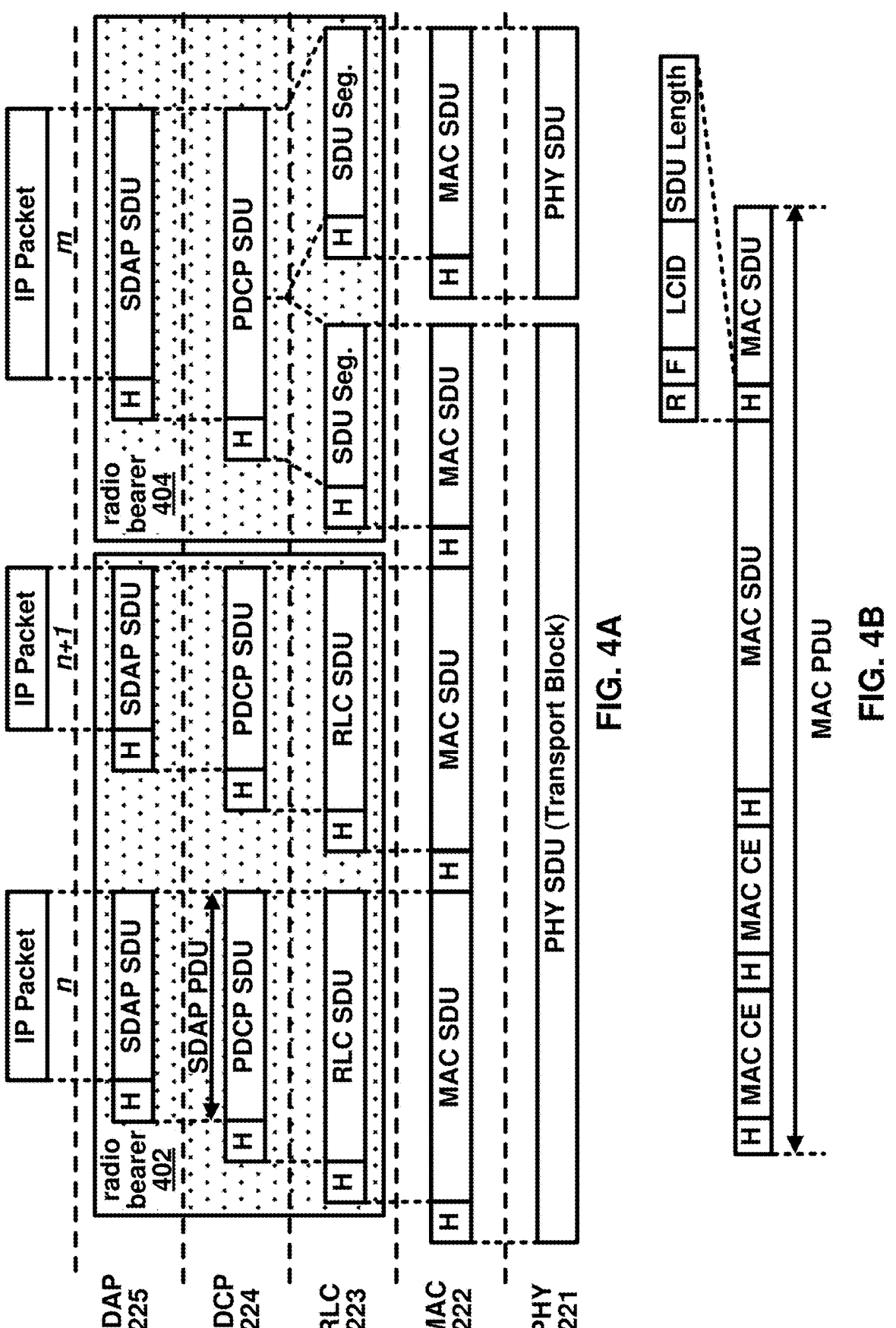
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A.

In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
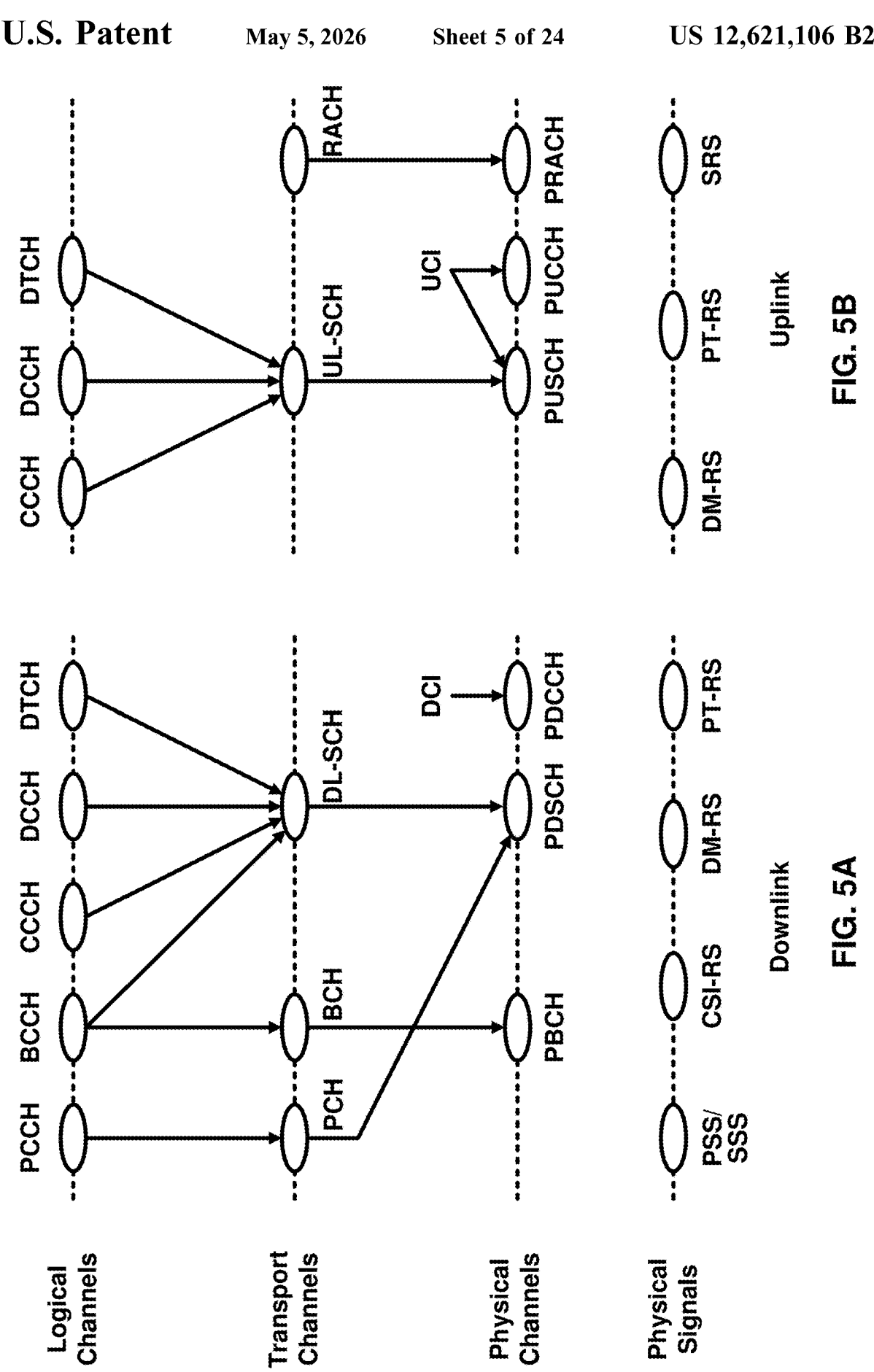
FIG. 5A and FIG. 5B respectively illustrate a mapping between logical channels, transport channels, and physical channels for the downlink and uplink.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not-known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
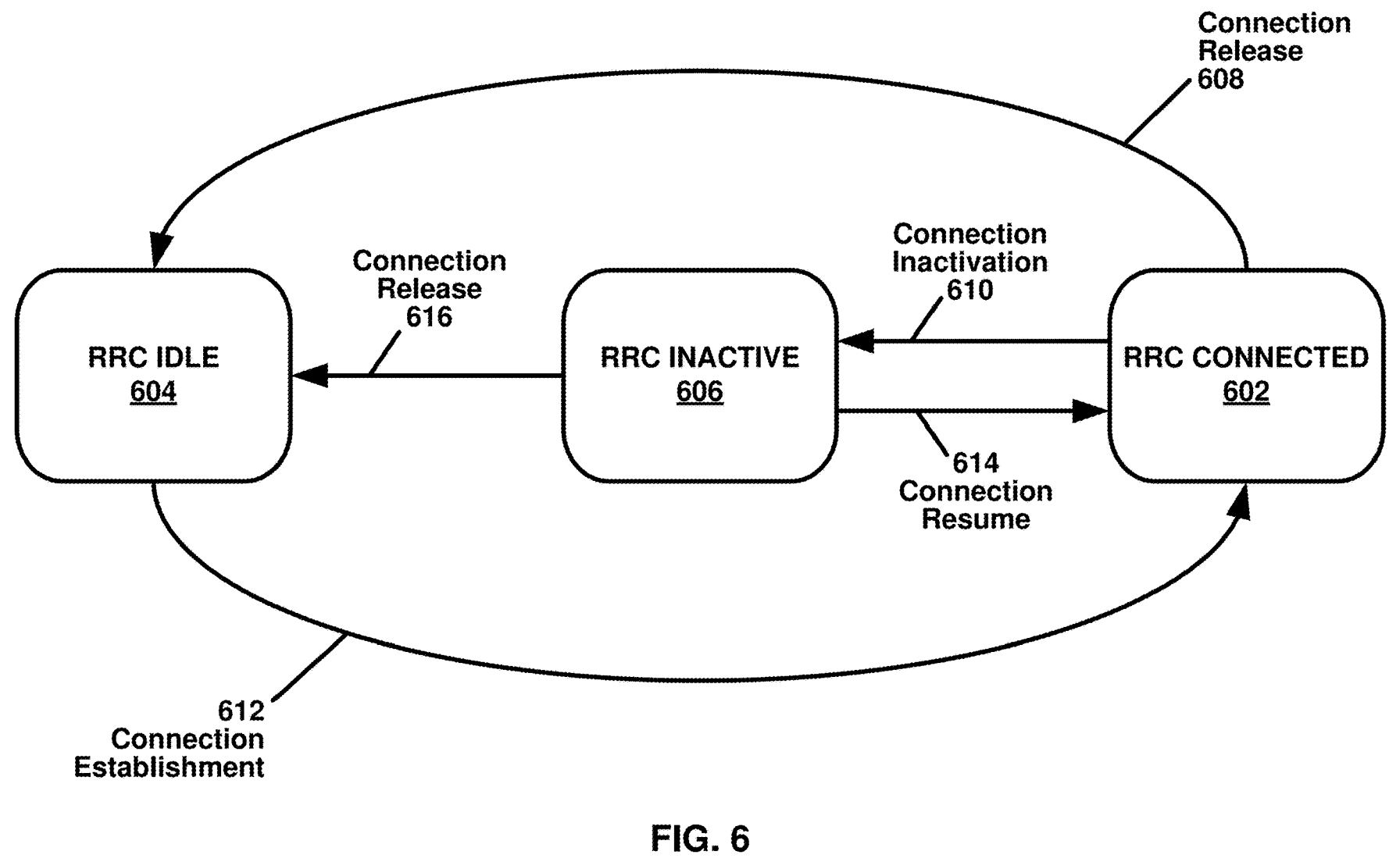

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
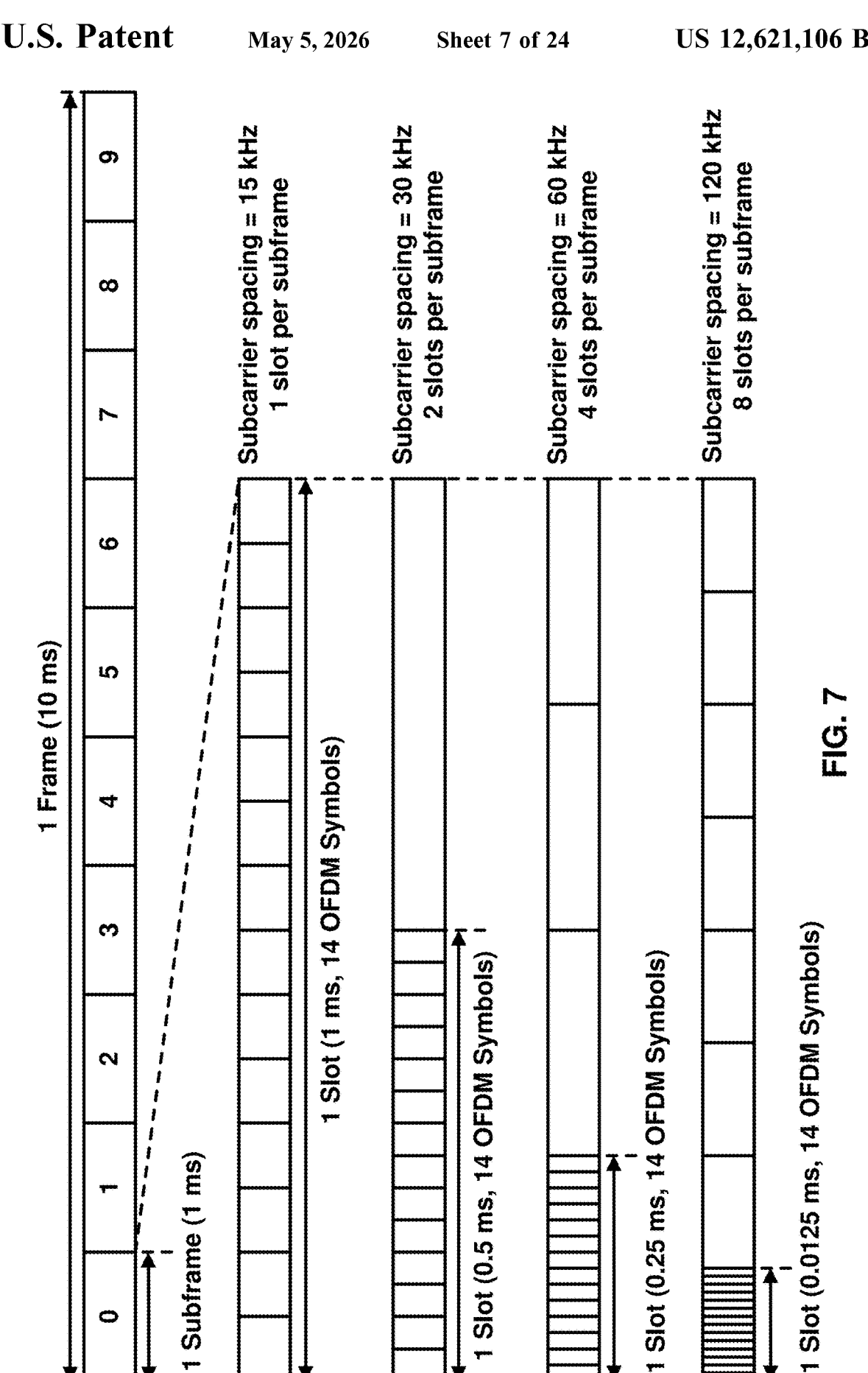
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 μs. For example, NR defines numerologies with the following subcarrier spacing/cyclic prefix duration combinations: 15 KHz/4.7 μs; 30 KHz/2.3 μs; 60 KHz/1.2 μs; 120 KHz/0.59 μs; and 240 KHz/0.29 μs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 KHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
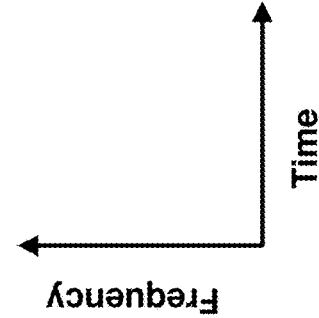
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORE-SETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
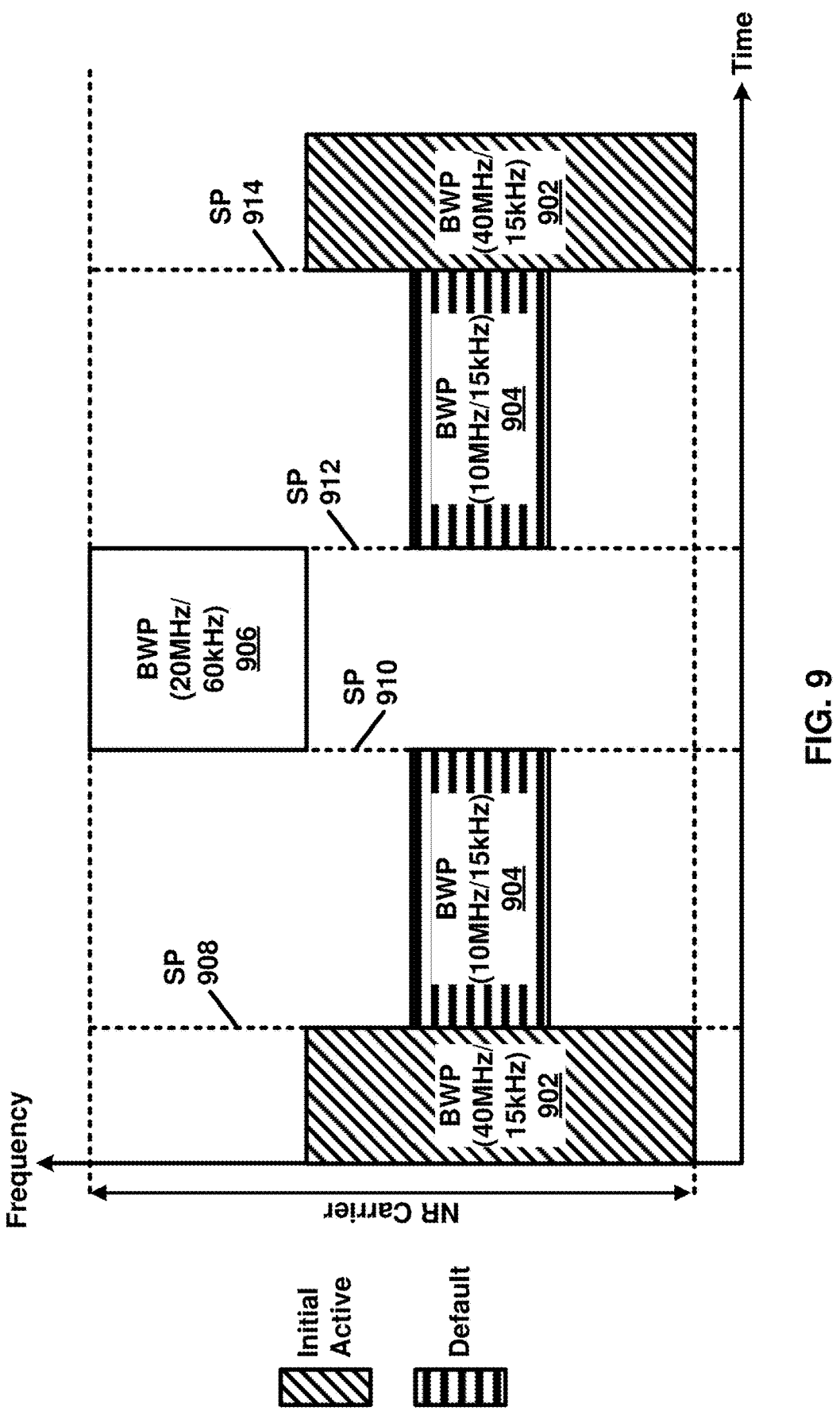
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 KHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response to receiving a DCI indicating BWP 906 as the active BWP. The UE may switch at a switching point 912 from active BWP 906 to BWP 904 in response to an expiry of a BWP inactivity timer and/or in response to receiving a DCI indicating BWP 904 as the active BWP. The UE may switch at a switching point 914 from active BWP 904 to BWP 902 in response to receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
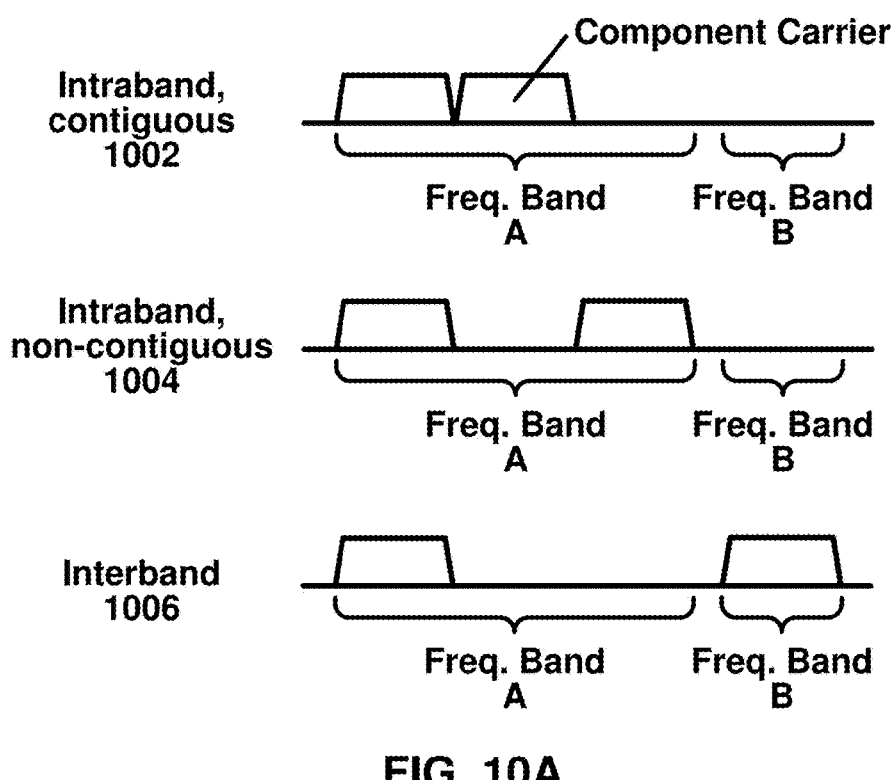
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
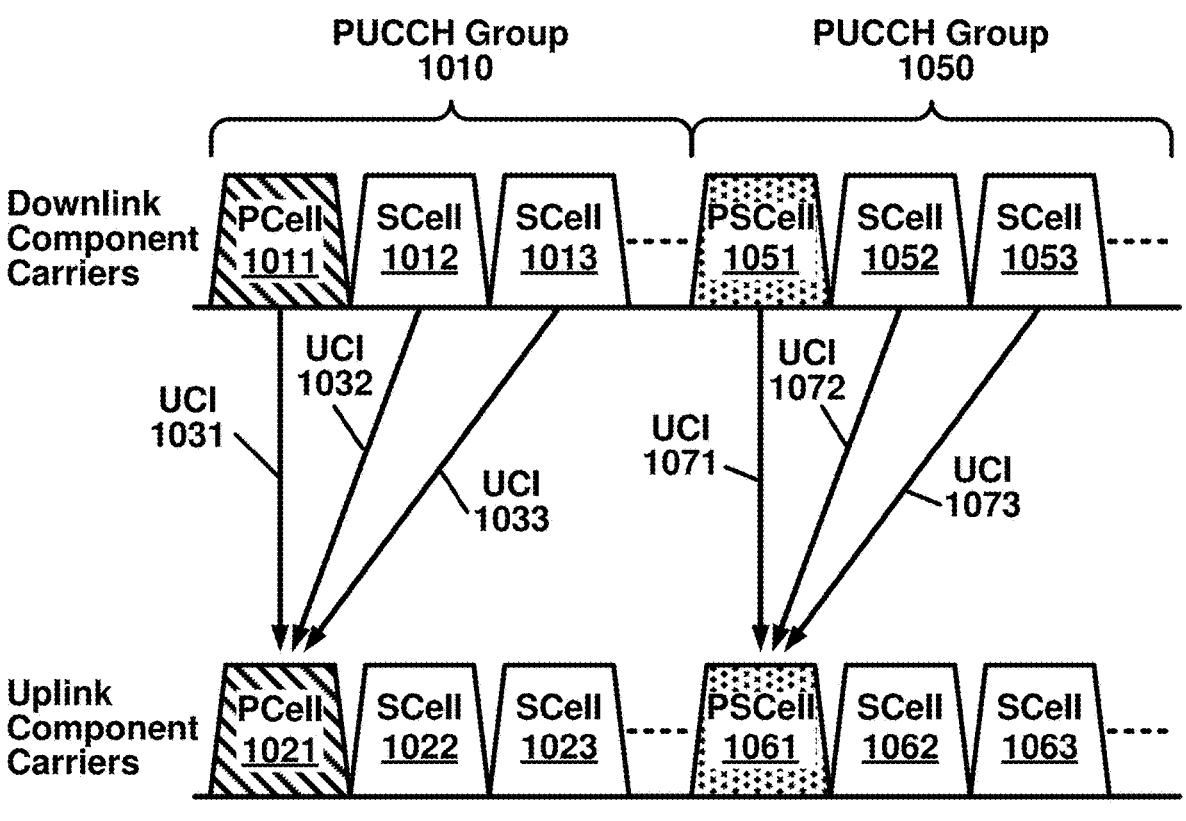
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary SCell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
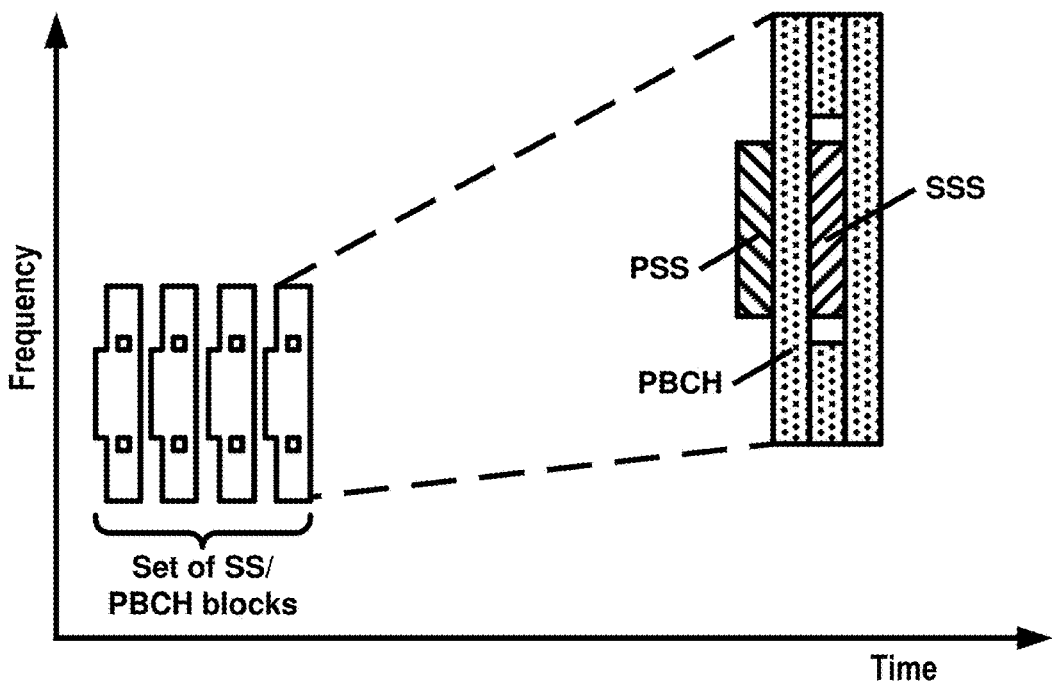
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in an SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
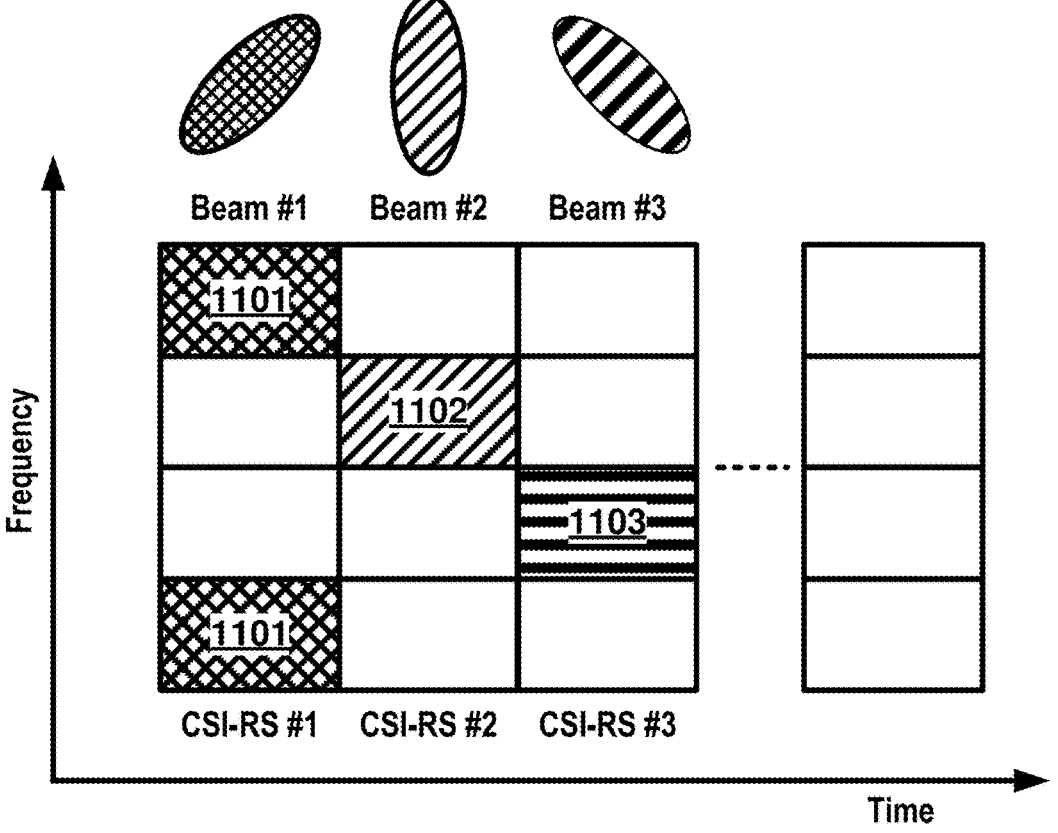
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figures 12A, 12B:
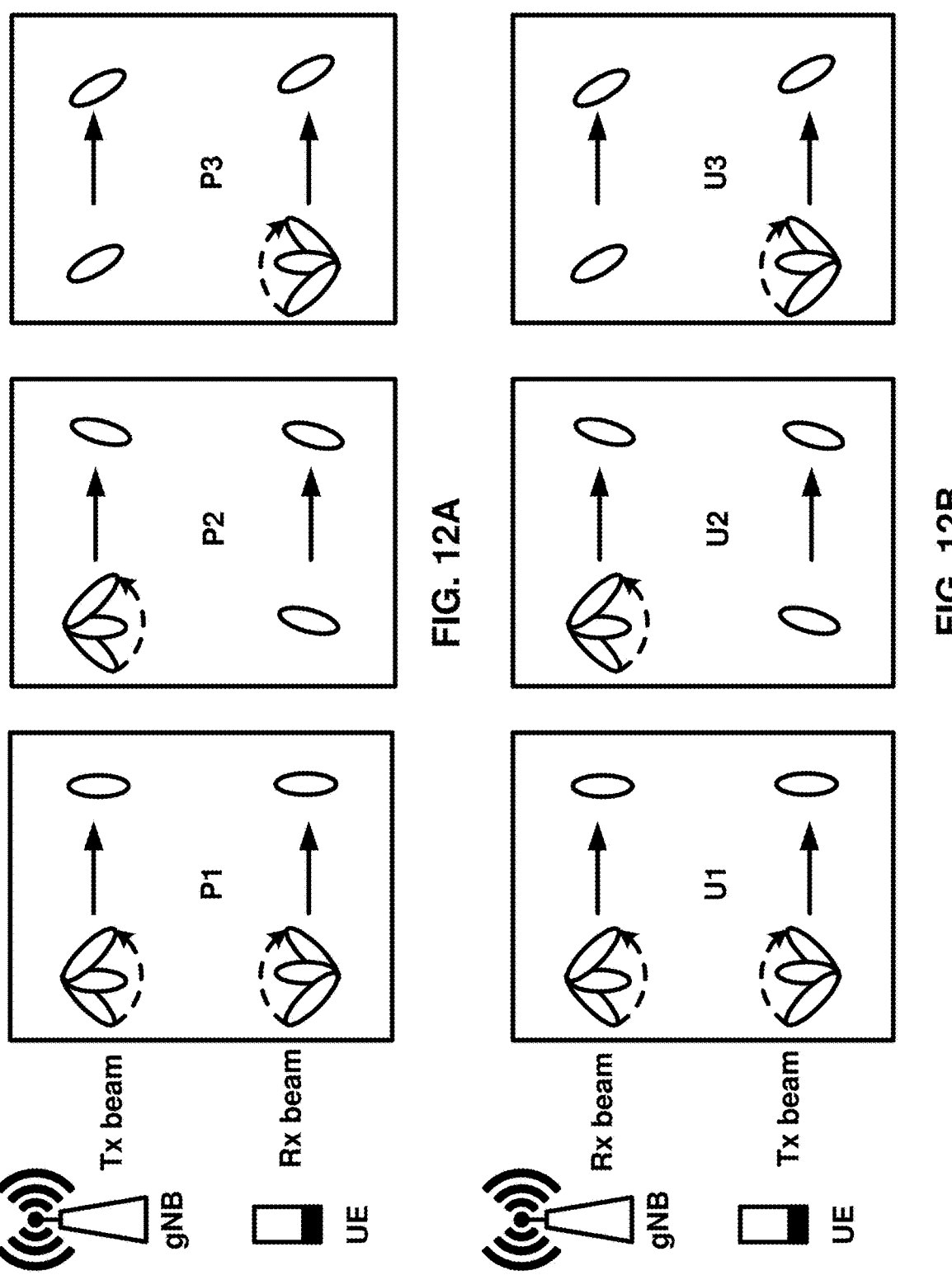
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counterclockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counterclockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement. The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiation of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figures 13A, 13B, 13C:
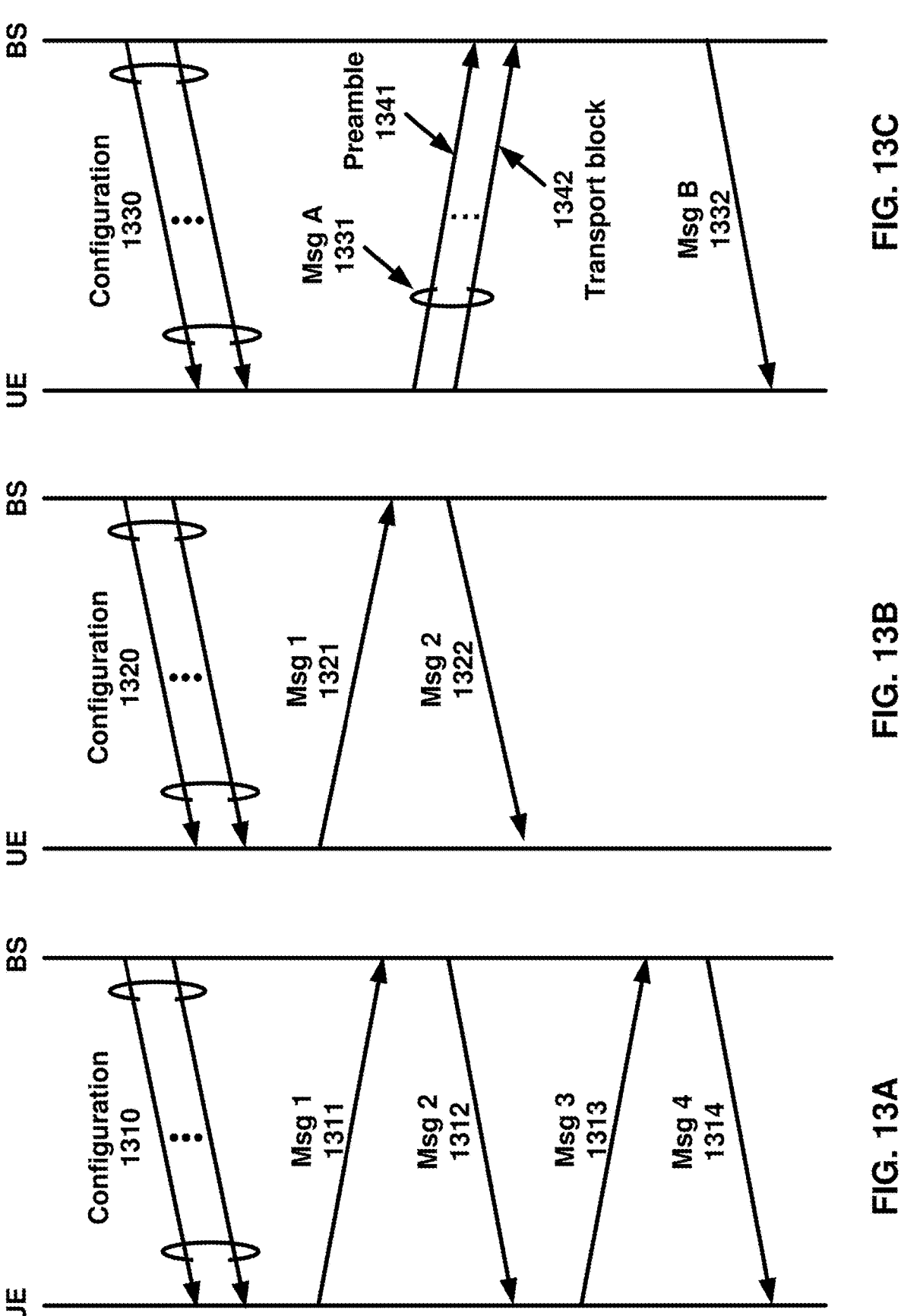
FIG. 13A, FIG. 13B, and FIG. 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preamble TransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI =$$
$$1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \le s\_id < 14$), t_id may be an index of a first slot of the PRACH occasion in a system frame (e.g., $0 \le t\_id < 80$), f_id may be an index of the PRACH occasion in the frequency domain (e.g., $0 \le f\_id < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message

1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
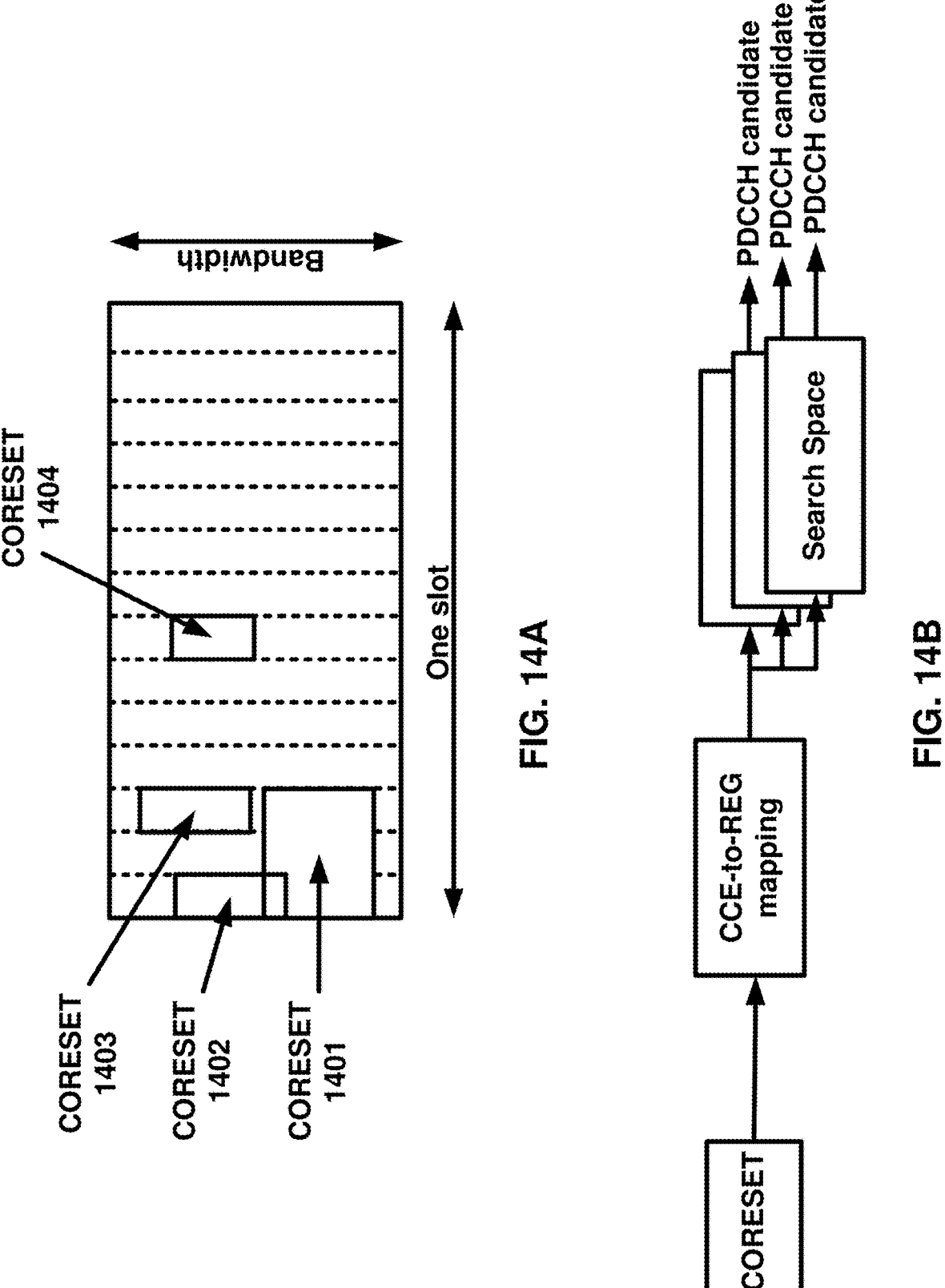
FIG. 14A illustrates an example of CORESET configurations for a bandwidth part.
FIG. 14B illustrates an example of a CCE-to-REG mapping for DCI transmission on a CORESET and PDCCH processing.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
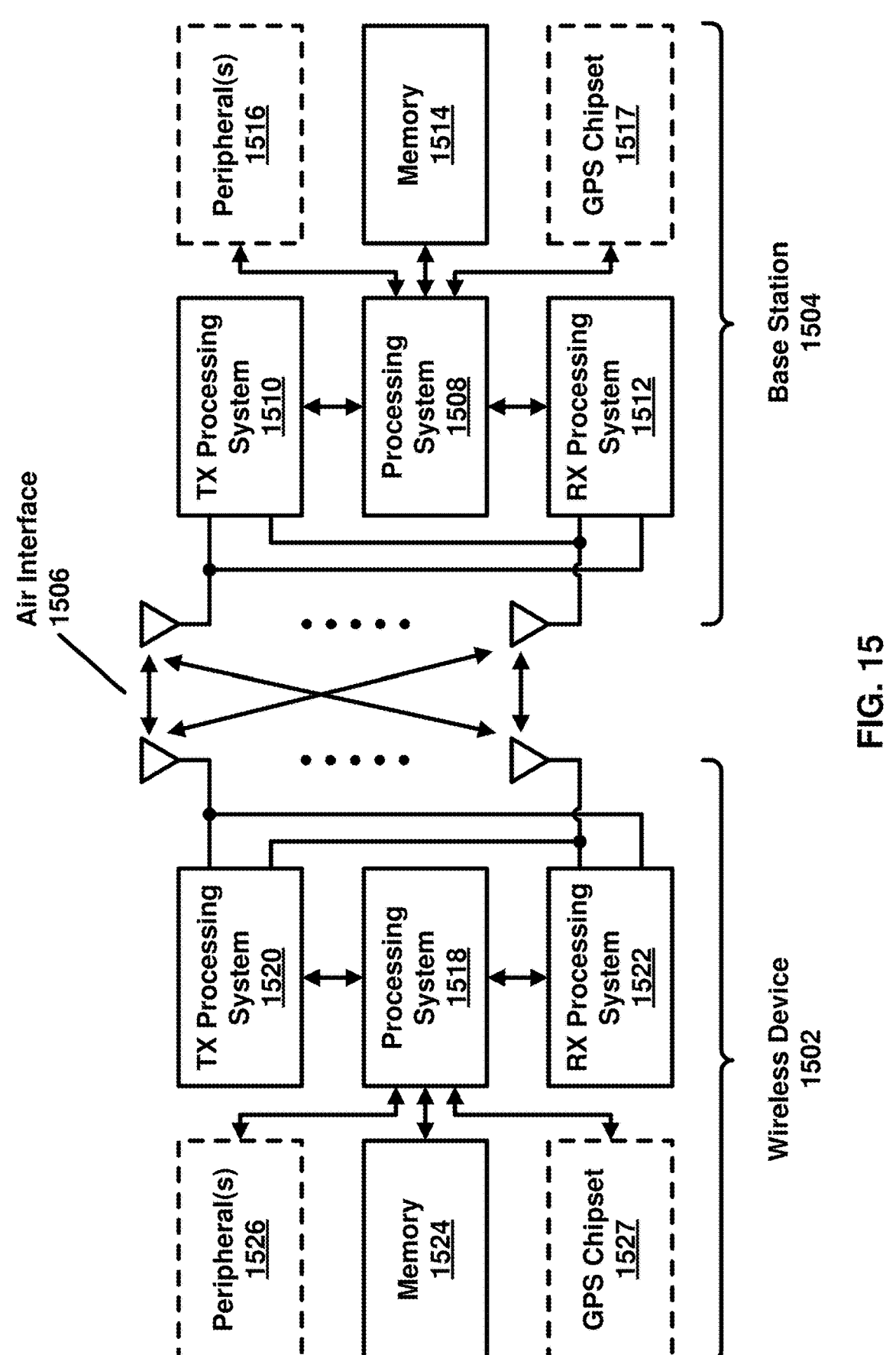
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
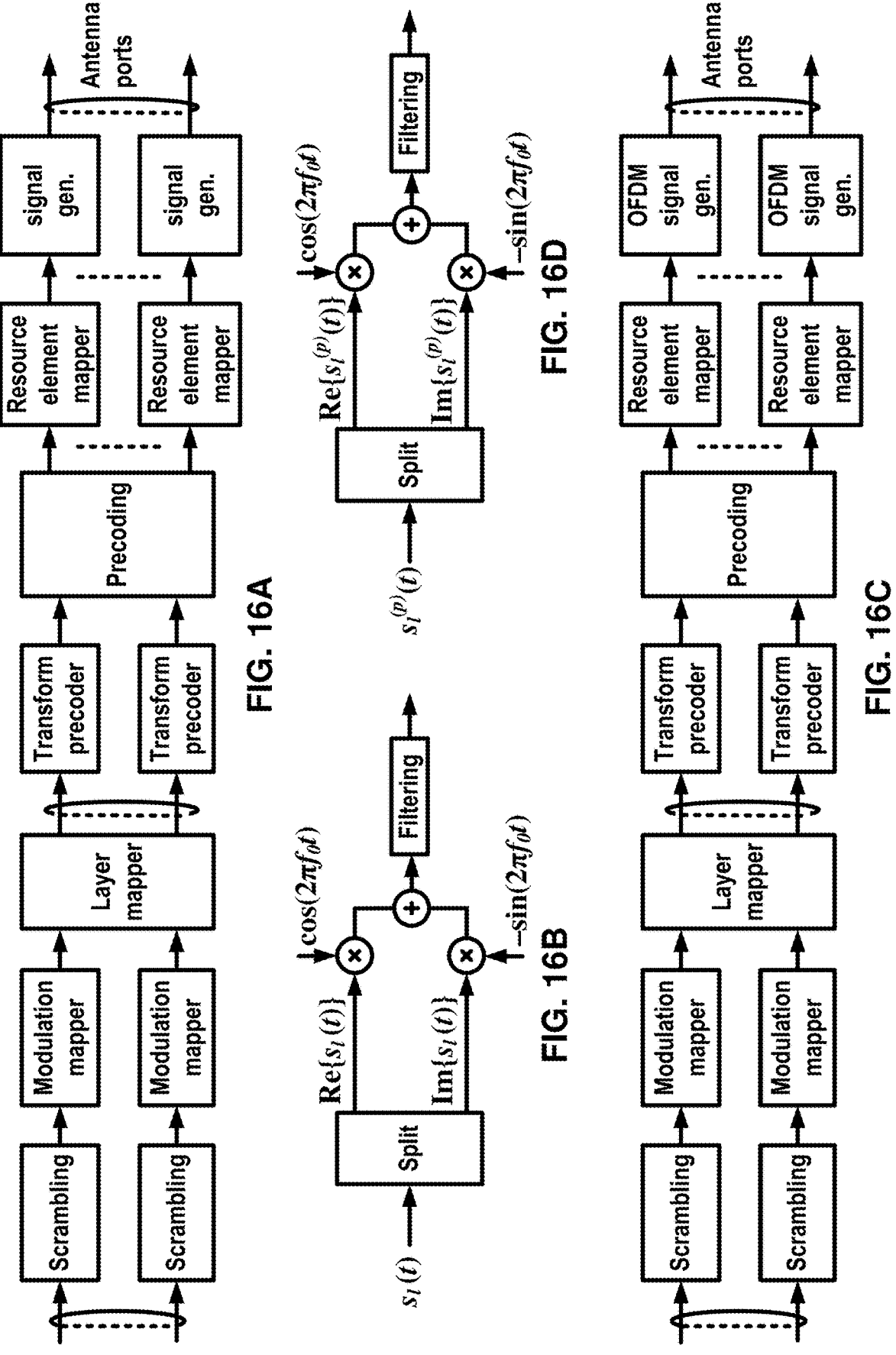
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, a CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual connectivity) via the plurality of cells. The one or more messages (e.g. as a part of the configuration parameters) may comprise parameters of physical, MAC, RLC, PCDP, SDAP, and RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted.

Other example implementations may be provided to restart a measurement of a time window.

A base station may transmit one or more MAC PDUs to a wireless device. In an example, a MAC PDU may be a bit string that is byte aligned (e.g., aligned to a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., aligned to a multiple of eight bits) in length. In an example, a MAC SDU may be included in a MAC PDU from the first bit onward. A MAC CE may be a bit string that is byte aligned (e.g., aligned to a multiple of eight bits) in length. A MAC subheader may be a bit string that is byte aligned (e.g., aligned to a multiple of eight bits) in length. In an example, a MAC subheader may be placed immediately in front of a corresponding MAC SDU, MAC CE, or padding. A MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; a MAC subheader and padding, or a combination thereof. The MAC SDU may be of variable size. A MAC subheader may correspond to a MAC SDU, a MAC CE, or padding.

In an example, when a MAC subheader corresponds to a MAC SDU, a variable-sized MAC CE, or padding, the MAC subheader may comprise: a Reserve field (R field) with a one bit length; an Format field (F field) with a one-bit length; a Logical Channel Identifier (LCID) field with a multi-bit length; a Length field (L field) with a multi-bit length, indicating the length of the corresponding MAC SDU or variable-size MAC CE in bytes, or a combination thereof. In an example, F field may indicate the size of the L field.

In an example, a MAC entity of the base station may transmit one or more MAC CEs (e.g., MAC CE commands) to a MAC entity of a wireless device. The one or more MAC CEs may comprise at least one of: a SP ZP CSI-RS Resource Set Activation/Deactivation MAC CE, a PUCCH spatial relation Activation/Deactivation MAC CE, a SP SRS Activation/Deactivation MAC CE, a SP CSI reporting on PUCCH Activation/Deactivation MAC CE, a TCI State Indication for UE-specific PDCCH MAC CE, a TCI State Indication for UE-specific PDSCH MAC CE, an Aperiodic CSI Trigger State Subselection MAC CE, a SP CSI-RS/CSI-IM Resource Set Activation/Deactivation MAC CE, a UE contention resolution identity MAC CE, a timing advance command MAC CE, a DRX command MAC CE, a Long DRX command MAC CE, an SCell activation/deactivation MAC CE (1 Octet), an SCell activation/deactivation MAC CE (4 Octet), and/or a duplication activation/deactivation MAC CE. In an example, a MAC CE, such as a MAC CE transmitted by a MAC entity of the base station to a MAC entity of the wireless device, may have an LCID in the MAC subheader corresponding to the MAC CE. In an example, a first MAC CE may has a first LCID in the MAC subheader that may be different than the second LCID in the MAC subheader of a second MAC CE. For example, an LCID given by 111011 in a MAC subheader may indicate that the MAC CE associated with the MAC subheader is a Long DRX command MAC CE.

In an example, the MAC entity of the wireless device may transmit to the MAC entity of the base station one or more MAC CEs. The one or more MAC CEs may comprise at least one of: a short buffer status report (BSR) MAC CE, a long BSR MAC CE, a C-RNTI MAC CE, a configured grant confirmation MAC CE, a single entry PHR MAC CE, a multiple entry PHR MAC CE, a Short truncated BSR, and/or a Long truncated BSR. In an example, a MAC CE may have an LCID in the MAC subheader corresponding to the MAC CE. In an example, a first MAC CE may has a first LCID in the MAC subheader that may be different than the second LCID in the MAC subheader of a second MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. The wireless device may, using the technique of CA, simultaneously receive or transmit on one or more CCs, depending on capabilities of the wireless device. In an example, the wireless device may support CA for contiguous CCs and/or for non-contiguous CCs. CCs may be organized into cells. For example, CCs may be organized into one primary cell (PCell) and one or more secondary cells (SCells).

When configured with CA, the wireless device may have one RRC connection with a network. During an RRC connection establishment/re-establishment/handover, a cell providing NAS mobility information may be a serving cell. During an RRC connection re-establishment/handover procedure, a cell providing a security input may be the serving cell. In an example, the serving cell may be a PCell.

In an example, the base station may transmit, to the wireless device, one or more messages (e.g., one or more downlink signals). The one or more messages may comprise one or more RRC messages, e.g., one or more RRC configuration/reconfiguration messages. For example, the one or more RRC messages may comprise one or more configuration parameters (e.g., one or more RRC configuration parameters).

In an example, the one or more configuration parameters may comprise configuration parameters of a plurality of one or more SCells, depending on capabilities of the wireless device. When configured with CA, the base station and/or the wireless device may employ an activation/deactivation mechanism of an SCell to improve battery or power consumption of the wireless device. When the wireless device is configured with one or more SCells, the base station may activate or deactivate at least one of the one or more SCells. Upon configuration of an SCell, the SCell may be deactivated unless the SCell state associated with the SCell is set to "activated" or "dormant." The wireless device may activate/deactivate the SCell in response to receiving an SCell Activation/Deactivation MAC CE.

For example, the base station may configure (e.g., via the one or more RRC messages/parameters) the wireless device with uplink (UL) bandwidth parts (BWPs) and downlink (DL) BWPs to enable bandwidth adaptation (BA) on a PCell. If carrier aggregation (CA) is configured, the base station may further configure the wireless device with at least one DL BWP (e.g., there may be no UL BWP in the UL) to enable BA on an SCell. For the PCell, an initial active BWP may be a first BWP used for initial access. In paired spectrum (e.g., FDD), the base station and/or the wireless device may independently switch a DL BWP and an UL BWP. In unpaired spectrum (e.g., TDD), the base station and/or the wireless device may simultaneously switch the DL BWP and the UL BWP.

In an example, the base station and/or the wireless device may switch a BWP between configured BWPs by means of a DCI or a BWP invalidity timer. When the BWP invalidity timer is configured for the serving cell, the base station and/or the wireless device may switch the active BWP to a default BWP in response to the expiry of the BWP invalidity timer associated with the serving cell. The default BWP may be configured by the network. In an example, for FDD systems, when configured with BA, one UL BWP for each uplink carrier and one DL BWP may be active at a time in the active serving cell. In an example, for TDD systems, one DL/UL BWP pair may be active at a time in the active serving cell. Operating on one UL BWP and one DL BWP (or one DL/UL pair) may improve the wireless device battery consumption. One or more BWPs other than the active UL BWP and the active DL BWP, which the wireless device may work on, may be deactivated. On the deactivated one or more BWPs, the wireless device may: not monitor PDCCH; and/or not transmit on PUCCH, PRACH, and UL-SCH. In an example, the MAC entity of the wireless device may apply normal operations on the active BWP for an activated serving cell configured with a BWP comprising: transmitting on UL-SCH; transmitting on RACH; monitoring a PDCCH; transmitting PUCCH; receiving DL-SCH; and/or (re-)initializing any suspended configured uplink grants of configured grant Type 1 according to a stored configuration, if any. In an example, on the inactive/idle BWP for each activated serving cell configured with a BWP, the MAC entity of the wireless device may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, a DCI addressed to an RNTI may comprise a CRC of the DCI being scrambled with the RNTI. The wireless device may monitor PDCCH addressed to (or for) the RNTI for detecting the DCI. For example, the PDCCH may carry (or be with) the DCI. In an example, the PDCCH may not carry the DCI.

In an example, a set of PDCCH candidates for the wireless device to monitor is defined in terms of one or more search space sets. A search space set may comprise a common search space (CSS) set or a UE-specific search space (USS) set. The wireless device may monitor one or more PDCCH candidates in one or more of the following search space sets (e.g., one or more search space sets): a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG, a Type0A-PDCCH CSS set configured by search SpaceOtherSystemInformation in PDCCH-Config-Common for a DCI format with CRC scrambled by the SI-RNTI on the primary cell of the MCG, a Type1-PDCCH CSS set configured by ra-SearchSpace in PDCCH-Config-Common for a DCI format with CRC scrambled by a RA-RNTI, a MSGB-RNTI, or a TC-RNTI on the primary cell, a Type2-PDCCH CSS set configured by paging-SearchSpace in PDCCH-ConfigCommon for a DCI format with CRC scrambled by a P-RNTI on the primary cell of the MCG, a Type3-PDCCH CSS set configured by SearchSpace in PDCCH-Config with search Space Type=common for DCI formats with CRC scrambled by a INT-RNTI, a SFI- RNTI, a TPC-PUSCH-RNTI, a TPC-PUCCH-RNTI, a TPC-SRS-RNTI, a CI-RNTI, or a power saving RNTI (PS-RNTI) and, only for the primary cell, a C-RNTI, a MCS-C-RNTI, or a CS-RNTI(s), and the USS set configured by SearchSpace in PDCCH-Config with searchSpaceType=ue-Specific for DCI formats with CRC scrambled by the C-RNTI, the MCS-C-RNTI, a SP-CSI-RNTI, the CS-RNTI(s), a SL-RNTI, a SL-CS-RNTI, or a SL-L-CS-RNTI.

In an example, the wireless device may monitor the one or more PDCCH candidates according to one or more configuration parameters of the search space set. For example, the search space set may comprise a plurality of search spaces (SSs). The wireless device may monitor the one or more PDCCH candidates in one or more CORESETs for detecting one or more DCIs. Monitoring the one or more PDCCH candidates may comprise decoding at least one PDCCH candidate of the one or more PDCCH candidates according to the monitored DCI formats. For example, monitoring the one or more PDCCH candidates may comprise decoding (e.g., blind decoding) a DCI content of the at least one PDCCH candidate via possible (or configured) PDCCH location(s), possible (or configured) PDCCH format(s), e.g., number of CCEs, number of PDCCH candidates in CSS set(s), and/or number of PDCCH candidates in the USS(s), and/or possible (or configured) DCI format(s).

In an example, the wireless device may receive the C-RNTI (e.g., via one or more previous transmissions) from the base station. For example, the one or more previous transmissions may comprise a Msg2 1312, Msg4 1314, or a MsgB 1332. If the wireless device is not provided the Type3-PDCCH CSS set or the USS set and if provided the Type 1-PDCCH CSS set, the wireless device may monitor the one or more PDCCH candidates for DCI format 0_0 and DCI format 1_0 with CRC scrambled by the C-RNTI in the Type1-PDCCH CSS set.

For example, the one or more search space sets may correspond to one or more of searchSpaceZero, searchSpaceSIB1, searchSpaceOtherSystemInformation, pagingSearchSpace, ra-SearchSpace, and the C-RNTI, the MCS-C-RNTI, or the CS-RNTI. The wireless device may monitor the one or more PDCCH candidates for the DCI format 0_0 and the DCI format 1_0 with CRC scrambled by the C-RNTI, the MCS-C-RNTI, or the CS-RNTI in the one or more search space sets in a slot where the wireless device monitors the one or more PDCCH candidates for at least the DCI format 0_0 or the DCI format 1_0 with CRC scrambled by the SI-RNTI, the RA-RNTI, the MSGB-RNTI, or the P-RNTI.

FIG. 17 shows several DCI formats. For example, the base station may use the DCI formats to transmit downlink control information to the wireless device. In an example, the wireless device may use the DCI formats for PDCCH monitoring. Different DCI formats may comprise different DCI fields and/or have different DCI payload sizes. Different DCI formats may have different signaling purposes. As shown in FIG. 17, DCI format 0_0 may be used to schedule PUSCH in one cell. In an example, DCI format 0_1 may be used to schedule one or multiple PUSCH in one cell or indicate CG-DFI (configured grant-Downlink Feedback Information) for configured grant PUSCH, etc.

In an example, the wireless device may support a baseline processing time/capability. For example, the wireless device may support additional aggressive/faster processing time/capability. In an example, the wireless device may report to the base station a processing capability, e.g., per sub-carrier spacing. In an example, a PDSCH processing time may be considered to determine, by a wireless device, a first uplink symbol of a PUCCH (e.g., determined at least based on a HARQ-ACK timing K1 and one or more PUCCH resources to be used and including the effect of the timing advance) comprising the HARQ-ACK information of the PDSCH scheduled by a DCI. In an example, the first uplink symbol of the PUCCH may not start earlier than a time gap (e.g., $T_{proc,1}$) after a last symbol of the PDSCH reception associated with the HARQ-ACK information. In an example, the first uplink symbol of the PUCCH which carries the HARQ-ACK information may start no earlier than at symbol L1, where L1 is defined as the next uplink symbol with its Cyclic Prefix (CP) starting after the time gap $T_{proc,1}$ after the end of the last symbol of the PDSCH.

In an example, a PUSCH preparation/processing time may be considered for determining the transmission time of an UL data. For example, if the first uplink symbol in the PUSCH allocation for a transport block (including DM-RS) is no earlier than at symbol L2, the wireless device may perform transmitting the PUSCH. In an example, the symbol L2 may be determined, by a wireless device, at least based on a slot offset (e.g., K2), SLIV of the PUSCH allocation indicated by time domain resource assignment of a scheduling DCI. In an example, the symbol L2 may be specified as the next uplink symbol with its CP starting after a time gap with length $T_{proc,2}$ after the end of the reception of the last symbol of the PDCCH carrying the DCI scheduling the PUSCH.

In an example, the one or more configuration parameters may comprise one or more DRX configuration parameters (e.g., DRX-Config). The one or more DRX configuration parameters may configure the wireless device with DRX operation. In an example, the one or more DRX configuration parameters may indicate monitoring the PDCCH for the DRX operation. For example, when in an RRC_CONNECTED state, if the DRX operation is configured (e.g., the DRX is configured or a DRX cycle is configured), for all the activated Serving Cells (e.g., the serving cell), the MAC entity of the wireless device may monitor the PDCCH discontinuously using the DRX operation. Otherwise, the MAC entity may monitor the PDCCH continuously.

For example, the wireless device may, based on the DRX operation being configured, use the DRX operation while communicating with the base station in the serving cell. For example, a MAC entity (or the MAC layer) of the wireless device, based on the DRX operation being configured, may control the PDCCH monitoring activity of the MAC entity. When the DRX operation is configured, the wireless device may monitor the PDCCH for at least one RNTI. In an example, the at least one RNTI may comprise one or more of the following: C-RNTI, cancelation indication RNTI (CI-RNTI), configured scheduling RNTI (CS-RNTI), interruption RNTI (INT-RNTI), slot format indication RNTI (SFI-RNTI), semi-persistent channel state information RNTI (SP-CSI-RNTI), transmit power control physical uplink control channel RNTI (TPC-PUCCH-RNTI), transmit power control physical shared channel RNTI (TPC-PUSCH-RNTI), transmit power control sounding reference signal RNTI (TPC-SRS-RNTI), or availability indicator RNTI (AI-RNTI).

Figure 18:
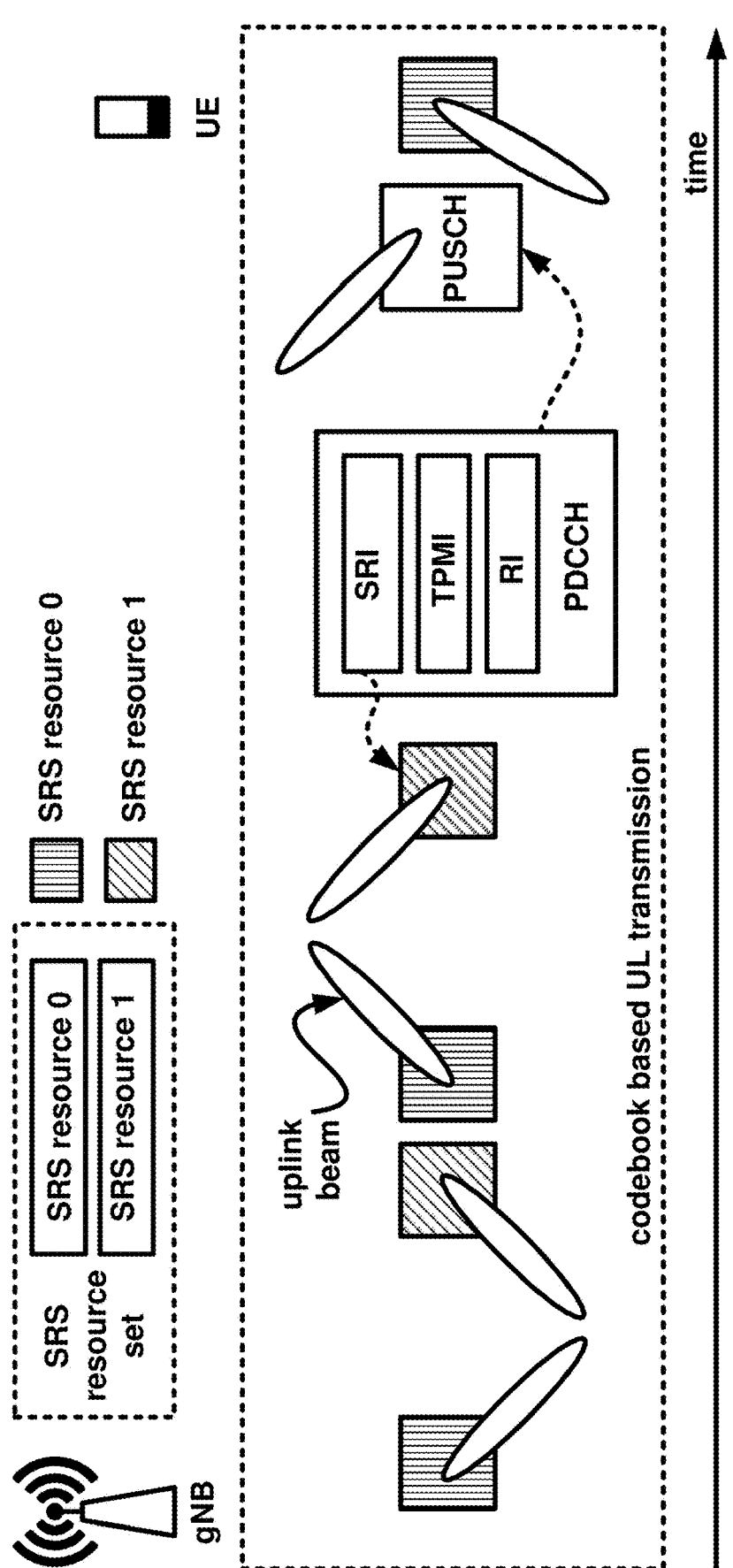
FIG. 18 illustrates an example of beam management with codebook based uplink transmission as per an aspect of an embodiment of the present disclosure.

FIG. 18 illustrates an example of beam management with codebook based uplink transmission as per an aspect of an embodiment of the present disclosure. For codebook based transmission, a wireless device may transmit a transport block to a base station via a PUSCH (e.g., scheduled by a DCI format 0_0, or a DCI format 0_1 in a PDCCH). The wireless device may determines a PUSCH transmission precoder based on an SRS resource indicator (SRI), a transmitted precoding matrix indicator (TPMI), and a transmission rank in response to the PUSCH being scheduled by the DCI format 0_1. The SRI, TPMI, and the transmission rank may be given by respective DCI fields of SRS resource indicator and precoding information and number of layers in the DCI format 0_1. The TPMI may be used to indicate a precoder to be applied by the wireless device over one or more layers. The one or more layers may correspond to an SRS resource selected by the SRI in responding to multiple SRS resources being configured by the base station to the wireless device. In an example, if a single SRS resource is configured to the wireless device, the TPMI may be used to indicate the precoder to be applied over one or more layers corresponding to the SRS resource. The transmission precoder may be selected from an uplink codebook. The uplink codebook may comprise a number of antenna ports equal to higher layer parameter (e.g., RRC parameter nrofSRS-Ports in SRS-Config). The wireless device may be configured with at least one SRS resource in response to the wireless device being configured with the higher layer parameter txConfig set to 'codebook'. An indicated SRI in slot n may be associated with a most recent transmission of SRS resource identified by the SRI. The SRS resource may be prior to a PDCCH carrying the SRI. For the codebook based uplink transmission, the wireless device may be configured with a single SRS Resource Set with a usage set to 'codebook'. One SRS resource from the SRS resource set may be indicated to the wireless device based on the SRI. The maximum number of configured SRS resources of an SRS resource set for codebook based transmission may be 2 (e.g., SRS resource 0 and SRS resource 1). An SRS request field in DCI may trigger a transmission of aperiodic SRS resources in response to an aperiodic SRS being configured for the wireless device. The wireless device may transmit a PUSCH using same antenna port(s) as SRS port(s) in the SRS resource indicated by the SRI of the DCI format 0_1. If the base station configures the SRS resource set with multiple SRS resources to the wireless device with a usage set to 'codebook', the wireless device may expect a same number of ports for each of the multiple SRS resources. The wireless device may transmit the PUSCH with a same uplink spatial domain transmission filter used for a transmission of the SRS resource indicated by the SRI of the DCI (e.g., DCI format 0_1) in the PDCCH.

Figure 19:
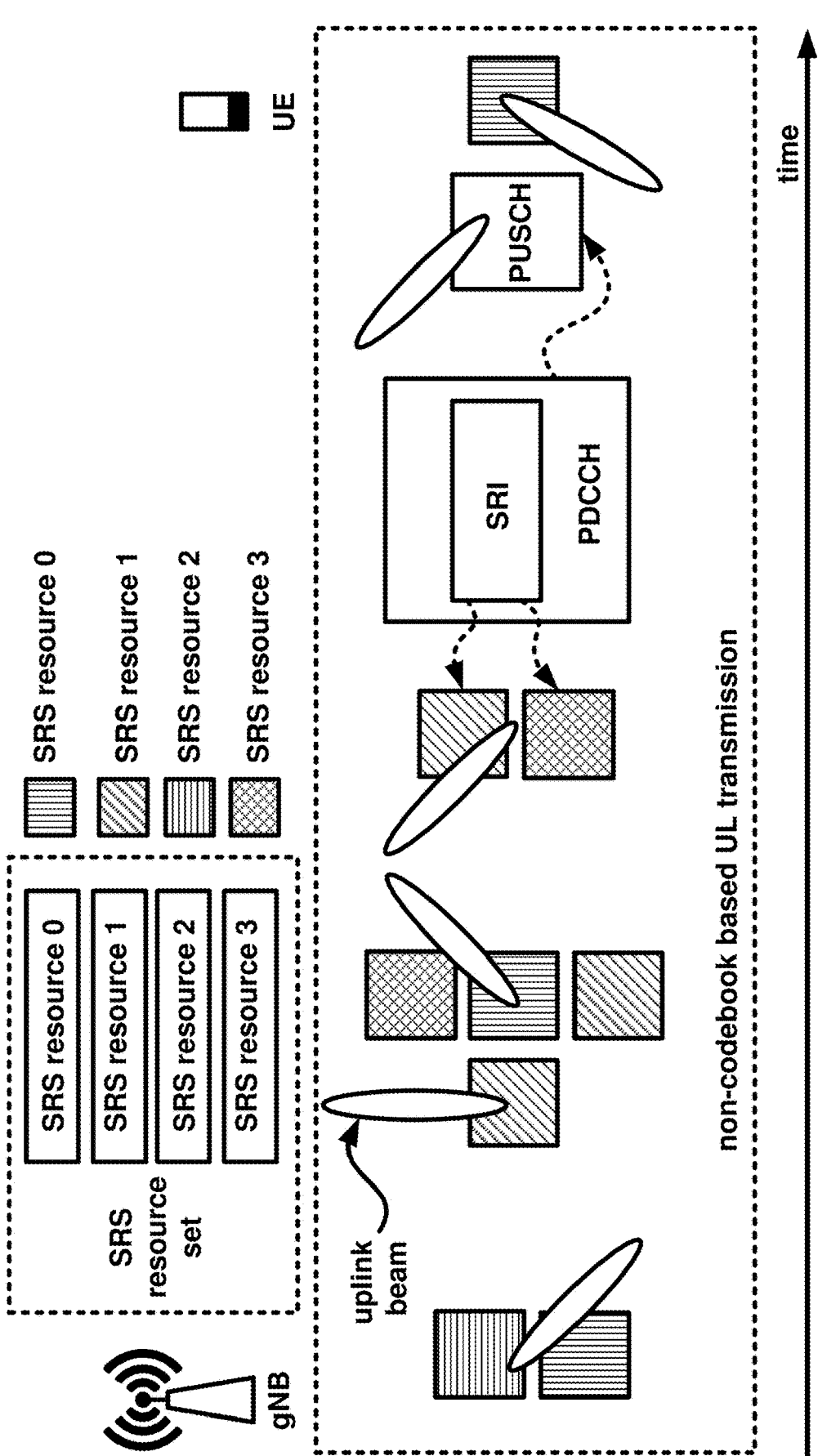
FIG. 19 illustrates an example of beam management with non-codebook based uplink transmission as per an aspect of an embodiment of the present disclosure.

FIG. 19 illustrates an example of beam management with non-codebook based uplink transmission as per an aspect of an embodiment of the present disclosure. For non-codebook based transmission, a base station may schedule a PUSCH transmission from a wireless device via DCI format 0_0, or DCI format 0_1 of PDCCH. The wireless device may determine a PUSCH precoder and transmission rank based on an SRI of the PDCCH in response to multiple SRS resources being configured to the wireless device by the base station (e.g., via an RRC message). The SRI may be given by an SRS resource indicator of DCI in the PDCCH. The wireless device may use one or more SRS resources for an SRS transmission. In an example, a maximum number of SRS resources configured to the wireless device for simultaneous transmission in a same symbol may be determined based on a UE capability. A maximum number of SRS resources in an SRS resource set may be determined based on the UE capability. The SRS resources transmitted simultaneously by the wireless device may occupy the same RBs. The base station may configure one SRS port for each SRS resource to the wireless device. The base station may configure one SRS resource set to the wireless device with higher layer (e.g., RRC layer) parameter usage in SRS- ResourceSet set to 'nonCodebook'. In an example, a maximum number of SRS resources configured for non-codebook based uplink transmission may be 4. An indicated SRI in slot n may be associated with a most recent transmission of SRS resource(s) identified by the SRI. The SRS transmission indicated by the SRI may be prior to a PDCCH carrying the SRI. For non-codebook based transmission, the wireless device may calculate a precoder used for a transmission of SRS based on measurement of an associated non-zero power (NZP) CSI-RS resource. The wireless device may be configured by the base station (e.g., via an RRC message) with one NZP CSI-RS resource for the SRS resource set with higher layer (e.g., RRC layer) parameter usage in SRS-ResourceSet set to 'nonCodebook'. The wireless device may perform a one-to-one mapping from the indicated SRI(s) to the indicated DM-RS ports(s) and corresponding PUSCH layers given by DCI format 0_1 of the PDCCH. The wireless device may transmit the PUSCH using same antenna ports as the SRS port(s) in the SRS resource(s) indicated by SRI(s) given by DCI format 0_1 of the PDCCH. For non-codebook based uplink transmission, the wireless device may not expect to be configured by the base station (e.g., via an RRC message) with both spatial-RelationInfo for SRS resource and associated CSI-RS in SRS-ResourceSet for the SRS resource set. For non-codebook based transmission, the wireless device may be scheduled by the base station with DCI format 0_1 of the PDCCH in response to at least one SRS resource being configured in SRS-ResourceSet with usage set to 'nonCodebook'. The wireless device may transmit the PUSCH with a same uplink spatial domain transmission filter used for a transmission of the SRS resource(s) indicated by the SRI of the DCI (e.g., DCI format 0_1) in the PDCCH.

In an example, the wireless device may be configured by the base station with higher layer (e.g., RRC layer) parameter spatialRelationInfo containing an ID of a reference 'ssb-Index'. The wireless device may transmit a target SRS resource with a same spatial domain transmission filter used for a reception of the reference SS/PBCH block (SSB), for example, based on beam correspondence capability of the wireless device. In an example, the wireless device may be configured by the base station with the higher layer (e.g., RRC layer) parameter spatialRelationInfo containing the ID of a reference 'csi-RS-Index'. The wireless device may transmit the target SRS resource with the same spatial domain transmission filter used for a reception of the reference periodic CSI-RS, or of a reference semi-persistent CSI-RS), for example, based on beam correspondence capability of the wireless device. In an example, the wireless device may be configured by the base station with higher layer (e.g., RRC layer) parameter spatialRelationInfo containing the ID of a reference 'srs'. The wireless device may transmit the target SRS resource with the same spatial domain transmission filter used for a transmission of the reference periodic SRS.

In the existing technology for an uplink transmission of the PUSCH, an uplink beam management procedure based on SRS(s) may be used to determine an uplink spatial domain transmission filter. In an example, the base station may configure (e.g., via an RRC message) one or more SRS resource sets to the wireless device for uplink beam management. Each of the one or more SRS resource sets may comprise one or more SRS resources. The SRS resources may be configured by the base station to enable a sweeping of different uplink spatial domain transmission filters over different symbol positions and/or time slots. The base station may identify "best" SRS resource(s), for example, according to a certain metric, like the largest measured L1-RSRPs at the base station side. The "best" SRS resource(s), for example identified by an SRI in DCI of PDCCH, may be indicated by the base station with the DCI (e.g., DCI format 0_1) in the PDCCH, to the wireless device to be used for an uplink PUSCH transmission. For codebook based PUSCH transmission, the wireless device may be indicated indirectly with an uplink spatial domain transmission filter by the base station via an SRS resource indication by a scheduling DCI (e.g., SRI of DCI format 0_1). The wireless device may use the uplink spatial domain transmission filter, applied to the indicated SRS resource(s), to transmit the PUSCH. For non-codebook based PUSCH transmission, the wireless device may also be indicated indirectly with an uplink spatial domain transmission filter by the base station via SRS resource(s) indication by a scheduling DCI (e.g., SRI of DCI format 0_1). The wireless device may use the uplink spatial domain transmission filter, applied to the indicated SRS resource, to transmit the PUSCH.

Implementation of existing technology, with using SRS resource indication as a bridge to indicate an uplink spatial domain transmission filter, may not provide an efficient indication of the uplink spatial domain transmission filter for the wireless device (e.g., an uplink beam management procedure is necessary, before the SRI transmission in PDCCH, for the base station to determine 'best' uplink beams, which may introduce more signaling overhead and latency for the determination of the uplink spatial domain transmission filter and increase power consumption of the wireless device). It is beneficial to support indicating the uplink spatial domain transmission filter to the wireless device for a PUSCH transmission, instead of taking the SRS as a bridge like in the existing technology. Indicating the uplink spatial domain transmission filter to the wireless device may reduce the latency of the determination of the uplink spatial domain transmission filter for PUSCH transmission and improve the flexibility of the determination of the uplink spatial domain transmission filter for the wireless device. In an example, an uplink transmission configuration indicator (UL-TCI) may be introduced to indicate the uplink spatial domain transmission filter for the wireless device. Since the UL-TCI shares the same framework as downlink beam indication, it may offer greater flexibility and modularity feature than the SRS based framework. However, the UL-TCI and the SRI may be indicated to the wireless device in the same DCI (e.g., the SRI indirectly indicating the uplink spatial domain transmission filter as in codebook based PUSCH transmission and/or non-codebook based PUSCH transmission). The indication(s) of the UL-TCI and the SRI for the uplink spatial domain transmission filter(s) may conflict with each other or duplicated.

There is a need to implement an efficient determination scheme for the uplink spatial domain transmission filter for the wireless device based on the indication(s) of the UL-TCI and the SRI. Example embodiments describe an enhanced uplink spatial domain transmission filter determination and/or indication mechanism based on improving control information indication in an uplink grant transmitted by the base station to the wireless device via a PDCCH. For example, new configuration parameters in an RRC message are described to improve the efficiency of the uplink spatial domain transmission filter determination for the wireless device. For example, a new control information indication format and/or triggering indication format are implemented to improve signaling efficiency of the uplink spatial domain transmission filter determination and/or indication for the wireless device. Example embodiments disclose several implementations to improve the reliability and efficiency of the determination of the uplink spatial domain transmission filter for the wireless device and decrease the signaling overhead of the determination of the uplink spatial domain transmission filter for the wireless device. These embodiments may enhance/result in high reliability for the uplink beam determination (and/or indication) and the beam management procedure with reduced signaling overhead for the uplink PUSCH transmission with codebook based uplink transmission and/or non-codebook based uplink transmission.

FIG. 20A shows an example of a non-terrestrial network. The non-terrestrial network (NTN) network (e.g., a satellite network) may be a network or network segment (e.g., an NG-RAN consisting of gNBs) for providing non-terrestrial NR access to wireless devices. The NTN may use a space-borne vehicle to embody a transmission equipment relay node (e.g., radio remote unit or a transparent payload) or a base station (or a regenerative payload). While a terrestrial network is a network located on the surface of the earth, an NTN may be a network which uses an NTN node (e.g., a satellite) as an access network, a backhaul interface network, or both. In an example, an NTN may comprise one or more NTN nodes (or payloads and/or space-borne vehicles), each of which may provide connectivity functions, between the service link and the feeder link.

An NTN node may embark a bent pipe payload (e.g., a transparent payload) or a regenerative payload. The NTN node with the transparent payload may comprise transmitter/receiver circuitries without the capability of on-board digital signal processing (e.g., modulation and/or coding) and connect to a base station (e.g., a base station of an NTN or the NTN base station or a non-terrestrial access point) via a feeder link. In some respects, as shown in FIG. 20A, the base station (e.g., a gNB) may further comprise the transparent NTN node, the feeder link, and/or a gateway (e.g., an NTN gateway). The gateway may be an earth station that is located at the surface of the earth, providing connectivity to the NTN payload using a feeder link. In some examples, the NTN node with the regenerative payload (e.g., the base station of the NTN or the NTN base station) may comprise functionalities of a base station, e.g., the on-board processing used to demodulate and decode the received signal and/or regenerate the signal before sending/transmitting it back to the earth. In some respects, as shown in FIG. 20A, the base station (e.g., the gNB) may further comprise the regenerative NTN node, the feeder link, and/or the gateway (e.g., the NTN gateway).

In some examples, the NTN node may be a satellite, a balloon, an air ship, an airplane, an unmanned aircraft system (UAS), an unmanned aerial vehicle (UAV), a drone, or the like. For example, the UAS may be a blimp, a high-altitude platform station (HAPS), e.g., an airborne vehicle embarking the NTN payload placed at an altitude between 8 and 50 km, or a pseudo satellite station. FIG. 20B is an example figure of different types of NTN platforms. In an example, a satellite may be placed into a low-earth orbit (LEO) at an altitude between 250 km to 1500 km, with orbital periods ranging from 90-130 minutes. From the perspective of a given point on the surface of the earth, the position of the LEO satellite may change. In an example, a satellite may be placed into a medium-earth orbit (MEO) at an altitude between 5000 to 20000 km, with orbital periods ranging from 2 hours to 14 hours. In an example, a satellite may be placed into a geostationary satellite earth orbit (GEO) at 35,786 km altitude, and directly above the equator.

From the perspective of a given point on the surface of the earth, the position of the GEO satellite may not change.

Figures 21A, 21B:
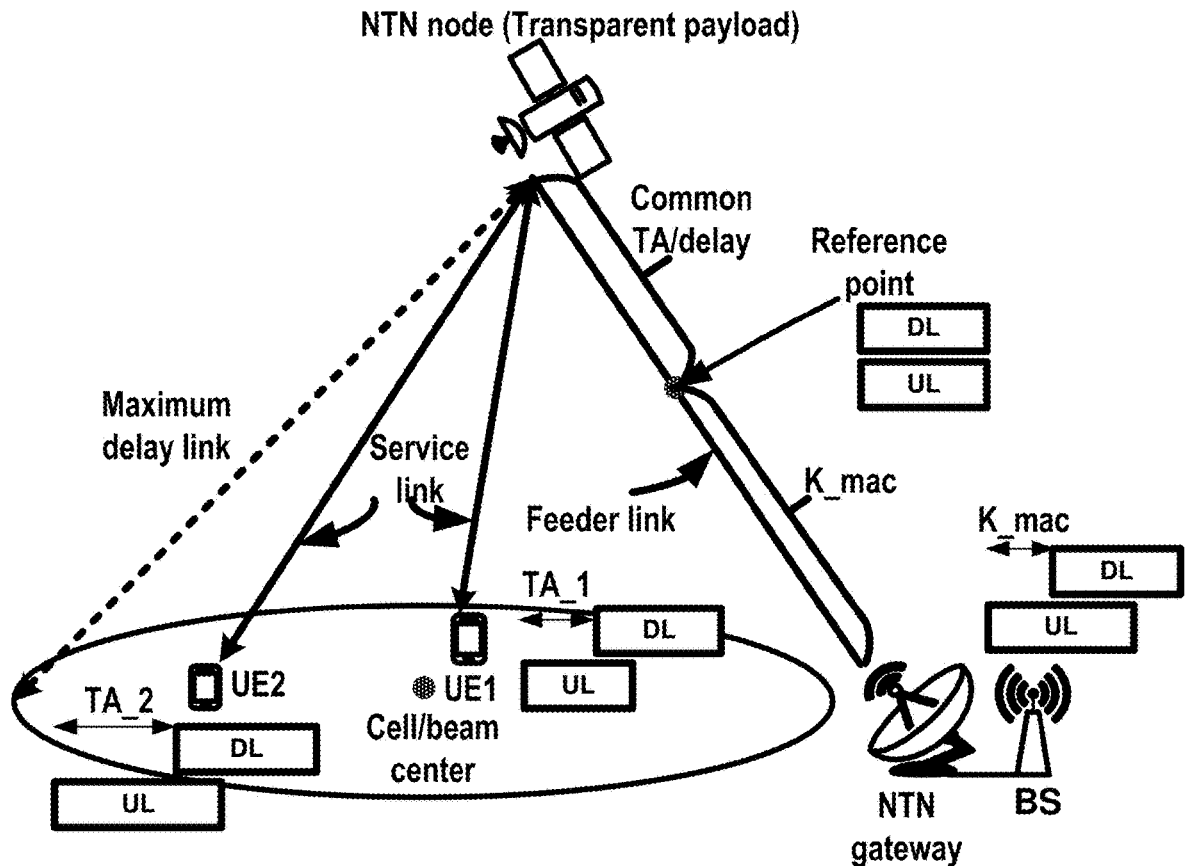
FIG. 21A shows an example of an NTN with a transparent NTN platform.
FIG. 21B shows examples of propagation delay corresponding to NTNs of different altitudes.

FIG. 21A shows an example of an NTN with a transparent NTN platform. As shown in FIG. 21A, the NTN node (e.g., the satellite) may forward a received signal from the NTN gateway on the ground back to the earth over the feeder link. In an example, the gateway and the base station may not be collocated. The NTN node may forward a received signal to the wireless device or the base station from another NTN node, e.g., over inter-link satellite communication links.

The NTN node may generate one or more beams over a given area (e.g., a coverage area or a cell). The footprint of a beam (or the cell) may be referred to as a spotbeam. For example, the footprint of a cell/beam may move over the Earth's surface with the satellite movement (e.g., a LEO with moving cells or a HAPS with moving cells). The footprint of a cell/beam may be Earth fixed with some beam pointing mechanism used by the satellite to compensate for its motion (e.g., a LEO with earth fixed cells). In some cases, the size of a spotbeam may range from tens of kilometers to a few thousand kilometers. For example, the size of the spotbeam may depend on the system design.

A propagation delay may be an amount of time it takes for the head of the signal to travel from a sender (e.g., the base station or the NTN node) to a receiver (e.g., the wireless device) or vice versa. For uplink, the sender may be the wireless device and the receiver may be the base station/access network. For downlink, the sender may be the base station/access network and the receiver may be the wireless device. The propagation delay may vary depending on a change in distance between the sender and the receiver, e.g., due to movement of the NTN node, movement of the wireless device, a change of an inter-satellite link, and/or feeder link switching.

FIG. 21B shows examples of propagation delay corresponding to NTNs of different altitudes. The propagation delay in the figure may be one-way latency/delay. In an example, one-way latency/delay may be an amount of time required to propagate through a telecommunication system from the sender (e.g., the base station) to the receiver (e.g., the wireless device). In an example shown in FIG. 21B, for the transparent NTN, the round-trip propagation delay (RTD or UE-gNB RTT) may comprise service link delay (e.g., between the NTN node and the wireless device), feeder link delay (e.g., between the NTN gateway and the NTN node), and/or between the gateway and the base station (e.g., in the case the gateway and the NTN base station are not collocated). For example, the UE-gNB RTT (or the RTD) may be twice of the one-way delay between the wireless device and the base station. From FIG. 21B, in case of a GEO satellite with the transparent payload, the RTD may be four times of 138.9 milliseconds (approximately 556 milliseconds). In an example, the RTD of a terrestrial network (e.g., NR, E-UTRA, LTE) may be negligible compared to the RTD of an NTN scenario (e.g., the RTD of a terrestrial network may be less than 1 millisecond). A maximum RTD of a LEO satellite with the transparent payload and altitude of 600 km is approximately 25.77 milliseconds and with altitude of 1200 km is approximately 41.77 milliseconds.

A differential delay within a beam/cell of a NTN node may depend on, for example, the maximum diameter of the beam/cell footprint at nadir. For example, the differential delay withing the beam/cell may depend on the maximum delay link in FIG. 21A. In an example, the differential delay may imply the maximum difference between communication latency that two wireless devices, e.g., a first wireless device (UE1) that is located close to the center of the cell/beam and a second wireless device (UE2) that is located close to the edge of the cell/beam in FIG. 21B, may experience while communicating with the base station via the NTN node. The first wireless device may experience a smaller RTD compared to the second wireless device. The link with a maximum propagation delay (e.g., the maximum delay link) may experience the highest propagation delay (or the maximum RTD) in the cell/beam. In an example, the differential delay may imply a difference between the maximum delay of the cell/beam and a minimum delay of the cell/beam. In an example, the service link to a cell/beam center may experience the minimum propagation delay in the cell/beam. Depending on implementation, for a LEO satellite, the differential delay may be at least 3.12 milliseconds and may increase up to 8 milliseconds. In an example of a GEO satellite, depending on implementation, the differential delay may be as large as 32 milliseconds.

The wireless device (e.g., the first wireless device and/or the second wireless device in FIG. 21B) may receive the one or more configuration parameters, e.g., the one or more RRC configuration parameters from the base station. For example, the one or more configuration parameters may comprise one or more NTN configuration parameters. In some aspects, the wireless device may indicate a capability for NR NTN access (e.g., nonTerrestrialNetwork-r17), e.g., to receive the one or more NTN configuration parameters (e.g., via one or more NTN-specific SIBs). For example, the one or more NTN configuration parameters may be received, by the wireless device, from a broadcast system information (e.g., SIB1 and/or the one or more NTN-specific SIBs). The one or more NTN configuration parameters may facilitate/manage the calculation/determination/measurement of the propagation delay (e.g., the UE-gNB RTT) and/or a timing advance (TA) at one or more wireless devices (e.g., the wireless device) camping in the cell/beam. In an example, the one or more NTN configuration parameters may comprise at least one or more ephemeris parameters (e.g., satellite ephemeris parameters or NTN ephemeris parameters), one or more common delay/TA parameters, a validity duration (or timer or window) for UL synchronization, an epoch time, and/or one or more timing offset parameters. The validity duration may be for uplink synchronization assistance information (e.g., the one or more NTN configuration parameters). In an example, the validity duration may indicate a maximum time during which the wireless device may apply the assistance information (e.g., the one or more NTN configuration parameters) without (re) acquiring new assistance information (e.g., without reacquiring the NTN-specific SIB or SIB1). For example, the one or more NTN configuration parameters may enable a TA reporting.

In an example, the wireless device may maintain/calculate a cell-specific timing offset, one or more beam-specific timing offsets, and/or a UE-specific timing offset (e.g., UE-specific K_Offset) based on the one or more timing offset parameters and/or one or more MAC CE commands and/or one or more RRC signaling. For example, the one or more timing offset parameters may comprise a first timing offset (e.g., Koffset in ServingCellConfigCommon). In some aspects, the first timing offset may account for the maximum RTD of the cell/beam. For example, the wireless device may track/update/maintain the cell/beam-specific timing offset based on receiving an update of the first timing offset from the base station. For example, the wireless device may receive a second timing offset (e.g., a Differential UE-Specific K_Offset MAC CE). The wireless device may update/track/maintain the UE-specific timing offset based on the second timing offset and/or the cell-specific timing offset.

In some examples, the one or more timing offset parameters may configure/indicate a third timing offset. The wireless device (or the base station) may set a MAC-specific timing offset (or a MAC layer timing offset), denoted by K-Mac, based on the third timing offset. For example, K-Mac may be 0, e.g., when the third timing offset is not indicated/configured. For example, in an NTN scenario with the transparent NTN node, when the UL frame and the DL frame are aligned at the base station, the third timing offset may be absent from the one or more NTN configuration parameters or may be 0. In some examples, the MAC-specific timing offset may indicate a portion of the propagation delay (e.g., the UE-gNB RTT) that the base station may pre-compensate (e.g., when the UL frame and the DL frame are not aligned at the base station), e.g., the third timing offset may indicate the difference between the UL frame/configuration timing and the DL frame/configuration timing at the base station. As shown in FIG. 21B, the UL frame and DL frame may be aligned at a reference point on the feeder link. For example, the reference point may be the NTN node, e.g., the third timing offset is equal to the feeder link delay.

To maintain uplink orthogonality, transmissions from different wireless devices in a cell/beam (e.g., the first wireless device and the second wireless device in FIG. 21B) may need to be time-aligned at the base station and/or the NTN node (e.g., satellite). In an example, time alignment/synchronization may be achieved by using different timing advance (TA) values at different wireless devices to compensate for their different propagation delays (or RTDs). In some examples, the first wireless device may use the first TA value (e.g., TA_1) and the second wireless device may use the second TA value (TA_2).

For example, the wireless device may calculate/measure/maintain a current TA (value) of the wireless device (e.g., $N_{TA}$) based on at least a combination of a closed-loop TA procedure/control and/or an open-loop TA procedure/control. The current TA value of the first wireless device may be TA_1 and the current TA value of the second wireless device may be TA_2.

The closed-loop TA procedure/control may be based on receiving at least one TA command (TAC) MAC CE from the base station. For example, the at least one TAC CE may comprise a TA (or an absolute TA) command field of a Msg2 1312 (or a MsgB 1332).

The open-loop TA procedure/control may require a GNSS-acquired position (or location information) of the wireless device and/or receiving the one or more NTN configuration parameters, e.g., the one or more ephemeris parameters (e.g., the satellite ephemeris data), and/or the one or more common delay/TA parameters (e.g., the common TA value). The wireless device may, based on an implemented orbital predictor/propagator model, may use the one or more ephemeris parameters (and/or the GNSS-acquired position) to measure/calculate/maintain movement pattern of the satellite, estimate/measure the service link delay, and/or to adjust the current TA value (e.g., the TA of the wireless device) via the open-loop TA procedure/control. In an example, a combination of the closed-loop TA control and the open-loop TA control may be based on adding/summing the open-loop TA value (e.g., derived/calculated based on the open-loop TA procedure/control) and the closed-loop TA value (or a portion of the closed-loop TA procedure/control).

In an example, the wireless device may calculate/measure/estimate the UE-gNB RTT (or the RTD) based on the current TA value and the third timing offset (e.g., K-Mac). For example, the UE-gNB RTT may be the summation of the current TA value and K-Mac. In an example, if the third timing offset is not indicated or when the K-Mac is 0, the wireless device may determine/measure the UE-gNB RTT based on the current TA value, e.g., the UE-gNB RTT is equal to the current TA value. In an example, the wireless device may maintain/calculate/update the open-loop TA value (or the UE-gNB RTT) over the validity duration. For example, the validity duration may indicate the validity period of the (satellite) ephemeris data/information and/or the one or more common TA parameters. In an example, the validity duration may specify/indicate a maximum period/window (e.g., corresponding to an orbit predictor/propagator model the wireless device is using to estimate/calculate the propagation delay and/or a maximum tolerable error in estimating/measuring/calculating the open-loop TA value) during which the wireless device may not require to read/update/acquire the satellite ephemeris data and/or to acquire the one or more NTN-specific SIBs. For example, upon or in response to acquiring the new (satellite) ephemeris data (or parameters) and/or the one or more NTN-specific SIBs, the wireless device may start/restart the validity duration based on the epoch time indicated by the one or more NTN configuration parameters. In an example, in response to determining that the validity duration being expired, the wireless device may acquire the one or more NTN-specific SIBs to receive an updated (satellite) ephemeris data/information and/or an update of the one or more common TA parameters. In an example, upon the expiry of the validity duration and when the wireless device is not able to acquire the one or more NTN-specific SIBs, the wireless device may become unsynchronized with the base station, e.g., for UL communication with the base station.

In some aspects, in response to receiving the one or more NTN configuration parameters (e.g., via acquiring the one or more NTN-specific SIBs) and/or acquiring an updated GNSS-acquired position, the wireless device may calculate/measure/update the current TA value via the open-loop TA procedure/control. In another example, the wireless device may update the current TA value based on the closed-loop TA procedure/control, for example, based on receiving the one or more TAC MAC CEs. In an example, based on the current TA value being updated, the wireless device may adjust (recalculate) the UE-gNB RTT. In an example, based on receiving a new third timing offset, the wireless device may set K-Mac and adjust (recalculate) the UE-gNB RTT. In another example, the wireless device may periodically calculate/measure/update the current TA value. For example, the wireless device may, prior to performing an uplink transmission, calculate/measure/update the current TA value.

In an example, the wireless device may set the common TA/delay by zero in response to determining that the one or more common TA/delay parameters are absent from the one or more NTN configuration message. For example, when the reference point is located at the NTN node (e.g., the third timing offset is equal to the feeder link delay), the common TA/delay may be zero. In another example, for an NTN with the transparent payload, when the UL timing synchronization is held at the NTN node (e.g., the UL and DL frames are aligned at the base station), the wireless device may not pre-compensate the common TA.

In an example, the wireless device with GNSS capability may require estimating the propagation delay (or the service link delay) based on one or more measurements. For example, the one or more measurements may indicate the GNSS-acquired location information (position) of the wireless device. In an example, the one or more measurements may allow the wireless device to calculate/estimate the propagation delay (or the open-loop TA value) using the GNSS-acquired position and the (satellite) ephemeris data/information. In another example, the one or more measurements may allow the wireless devices to estimate/calculate the propagation delay via one or more timestamps (e.g., the timestamp of a configured broadcast signal) and/or the epoch time. In an example, the one or more measurements may allow the wireless device to estimate/measure a variation rate by which the common TA and/or the service link delay changes over a period.

A base station may configure a wireless device with one or more sounding reference signal (SRS) resource sets (e.g., SRS-ResourceSet), e.g., via one or more SRS configuration parameters (e.g., SRS-Config). For example, the one or more configuration parameters (e.g., the one or more RRC configuration parameters) may comprise the one or more SRS configuration parameters. The one or more SRS resource sets (or each of the one or more SRS resource sets) may, for example, comprise at least one SRS resource (e.g., SRS-Resource). For example, the wireless device and/or the base station may use the one or more SRS resource sets for uplink beam management (e.g., by sweeping of different uplink spatial domain transmission filters over different symbol positions and/or time slots) and/or uplink signals (e.g., PUSCH/PUCCH) transmissions/receptions.

In existing technologies, the wireless device may transmit one or more SRS transmissions via a first SRS resource of the at least one SRS resource. The base station may identify/determine the at least one SRS resource of the one or more SRS resource sets, e.g., based on receiving the one or more SRS transmissions. In some examples, the base station may measure at least one metric (e.g., L1-RSRPs) based on the one or more SRS transmissions. The base station and/or the wireless device may, for example, use the at least one SRS resource for the uplink beam management and/or transmitting a PUSCH (by the wireless device) and/or receiving the PUSCH (by the base station). In some implementations, the base station may use a most recent transmission of the one or more SRS transmissions to identify/determine an uplink spatial domain transmission filter for the uplink beam management and/or receiving the PUSCH. The base station may, for example, schedule the wireless device to transmit the PUSCH by transmitting a DCI (e.g., DCI format 0_1) comprising an SRS resource indicator (SRI) field indicating the first SRS resource of the at least one SRS resource. For example, the wireless device may receive the DCI in a PDCCH monitoring occasion. The wireless device may, based on the SRI filed of the DCI, identify/determine the first SRS resource of the at least one SRS resource for transmitting the PUSCH. For example, the wireless device may use the most recent transmission of the first SRS resource of the at least one SRS resource, prior to the PDCCH monitoring occasion, for transmitting the PUSCH. In some examples, the wireless device may determine the uplink spatial domain transmission filter for the transmission of the PUSCH based on the SRI field of the DCI (e.g., the most recent transmission of the first SRS resource of the at least one SRS resource prior to the PDCCH monitoring occasion). The base station may receive the PUSCH transmission using the (identified) uplink spatial domain transmission filter.

In existing technologies, in an NTN scenario, the communication of the wireless device and the base station may be subject to a long propagation delay (e.g., 20-40 ms in LEO satellite or approximately 600 ms in GEO satellite), e.g., 20-600 times greater than a (maximum) propagation delay in a terrestrial network (TN) scenario. For example, due to movement/displacement of the NTN node/payload, the propagation delay between the wireless device and the base station may (substantially) change/fluctuate/vary (e.g., increase or decrease). Based on existing technologies, in an NTN scenario with a long (and/or varying) propagation delay, the wireless device may use/identify/determine a wrong uplink spatial domain transmission filter for transmitting the PUSCH, e.g., by ignoring impact(s) of the long propagation delay between the wireless device and the base station. For example, the wrongly identified/determined uplink spatial domain transmission filter (e.g., based on the most recent transmission of the first SRS resource of the at least one SRS resource prior to the PDCCH monitoring occasion), for transmitting the PUSCH, may result in misalignment between the base station and the wireless device. In some cases, the base station may assume a different uplink spatial domain transmission filter than the identified uplink spatial domain transmission filter by the wireless device. For example, the base station may fail to correctly receive/decode the PUSCH.

Based on existing technologies, in an NTN scenario with a long (and/or varying) propagation delay, efficiency of the PUSCH transmission may reduce when the base station and/or the wireless device ignore impact(s) of the long propagation delay between the wireless device and the base station. Improvements in uplink beam management, e.g., for transmitting uplink signals (e.g., PUSCHs), may improve efficiency of uplink transmission, e.g., by reducing uplink transmission latency (e.g., by reducing possibility of one or more retransmissions of the PUSCH) and/or consumed power of the wireless device for transmitting PUSCHs.

According to an example embodiment of the present disclosure, the wireless device may determine/identify an uplink spatial domain transmission filter, for transmitting a PUSCH, based on a most recent SRS transmission, of the one or more SRS transmissions, that occurs prior to an offset from the PDCCH monitoring occasion. For example, the wireless device may, from the base station and in the PDCCH monitoring occasion, receive a DCI scheduling/indicating the PUSCH transmission. The DCI may, for example, comprise the SRI field indicating the first SRS resource. In an example embodiment, the wireless device may transmit the PUSCH transmission based on the most recent SRS transmission, e.g., based on the (identified/determined) uplink spatial domain transmission filter. For example, the wireless device may receive the one or more configuration parameters indicating at least one sounding reference signal (SRS) resource. In an example embodiment, the one or more configuration parameters may comprise/indicate the one or more NTN configuration parameters for determining the offset.

In an example embodiment, the wireless device may determine the offset based on a round-trip transmission delay (RTT) between the wireless device and the base station (e.g., UE-gNB RTT). For example, the offset may be the UE-gNB RTT. Some example embodiments may allow the wireless device to determine/identify the uplink spatial domain transmission filter, for the PUSCH transmission, based on the UE-gNB RTT. For example, in response to movement/displacement of the NTN node/payload (e.g., satellite) and/or movement/displacement of the wireless device, the wireless device may maintain/update the UE-gNB RTT for determining/identifying the uplink spatial domain transmission filter, for the PUSCH transmission.

In an example embodiment, the wireless device may determine the offset based on a timing offset of an NTN (e.g., $K_{offset}$). In some examples, the timing offset may be a cell-specific timing offset (e.g., $K_{cell,offset}$ indicated by Cell-Specific_Koffset of the one or more NTN configuration parameters). In some other examples, the timing offset may be based on UE-specific timing offset (e.g., $K_{UE,offset}$). For example, the wireless device may determine UE-specific timing offset based on a differential timing offset indicated by a MAC CE command (e.g., a Differential Koffset MAC CE) and the cell-specific timing offset, e.g., the UE-specific timing offset may be a difference between the cell-specific timing offset and the differential timing offset.

In an example embodiment, the wireless device may determine/identify the most recent SRS transmission (e.g., for determining/identifying the uplink spatial domain transmission filter for the PUSCH transmission) based on an antenna polarization mode. For example, the most recent SRS transmission of the one or more SRS transmissions may occur the offset prior to the PDCCH monitoring occasion. In an example embodiment, the antenna polarization mode may correspond to an antenna polarization mode of the wireless device. The antenna polarization mode may, for example, correspond to an antenna polarization mode of the NTN node/payload (e.g., satellite). In an example embodiment, the wireless device may determine/identify the antenna polarization mode based on the PDCCH monitoring occasion and/or the DCI. In another example embodiment, the DCI may indicate the antenna polarization mode. In yet another example embodiment, the wireless device may receive the DCI based on the antenna polarization mode.

In an example embodiment, the wireless device may, for transmitting the PUSCH, determine the antenna polarization mode being the same as a first antenna polarization mode used for the most recent transmission of the SRS transmission. For example, the most recent SRS transmission of the one or more SRS transmissions may occur the offset prior to the PDCCH monitoring occasion.

In an example embodiment, the wireless device may use the first antenna polarization mode used for the most recent transmission of the SRS transmission for transmitting the PUSCH. For example, the most recent SRS transmission of the one or more SRS transmissions may occur the offset prior to the PDCCH monitoring occasion.

Some example embodiments may improve efficiency of PUSCH transmission (e.g., uplink beam management) by reducing possibility of miss/wrong beam alignment (or antennal polarization) between the wireless device and/or the base station. Some example embodiments, e.g., for transmitting uplink signals (e.g., PUSCHs), may improve efficiency of uplink transmission (e.g., by reducing uplink transmission latency and/or consumed power of the wireless device for transmitting PUSCHs).

Figure 22:
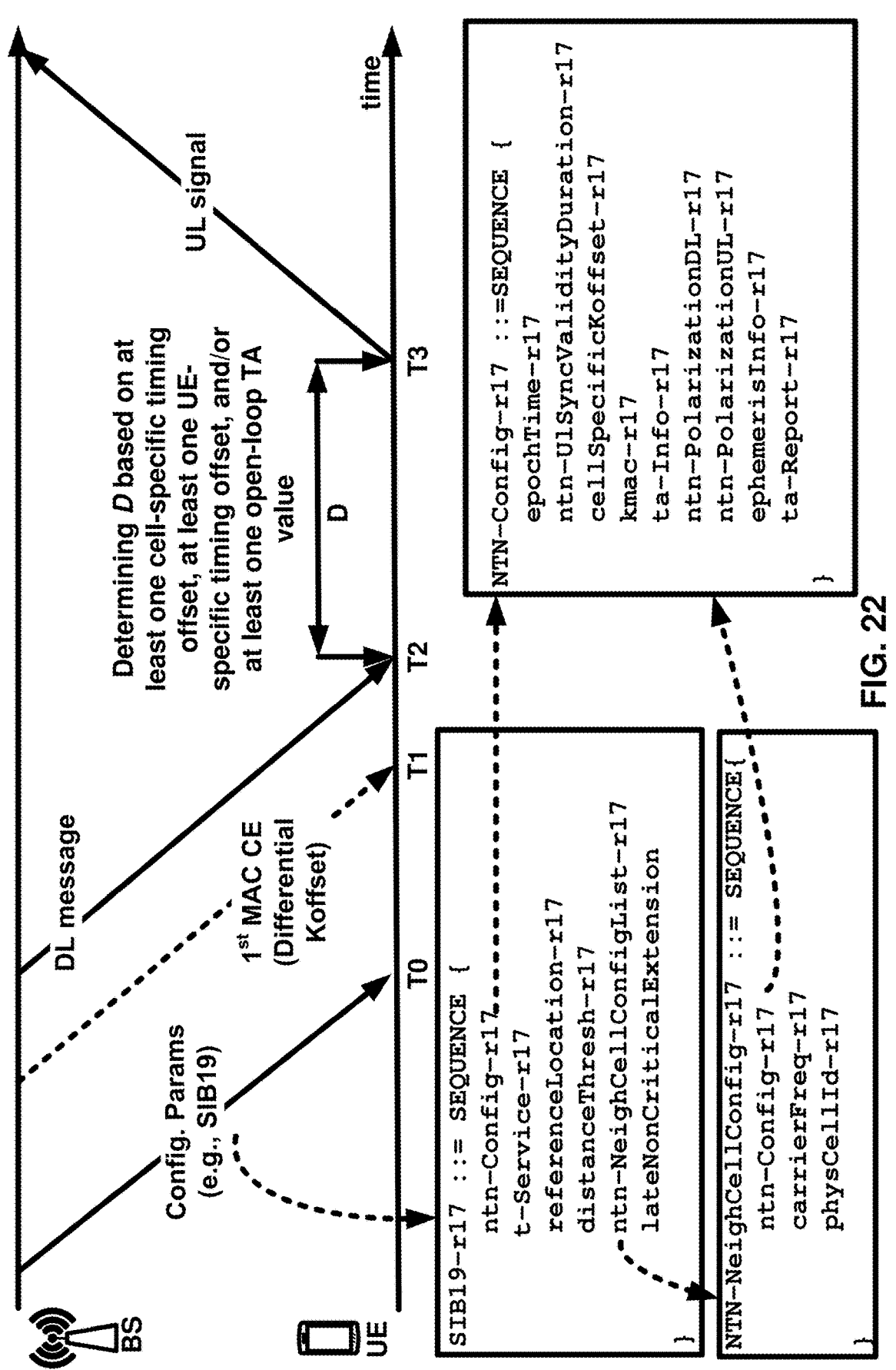
FIG. 22 shows an example embodiment of a procedure for uplink/downlink transmission in wireless communications systems per an aspect of the present disclosure.

FIG. 22 shows an example embodiment of a procedure for uplink/downlink transmission in wireless communications systems per an aspect of the present disclosure. In some scenarios, FIG. 22 may show an example embodiment of a procedure for determining transmission occasion of an UL signal (e.g., at a wireless device) and/or a reception occasion of the UL signal (e.g., at a base station). For example, FIG. 22 may illustrate an example of an uplink signal transmission (e.g., PUSCH/PUCCH/PRACH/SRS) at the wireless device in an RRC connected state/mode (e.g., an RRC_CO- NNECTED state) and/or in an RRC non-connected state/mode (e.g., an RRC_INACTIVE/IDLE state or an RRC_IDLE state).

The wireless device may, for example, communicate with the base station via a non-terrestrial network (NTN), e.g., the wireless device and the base station may operate in the NTN and/or the base station may be an NTN base station and/or a cell (e.g., a Serving Cell of one or more Serving Cells) may be part of the NTN. For example, the cell may be a Serving Cell or a non-Serving Cell.

As shown in FIG. 22, the wireless device may, from the base station and at time T0, receive the one or more configuration parameters (e.g., the one or more RRC configuration parameters). The one or more configuration parameters may, for example, comprise one or more serving cell (e.g., the one or more Serving Cells or the one or more cells) configuration parameters (e.g., ServingCellConfig-Common, ServingCellConfigCommonSIB, and/or Serving-CellConfig) for configuring one or more cells (e.g., the one or more Serving Cells).

For example, the one or more cells may comprise a master (or primary) cell group (MSG) and/or a secondary cell group (SCG). In some cases, a cell of the one or more cells may be a primary secondary cell (PSCell), or a primary cell (PCell), or a secondary cell (SCell), or a special cell (SpCell). In some other cases, a cell of the one or more cells may belong to a first cell group corresponding to a primary TAG (pTAG) or a second cell group corresponding to a secondary TAG (sTAG). For example, the one or more configuration parameters may configure the wireless device for multi-cell communication and/or carrier aggregation.

As shown in FIG. 22, the one or more configuration parameters may comprise the one or more NTN configuration parameters. For example, the wireless device may receive the one or more NTN configuration parameters by acquiring SIB1 and/or the NTN-specific SIB (e.g., SIB19).

In some cases, as shown in FIG. 22, the one or more NTN configuration parameters may comprise a plurality of NTN-specific configuration parameters (e.g., ntn-Config), e.g., one or more NTN-specific configuration parameters. For example, the one or more NTN configuration parameters may comprise the one or more ephemeris parameters (e.g., the satellite ephemeris data and/or at least one satellite ephemeris data/information), and/or the one or more common delay/TA parameters (e.g., at least one common TA/delay parameter) and/or a reference location (e.g., reference-Location) and/or antenna polarization mode(s) (e.g., vertical horizontal, right-hand circular, or left-hand circular) of at least one NTN node/payload. The base station may communicate with the wireless device via the at least one NTN node/payload (e.g., via at least one service link).

As shown in FIG. 22, a first NTN-specific configuration parameters of the plurality of the NTN-specific configuration parameters (or the one or more NTN configuration parameters) may correspond to a first Serving Cell of the one or more Serving Cells (e.g., NTN-Config-r17 IE of the NTN-specific SIB). For example, the one or more NTN configuration parameters may comprise one or more second NTN-specific configuration parameters corresponding to one or more NTN neighbor cells (e.g., NTN-Config-r17 IE of ntn-NeighCellConfigList IE of the NTN-specific SIB). For example, an NTN neighbor cell of the one or more NTN neighbor cells may be one of the one or more Serving Cells. In another example, an NTN neighbor cell of the one or more NTN neighbor cells may not be one of the one or more Serving Cells (e.g., may be a non-Serving Cell). In some examples, as shown in FIG. 22, an NTN neighbor cell of the one or more NTN neighbor cells may correspond to a physical cell ID (e.g., PhysCellId) and/or a carrier frequency.

In some examples, a cell of the one or more cells may be the (first) Serving Cell or a cell of the one or more NTN neighbor cells. For example, the cell may comprise one or more NTN nodes and/or one or more service links (e.g., for communicating with the wireless device). For example, the cell (e.g., the Serving Cell) may comprise one or more second cells (e.g., each cell of the one or more second cells may correspond to each of one or more service links or the one or more NTN nodes). For example, the one or more second cells may correspond to the SCG.

For example, an NTN-specific configuration parameters of the plurality of the NTN-specific configuration parameters (e.g., the first NTN-specific configuration parameters or a second NTN-specific configuration parameters of the one or more second NTN-specific configuration parameters) may comprise one or more corresponding ephemeris parameters (e.g., corresponding satellite ephemeris data, e.g., ephemerisInfo), and/or the one or more corresponding common delay/TA parameters (e.g., ta-Info) and/or one or more corresponding antenna polarization mode(s) (e.g., vertical horizontal, right-hand circular, or left-hand circular) for UL/DL communications on a corresponding service link (or a corresponding Serving Cell).

In some cases, a Serving Cell corresponding to an NTN-specific configuration parameters of the plurality of the NTN-specific configuration parameters may comprise a single NTN node/payload. The one or more corresponding ephemeris parameters (e.g., corresponding satellite ephemeris data, e.g., ephemerisInfo), and/or the one or more corresponding common delay/TA parameters (e.g., ta-Info) and/or the one or more corresponding antenna polarization mode(s) (e.g., vertical horizontal, right-hand circular, or left-hand circular) may correspond to a service link corresponding to the single NTN node.

In some other cases, a Serving Cell corresponding to an NTN-specific configuration parameters of the plurality of the NTN-specific configuration parameters may comprise one or more NTN nodes/payloads. The one or more corresponding ephemeris parameters (e.g., corresponding satellite ephemeris data, e.g., ephemerisInfo), and/or the one or more corresponding common delay/TA parameters (e.g., ta-Info) and/or the one or more corresponding antenna polarization mode(s) (e.g., vertical horizontal, right-hand circular, or left-hand circular) may, for example, correspond to one or more service links corresponding to the one or more NTN nodes/payloads.

For example, the wireless device may determine at least one common TA/delay using/based on the one or more common TA parameters of the plurality of NTN-specific configuration parameters. Each common TA/delay of the at least one common TA/delay may correspond to a TAG and/or a Serving Cell of the one or more Serving Cells and/or an NTN node of the one or more NTN nodes. The at least one common TA/delay may correspond to one or more TAGS (e.g., a primary TAG or a secondary TAG). A common TA/delay of the at least one common TA/delay may correspond to a Serving Cell (e.g., the one or more Serving Cells) and/or a non-Serving Cell (e.g., of one or more non-Serving Cells). In some examples, a common TA/delay of at least one common TA/delay may correspond to a feeder link of a Serving Cell or a feeder link of a non-Serving Cell. The wireless device may determine a common TA/delay of at least one common TA/delay based on one or more common TA parameters of a corresponding NTN-specific configuration parameters of the plurality of the NTN-specific configuration parameters.

For example, the wireless device may determine at least one service link delay using/based on the one or more ephemeris parameters of the plurality of NTN-specific configuration parameters. Each service link delay of the at least one service link delay may correspond to a TAG and/or a Serving Cell of the one or more Serving Cells and/or an NTN node of the one or more NTN nodes. The at least one service link delay may correspond to one or more TAGS (e.g., a primary TAG or a secondary TAG). A common TA/delay of the at least one service link delay may correspond to a Serving Cell (e.g., the one or more Serving Cells) and/or a non-Serving Cell (e.g., of one or more non-Serving Cells). In some examples, a service link delay of at least one service link delay may correspond to a service link of a Serving Cell or a service link of a non-Serving Cell. The wireless device may determine a service link delay of at least one service link delay based on one or more ephemeris parameters of a corresponding NTN-specific configuration parameters of the plurality of the NTN-specific configuration parameters.

For example, the wireless device may determine at least one open-loop TA (e.g., each open-loop TA of the at least one open-loop TA may correspond to a TAG or a Serving Cell of the one or more Serving Cells and/or an NTN node of the one or more NTN nodes) using/based on the plurality of NTN-specific configuration parameters. The at least one open-loop TA may correspond to one or more TAGS (e.g., a primary TAG or a secondary TAG). An open-loop TA of the at least one open-loop TA may correspond to a Serving Cell (e.g., the one or more Serving Cells) and/or a non-Serving Cell (e.g., of one or more non-Serving Cells). In some examples, an open-loop TA of at least one open-loop TA may correspond to an NTN node of the at least one NTN node. The wireless device may determine/obtain/calculate/estimate an open-loop TA of at least one open-loop TA based on a corresponding common TA/delay and/or a corresponding service link delay. For example, the wireless device may, corresponding to an open-loop TA of at least one open-loop TA, determine a corresponding UE-gNB RTT.

For example, the wireless device may determine/maintain/calculate at least one TA value (e.g., each TA value of the at least one TA value may correspond to a TAG or a Serving Cell of the one or more Serving Cells) using/based on the at least one open-loop TA and/or one or more TAC MAC CEs. The one or more TAC MAC CEs may be received, by the wireless device, from the one or more Serving Cells or the Serving Cell or the at least one Serving Cell. For example, a first (or each) TAC MAC CE of the one or more TAC MAC CEs may comprise a first TA fix/correction/update (or a first TA value) and at least one first index/ID. The at least one first index/ID may be one of the following: a first TAG ID, and/or a first cell ID, and/or a first beam ID, and/or a first NTN node ID/index, and/or the like. Based on receiving the first TAC MAC CE of the one or more TAC MAC CEs, the wireless device may calculate/maintain/update/determine a TA value of the at least one TA value corresponding to the indicated the at least one first TAG ID. The at least one TA value may correspond to one or more TAGS (e.g., a primary TAG or a secondary TAG). A TA value of the at least one TA value may correspond to a Serving Cell (e.g., the one or more Serving Cells) and/or a non-Serving Cell (e.g., of one or more non-Serving Cells). In some examples, a TA value of at least one TA value may correspond to an NTN node of the at least one NTN node.

For example, the wireless device may determine at least one UE-gNB RTT (e.g., each UE-gNB RTT of the at least one UE-gNB RTT may correspond to a TAG or a Serving Cell of the one or more Serving Cells) using/based on the plurality of NTN-specific configuration parameters. The at least one UE-gNB RTT may correspond to one or more TAGs (e.g., a primary TAG or a secondary TAG). A UE-gNB RTT of the at least one UE-gNB RTT may correspond to a Serving Cell (e.g., the one or more Serving Cells) and/or a non-Serving Cell (e.g., of one or more non-Serving Cells). In some examples, a UE-gNB RTT of at least one UE-gNB RTT may correspond to an NTN node of the at least one NTN node. The wireless device may determine/estimate/calculate a UE-gNB RTT of at least one UE-gNB RTT based on a corresponding open-loop TA (a corresponding TA value) and/or a corresponding MAC-layer timing offset (e.g., K-Mac). In some examples, the wireless device may determine a UE-gNB RTT of the at least one UE-gNB RTT based on (e.g., by summing) the corresponding open-loop TA value (or a corresponding TA value) of the at least one open-loop TA value (e.g., in ms/slots/symbols/subframes) and a corresponding MAC-layer timing offset (e.g., K-Mac) (e.g., in ms/slots/symbols/subframes).

In an example, as shown in FIG. 22, each NTN-specific configuration parameter of the plurality of NTN-specific configuration parameters may comprise an MAC-layer timing offset (e.g., K-Mac or Kmac), e.g., corresponding to a feeder link and/or an NTN node and/or a Serving Cell and/or a non-Serving Cell, or the like. For example, the one or more NTN configuration parameters may indicate one or more MAC-layer timing offsets corresponding to the one or more feeder links and/or the one or more Serving Cells. For example, the one or more NTN configuration parameters may indicate a first MAC-layer timing offset of the one or more MAC-layer timing offsets corresponding to the primary TAG. In some examples, the one or more NTN configuration parameters may indicate a second MAC-layer timing offset of the one or more MAC-layer timing offsets corresponding to the secondary TAG.

For example, the one or more NTN configuration parameters may indicate a first MAC-layer timing offset of the one or more MAC-layer timing offsets corresponding to the primary TAG or a first cell group (e.g., the MSG). In some examples, the one or more NTN configuration parameters may indicate a second MAC-layer timing offset of the one or more MAC-layer timing offsets corresponding to the secondary TAG and/or a second cell group (e.g., the SCG).

In an example, each NTN-specific configuration parameter of the plurality of NTN-specific configuration parameters may comprise a cell-specific timing offset (e.g., Cell-Specific_K_offset), e.g., corresponding to a Serving Cell or a TAG or a service link of the Serving Cell or an NTN node of the Serving Cell, or the like. For example, the one or more NTN configuration parameters may indicate one or more (or at least one) cell-specific timing offsets corresponding to the one or more service links and/or one or more NTN nodes/payloads and/or the one or more cells (e.g., the one or more Serving Cells). For example, the base station may determine/estimate/calculate the cell-specific timing offset (e.g., CellSpecific_K_offset), e.g., corresponding to the Serving Cell or the TAG or the service link of the Serving Cell or the NTN node of the Serving Cell, based on a maximum propagation delay of a cell (e.g., the Serving Cell or the TAG or the service link of the Serving Cell or the NTN node of the Serving Cell), e.g., the Serving Cell.

For example, the one or more NTN configuration parameters may indicate a first cell-specific timing offset of the one or more cell-specific timing offsets corresponding to the primary TAG or a first cell group (e.g., the MSG). In some examples, the one or more NTN configuration parameters may indicate a second cell-specific timing offset of the one or more cell-specific timing offsets corresponding to the secondary TAG and/or a second cell group (e.g., the SCG).

For example, the wireless device may use the one or more NTN configuration parameters to determine/measure/calculate/maintain/update/estimate the at least one open-loop TA value of the wireless device and/or the at least one common TA/delay and/or the at least one service link delay and/or the at least one UE-gNB RTT and/or at least one TA value. In some cases, each TA value of the at least one TA value (and/or each open-loop TA value of the at least one open-loop TA value and/or each cell-specific timing offset of the at least one cell-specific timing offset and/or each MAC-layer timing offset of the at least one MAC-layer timing offset) may correspond to a Serving Cell and/or a service link and/or a TAG and/or an NTN node and/or a feeder link, and/or the like.

In some other cases, the wireless device may, based on the one or more NTN configuration parameters, determine/measure/maintain one or more NTN-specific parameters/values. In some implementations, the one or more NTN-specific parameters/values (and/or the one or more NTN configuration parameters) may comprise a type of NTN payload (e.g., a GEO satellite, a MEO satellite, a LEO satellite, and/or a HAPS) corresponding to the at least one Serving Cell. In some implementations, the one or more NTN-specific parameters/values (and/or the one or more NTN configuration parameters) may comprise a type of the cell/beam (e.g., an Earth-fixed cell/beam or an Earth-moving cell/beam) corresponding to the at least one Serving Cell or one or more non-Serving Cells. In some cases, the wireless device may determine at least one location information (or position) of the at least one NTN node/payload based on the one or more NTN configuration parameters and/or the one or more NTN-specific parameters/values. For example, the wireless device may use the one or more NTN configuration parameters (e.g., the one or more ephemeris parameters and/or the one or more common delay/TA parameters and/or referenceLocation) to calculate/determine/maintain/update the at least one location information of the at least one NTN node/payload (e.g., satellite).

the wireless device may maintain/obtain UL synchronization of the one or more cells in response to acquiring/reacquiring the NTN-specific SIB and/or SIB1 (e.g., receiving the one or more NTN configuration parameters). For example, the wireless device may determine whether UL synchronization of a first cell of the one or more cells and/or a second cell of the one or more cells being lost or not.

In some cases, in response to obtaining the UL synchronization of the first cell of the one or more cells (e.g., based on receiving the one or more NTN configuration parameters or receiving the one or more NTN configuration parameters corresponding to the first cell), the wireless device may determine the UL synchronization of the second cell of the one or more cells being obtained/maintained. For example, in response to losing the UL synchronization of the first cell of the one or more cells, the wireless device may determine the UL synchronization of the second cell of the one or more cells being lost. For example, the first cell may correspond to the primary TAG. In some cases, the first cell may be the cell that the wireless device is receiving the NTN-specific SIB and/or SIB1. In some cases, the first cell may be a PCell and/or be a cell of the MSG. For example, the wireless device may determine the UL synchronization of the second cell being lost based on a validity timer of the first cell being expired. For example, the wireless device may determine the UL synchronization of the second cell being obtained based on the validity timer of the first cell being running.

In some examples, the wireless device may obtain/maintain UL synchronization of the second cell independently from the UL synchronization of the first cell. For example, the wireless device may not determine the UL synchronization of the second cell being lost in response to the UL synchronization of the first cell being lost. In another example, the wireless device may not determine the UL synchronization of the second cell being obtained in response to the UL synchronization of the first cell being obtained. For example, the wireless device may determine the UL synchronization of the second cell being lost based on a validity timer of the second cell being expired. The wireless device may, for example, determine the UL synchronization of the second cell being obtained based on the validity timer of the second cell being running.

In an example, an NTN-specific configuration parameters of the plurality of the NTN-specific configuration parameters may comprise a duration ntn-UISyncValidityDuration and/or an epochTime. In some cases, the wireless device may start/restart at least one validity timer/window/period/duration (e.g., with the duration UISyncValidityDuration) based on acquiring/reacquiring the NTN-specific SIB and/or SIB1 (e.g., receiving the one or more NTN configuration parameters). A validity timer (e.g., T430 timer) of the at least one validity timer may correspond to a cell (e.g., the Serving Cell or an NTN neighbor cell) of the one or more cells and/or a TAG (e.g., the primary TAG or the secondary TAG) and/or a service link of the at least one service link and/or an NTN node or the at least one NTN node and/or a cell group (e.g., the PCG or SCG).

In an embodiment, e.g., in the RRC inactive/idle state, the wireless device may start/restart a (each) validity timer (e.g., corresponding to a cell of the one or more cells, e.g., a Serving Cell of the one or more Serving Cells, and/or TAG and/or a service link and/or a cell group) in response to receiving the one or more NTN configuration parameters, e.g., an NTN-specific configuration parameters corresponding to the cell (e.g., Serving Cell) and/or TAG and/or a service link and/or a cell group. For example, the wireless device may start/restart the validity timer (e.g., of the Serving Cell) with a duration ntn-UISyncValidityDuration of the corresponding NTN-specific configuration parameters from a subframe indicated by an epoch Time of the corresponding NTN-specific configuration parameters. In some scenarios, the wireless device may determine the epoch Time based on a subframe that the corresponding NTN-specific configuration parameters (and/or the NTN-specific SIB or SIB1) is received/acquired and/or a system information (SI) modification window and/or an SFN. The wireless device may require (or attempt to re-acquire) the NTN-specific SIB (e.g., SIB19) and/or SIB1 before expiry of a validity timer of the at least one validity timer (e.g., before an end of the duration indicated by ntn-UISyncValidityDuration of the NTN-specific configuration parameters of the corresponding Serving Cell).

In an example, in response to a validity timer of the at least one validity timer (e.g., corresponding to a Serving Cell of the one or more Serving Cells and/or a non-Serving Cell) being expired, the wireless device may determine UL synchronization of each Serving Cell of the one or more Serving Cells being lost (e.g., the wireless device may stop the at least one validity timer, if running). For example, the wireless device (re)-acquire the NTN-specific SIB and/or SIB1.

For example, based on the validity timer corresponding to a cell of the one or more cells (e.g., a PCell or a cell in the pTAG or a cell in MCG or a PsCell) being expired, the wireless device may determine UL synchronization of each Serving Cell of the one or more Serving Cells being lost (e.g., the wireless device may stop the at least one validity timer, if running).

In an example, in response to a validity timer of the at least one validity timer (e.g., corresponding to a Serving Cell of the one or more Serving Cells) being expired, the wireless device may determine UL synchronization of the Serving Cell of the one or more Serving Cells being lost. For example, the wireless device (re)-acquire the NTN-specific SIB and/or SIB1.

In some other cases, corresponding to each open-loop TA value of the at least one TA value (or a TAG or a Serving Cell of the one or more Service Cells), the wireless device may run/maintain/start/restart a validity timer/window/duration. In response to a validity timer corresponding to a TAG or a Serving Cell being expired, the wireless device may determine UL synchronization of the corresponding Serving Cell (or each Serving Cell of the one or more Serving Cells or a corresponding non-Serving Cell) being lost. For example, the wireless device (re)-acquires the NTN-specific SIB and/or SIB1 and/or corresponding NTN-specific configuration parameters.

In some implementations, the wireless device may transmit a UE-capability message to the base station. The UE capability message may indicate a capability of the wireless device for (simultaneously) maintaining/estimating/updating/measuring/calculating the at least one open-loop TA value of the wireless device (and/or the at least one UE-gNB RTT). In other implementations, the UE-capability message may indicate a capability of the wireless device for maintaining (e.g., running, starting, restarting) the at least one validity timer corresponding to the one or more Serving Cells (e.g., comprising the Serving Cell and the one or more NTN neighbor cells). In other implementations, the UE-capability message may indicate a capability of the wireless device for maintaining (e.g., running, starting, restarting) a single validity timer corresponding to all Serving Cells (e.g., comprising the Serving Cell and the one or more NTN neighbor cells).

For example, the UE-capability message may indicate a capability of the wireless device for simultaneously communicating to the base station via the at least one NTN node/payload and/or at least one service link (and/or at least one feeder link). For example, an NTN node of the at least one NTN node may correspond to a Serving Cell. In some other cases, an NTN node of the at least one NTN node may correspond to a non-Serving Cell. In some examples, the at least one NTN node may correspond to different Serving Cells.

In the example shown in FIG. 22, the base station may transmit, to the wireless device, a DL message (e.g., a DCI or a RAR or a fallback RAR) via a DL signal (e.g., PDCCH or PDSCH), e.g., comprising repetition. The wireless device may receive the DL message during a reception occasion/time/interval T2. For example, the DL message may schedule/indicate a transmission of an uplink signal (e.g., a PUSCH or a PUCCH or a PRACH or an SRS), e.g., with/comprising repetition. The wireless device may transmit UL data and/or UCI and/or preamble and/or SRS resource via/based on the UL signal. For example, the DL message may trigger/indicate/order a transmission of the PRACH (e.g., the UL signal may be the ordered PRACH). For example, the DL message may trigger/indicate/order a transmission of an aperiodic CSI-RS (e.g., the UL signal may be the ordered aperiodic CSI-RS). For example, the DL message may trigger/indicate/order a transmission of an aperiodic SRS (e.g., the UL signal may be the ordered aperiodic SRS). In some cases, the UL signal may be for transmitting at least one transport block (TB). In some other cases, the UL signal may be for transmitting at least one CSI-RS report (e.g., the aperiodic CSI-RS) and/or the at least one SRS resource (e.g., the ordered aperiodic SRS).

In an embodiment, for transmitting the UL signal, the wireless device may, based on the DL message and the one or more NTN configuration parameters (e.g., the at least one TA value and/or the at least one cell-specific timing offset and/or the at least one open-loop TA value), determine a transmission time/occasion/resource/interval of the UL signal (e.g., time T3 in FIG. 22), e.g., in the UL configuration/frame, with respect to a reception time/occasion/resource/interval of the DL message/signal (e.g., time T2 in FIG. 22). The transmission occasion of the UL signal may be D ms (or symbols or slots or subframes) ahead of the receiving the DL message (e.g., in the DL configuration/frame), e.g., (a time/slot/symbol/subframe) difference between the transmission occasion of the UL signal and receiving the DL message is D. For example, a first/initial/starting/earliest symbol of the UL signal may be D symbols/slots/subframes/milliseconds away from (or ahead of) a last/final/ending/latest symbol of the DL message.

In some examples, for transmitting the UL signal (or for determining the transmission time/occasion/resource/interval of the UL signal and/or for determining D), the wireless device may select/choose/determine at least one of: a cell-specific timing offset among/from the at least one cell-specific timing offset, and/or a TA value among/from the at least one TA value, and/or an open-loop TA value among/from the at least one open-loop TA value. For example, based on a first cell of the one or more cells and/or a second cell of the one or more cells, the wireless device may select/choose/determine the cell-specific timing offset, and/or the TA value, and/or the open-loop TA value. For example, the wireless device may receive the DL message, from the base station, via/on the first cell (e.g., the first cell may be a scheduling cell). The wireless device may, to the base station via/on the second cell, transmit the UL signal (e.g., the second cell may be a scheduled cell). For example, the first cell and/or the second cell may be the Serving Cell. In some cases, the first cell may be different than the second cell. In some other cases, the first cell may be different from the second cell. For example, the wireless device may determine UL synchronization of the second cell being maintained/obtained (or not being lost), e.g., a validity timer corresponding to the second cell being running. For example, the wireless device may determine a time alignment timer corresponding to the second cell (e.g., the second cell may correspond to the primary TAG or the secondary TAG) being running.

In another example, based on a first service link of the at least one service link and/or a second service link of the at least one service link, the wireless device may select/choose/determine the cell-specific timing offset, and/or the TA value, and/or the open-loop TA value. For example, the first service link and the second service link may correspond to a first NTN node (e.g., of the at least one NTN node) and a second NTN node (e.g., of the at least one NTN node). In some cases, the first service link and the second service link may correspond to a same cell (e.g., the first cell or the second cell) and/or a same TAG (e.g., the primary TAG or the secondary TAG) and/or a same cell group (e.g., the MCG or the SCG). In some other cases, the first service link and the second service link may correspond to different cells and/or different TAGs and/or different cell groups.

In some examples, the wireless device may further determine the transmission time/occasion/resource/interval of the UL signal (or to determine D) based on a differential timing offset (and/or a UE-specific timing offset). The wireless device may determine the differential timing offset based on receiving, from the base station, a first MAC CE (e.g., a Differential Koffset MAC CE or an enhanced Differential Koffset MAC CE) and the (selected) cell-specific timing offset. As shown in FIG. 22, at time T1, the wireless device may receive the first MAC CE from the base station.

The first MAC CE may indicate the differential timing offset. For example, the wireless device may determine the UE-specific timing offset based on a difference between the cell-specific timing offset and the (indicated) differential timing offset by the first MAC CE. In some cases, the indicated differential timing offset by the first MAC CE may be for a (particular) cell (e.g., the Serving Cell). In some other cases, the indicated differential timing offset by the first MAC CE may correspond to a TAG (e.g., the primary TAG or the secondary TAG). In some other cases, the indicated differential timing offset by the first MAC CE by the first MAC CE may correspond to a cell group (e.g., the MCG or the SCG). In yet some other cases, the indicated differential timing offset by the first MAC CE by the first MAC CE may correspond to a service link of the at least one service link (or an NTN node of at least one NTN node).

In some implementations, the first MAC CE may indicate at least one differential timing offset. A first (or each) differential timing offset of the at least one differential timing offset may correspond to a cell of the one or more cells (e.g., the Serving cell) and/or a TAG (e.g., the primary TAG or the secondary TAG) and/or a service link of the at least one service link and/or an NTN node of the at least one NTN node and/or a cell group (e.g., the MCG or the SCG). The wireless device may determine the UE-specific timing offset based on a difference between the cell-specific timing offset and a (e.g., the first) differential timing offset of the at least one differential timing offset. For example, the wireless device may select/choose/determine the differential timing offset among/from the at least one differential timing offset based on a cell of the one or more cells (e.g., the first cell, the second cell, and/or the Serving cell) and/or the TAG (e.g., the primary TAG or the secondary TAG) and/or the service link of the at least one service link and/or the NTN node of the at least one NTN node and/or a cell group (e.g., the MCG or the SCG). In some case, the cell may be a third cell for receiving, by the wireless device from the base station, the first MAC CE.

For example, the wireless device may scale the determined/selected cell-specific timing offset (or the selected/determined UE-specific timing offset) with a first value (e.g., to obtain $$K_{offset} \cdot \frac{2^{\mu_{\square\square\square\square}}}{2^{\mu_{\square\square\square\square\square\square}}}).$$

The first value may be based on a SCS (configuration) of the second cell (e.g., the scheduled cell), $2^{\mu_{\square00000}}$, and/or a SCS configuration of the determined/selected cell-specific timing offset (or the selected/determined UE-specific timing offset), e.g., $\mu_{K_{00000}}$, In some examples, the transmission time/occasion/interval of the UL signal may further be based on a timing offset K (e.g., K2 or K1), one or more numerologies (e.g., a numerology that is used for transmission of the UL signal and a numerology that is used for reception of the DL message). The timing offset parameter K may indicate a timing offset for transmission of the UL signal in response to receiving the DL message.

In some cases, the timing offset may further be based on a higher layer parameter (e.g., indicated/configured by the one or more configuration parameters) indicating a first carrier aggregation slot offset (e.g., ca-SlotOffset) of the first cell (e.g., the scheduling cell, e.g., the cell the wireless device receives the PDCCH) and/or a second carrier aggregation slot offset (e.g., ca-SlotOffset) of the second cell (e.g., the scheduled cell, e.g., the cell the wireless device transmits the PUSCH). For example, the wireless device may, based on the first carrier aggregation slot offset, determine $$N_{slot,offset,PDCCH}^{CA}$$

and $\mu_{offset,PDCCH}$ to determine the transmission time/occasion/interval of the PUSCH. The wireless device may, for example, based on the second carrier aggregation slot offset, determine $$N_{slot,offset,PUSCH}^{CA}$$

and $\mu_{offset,PUSCH}$ to determine the transmission time/occasion/interval of the PUSCH.

For example, the DCI may comprise a field (e.g., a 'Time domain resource assignment'). The field (or the value of the field) may indicate a first scheduling offset, e.g., by providing/indicating a row of a resource allocation table. The wireless device may, for example, determine the timing offset based on the first scheduling offset and/or the one or more configuration parameters (e.g., one or more resource allocation tables).

In some cases, the DL message may be a RAR/fallback-RAR comprising a field (e.g., a 'PUSCH time resource allocation'). The field (or the value of the field) may indicate a first scheduling offset, e.g., by providing/indicating a row of a resource allocation table. The wireless device may, for example, determine the timing offset based on the first scheduling offset and/or the one or more configuration parameters (e.g., one or more resource allocation tables).

For example, the wireless device may determine the timing offset based on an indication of timing for transmission of a PUCCH comprising an uplink control information (UCI), e.g., HARQ-ACK/NACK information bits corresponding to the DL. For example, the DL message transmission may be indicated/triggered (e.g., by the base station) by a first DCI. The wireless device may receive the first DCI scheduling/indicating the DL message transmission. In an example, the first DCI may schedule/indicate transmission of the PDSCH (e.g., the DL message). For example, the DCI may comprise a field (e.g., a 'PDSCH-to-HARQ_feedback timing indicator'). The field (or the value of the field) may indicate the first scheduling offset. The wireless device may, for example, determine the timing offset based on the first scheduling offset, reception time/occasion of the PDSCH (e.g., the DL message) and/or the one or more configuration parameters.

In another example, when the DL message comprises a DL semi-persistent scheduling (SPS) transmission, the first scheduling offset may be an indication of timing for transmission of the PUCCH (comprising the UCI) with accordance to (or using or indicated by) the one or more configuration parameters (e.g., SPS-Config and/or PUCCH-Config). The wireless device may determine the timing offset based on the first scheduling offset and/or the one or more configuration parameters. The one or more configuration parameters (e.g., SPS-Config) may configure the wireless device with a periodicity of the DL data transmission.

In an example, transmitting the UL signal may be based on at least one (physical layer) preparation/processing time of the wireless device (e.g., PUSCH/PDSCH/PUCCH processing/preparation time). In some cases, based on a first/initial/earliest/stating symbol of the UL signal, in the UL configuration/frame, including DM-RS, being no earlier (or later than) than at a symbol (e.g., a symbol L2 or a symbol L1), the wireless device may transmit the UL signal. In an example, the wireless device may determine the symbol based on the at least one preparation/processing time of the wireless device and/or the determined D.

In some implementations, based on the transmission time/occasion/interval of the UL signal (in the UL frame/configuration) being within a first processing window (or duration or time gap or time distance) from the reception time/occasion/interval of the DL message (in the DL frame/configuration), the wireless device may not transmit the UL signal. For example, based on the transmission time/occasion/interval of the UL signal (in the UL frame frame/configuration) being after (or outside of) the first processing window from the reception time/occasion/interval of the DL message (in the DL frame frame/configuration), the wireless device may transmit the UL signal.

In an example, the symbol (e.g., the symbol L2 or the symbol L1) corresponding to the UL signal (e.g., the PUSCH) may be based on the determined transmission occasion of the UL signal, one or more numerologies (e.g., a numerology that is used for transmission of the UL signal and a numerology that is used for reception of the DL message), the timing offset K (e.g., K2) and/or a start and length indication for time domain allocation (SLIV) of the PUSCH. The wireless device may determine the timing offset based on the DL message (e.g., the first DCI), the first scheduling offset, and/or the one or more configuration parameters. In an example, the symbol, corresponding to the UL signal, may further be based on an uplink symbol with its cyclic prefix (CP). In some cases, for transmitting the UL signal, the symbol, corresponding to the UL signal, may not be within the first processing window (or duration) after the receiving (e.g., a last/final/ending/latest symbol of) the DL message (e.g., the reception of the last/final/ending/latest symbol of PDCCH carrying/comprising the DCI scheduling the UL signal, e.g., the PUSCH). For example, the length of the first processing window may be based on at least one preparation/processing time of the wireless device (e.g., $T_{proc,2}$ and/or $T_{proc,1}$). For example, based on the symbol, corresponding to the UL signal, being within the first processing window from/after the receiving of the DL message, the wireless device may not transmit the UL signal.

In an example, when the transmission of the UL signal comprises transmitting a HARQ feedback (transmitting the UCI via the PUCCH) of the PDSCH, a first/earliest/starting/initial symbol of the PUCCH, in the UL configuration/frame, may not be within the first processing window (e.g., with the length $T_{proc,1}$) after a last/final/ending/latest symbol of the PDSCH reception, in the DL frame/configuration, associated with the HARQ-ACK information. In an example, the first/earlies/starting/initial (uplink) symbol of the PUCCH may start no earlier than at the symbol (e.g., the symbol L2 or the symbol L1), e.g., in the UL configuration/frame, corresponding to the UL signal. In some cases, the symbol, corresponding to the UL signal, may be based on an uplink symbol with its Cyclic Prefix (CP).

In an example, based on the symbol, corresponding to the UL signal, being within the first processing window from/ after the receiving of the DL message, the wireless device may not transmit the UL signal. For example, based on the symbol, corresponding to the UL signal, being outside of the first processing window from/after the receiving of the DL message, the wireless device may not transmit the UL signal.

For example, the wireless device may determine UL synchronization of the second cell being lost, e.g., a validity timer corresponding to the second cell being expired. The wireless device may refrain from transmitting the UL signal.

Figure 23:
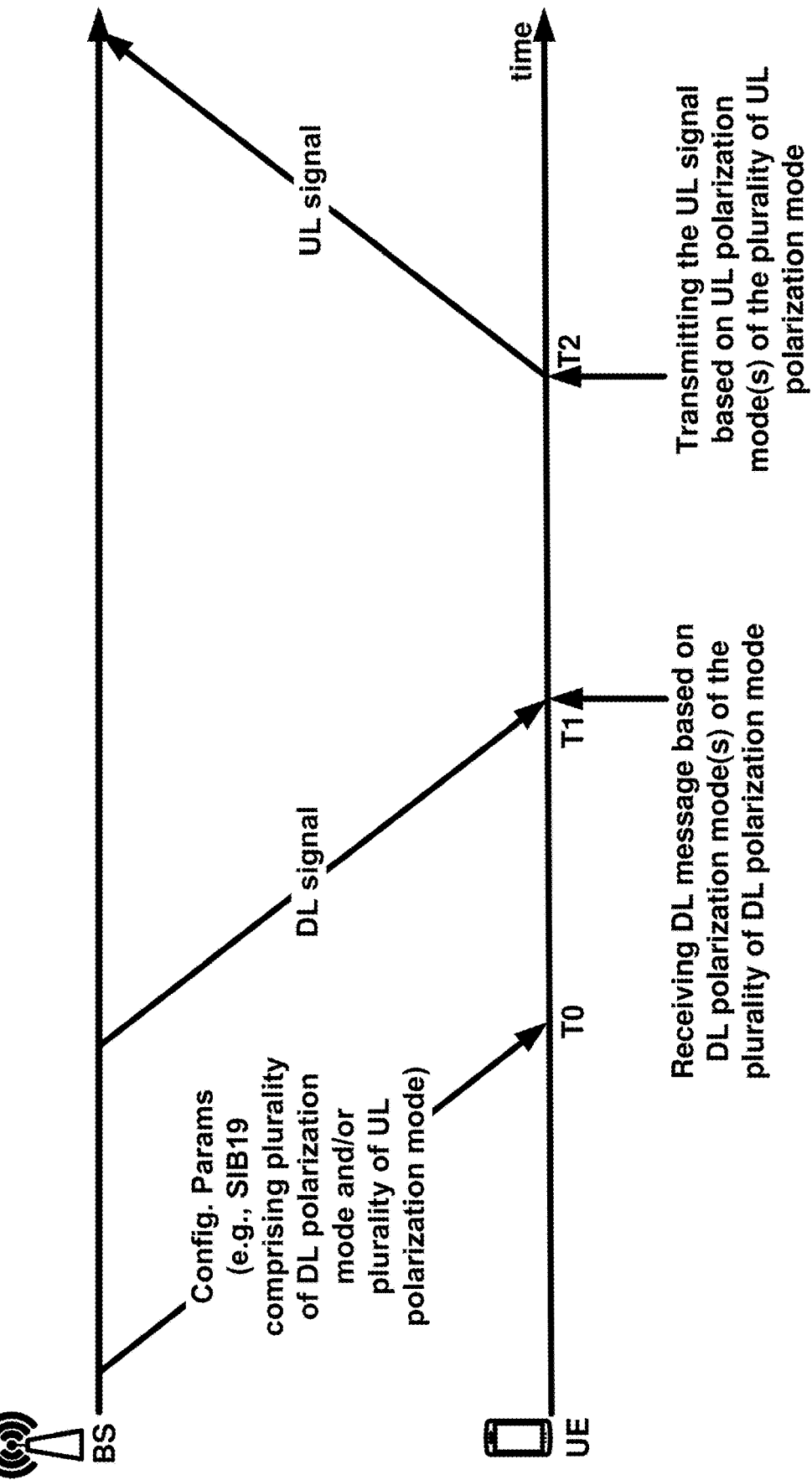
FIG. 23 shows an example embodiment of a procedure for uplink/downlink transmission in wireless communications systems per an aspect of the present disclosure.

FIG. 23 shows an example embodiment of a procedure for uplink/downlink transmission in wireless communications systems per an aspect of the present disclosure. In some scenarios, FIG. 23 may show an example embodiment of a procedure for determining a UL polarization mode/information for transmission of an UL signal (e.g., the UL signal of FIG. 21A). FIG. 23 may show an example of a procedure for determining a DL polarization mode/information for reception of a DL signal (e.g., the DL message of FIG. 22). For example, the wireless device may be in an RRC inactive state/mode, and/or an RRC idle mode/state, and/or an RRC connected state/mode.

The wireless device may, for example, communicate with the base station via a non-terrestrial network (NTN), e.g., the wireless device and the base station may operate in the NTN and/or the base station may be an NTN base station and/or a cell (e.g., a Serving Cell of one or more Serving Cells) may be part of the NTN. For example, the cell may be a Serving Cell or a non-Serving Cell.

As shown in FIG. 23, the wireless device may, from the base station and at time TO, receive the one or more configuration parameters (e.g., the one or more RRC configuration parameters). The one or more configuration parameters may, for example, comprise one or more serving cell (e.g., the one or more Serving Cells or the one or more cells) configuration parameters (e.g., ServingCellConfig-Common, ServingCellConfigCommonSIB, and/or Serving-CellConfig) for configuring one or more cells (e.g., the one or more Serving Cells). For example, the one or more cells may comprise a master (or primary) cell group (MSG) and/or a secondary cell group (SCG). In some cases, a cell of the one or more cells may be a primary secondary cell (PSCell), or a primary cell (PCell), or a secondary cell (SCell), or a special cell (SpCell). In some other cases, a cell of the one or more cells may belong to a first cell group corresponding to a primary TAG (pTAG) or a second cell group corresponding to a secondary TAG (sTAG). For example, the one or more configuration parameters may configure the wireless device for multi-cell communication and/or carrier aggregation.

As shown in FIG. 23, the one or more configuration parameters may comprise the one or more NTN configuration parameters. For example, the wireless device may receive the one or more NTN configuration parameters by acquiring SIB1 and/or the NTN-specific SIB (e.g., SIB19). For example, the one or more NTN configuration parameters may comprise the plurality of the NTN-specific configuration parameters.

As shown in FIG. 23, the one or more NTN configuration parameters may comprise a plurality of DL antenna polarization modes and/or a plurality of UL antenna polarization modes. For example, an (or each) NTN-specific configuration parameters (e.g., corresponding to a cell of the one or more cells and/or a service link of the at least one service link) of the plurality of the NTN-specific configuration parameters may comprise at least one (antenna) polarization mode/information of the plurality of DL antenna polarization modes. For example, the at least one antenna polarization mode corresponding to a first NTN-specific configuration parameters may comprise at least one DL antenna polarization mode (e.g., ntn-PolarizationDL). The at least one DL antenna polarization mode may indicate polarization information/mode(s) for DL transmissions (e.g., PDCCH/PDSCH/SSB transmissions), between the base station and the wireless device, on/via a first service link (e.g., the service link of a first cell corresponding to the NTN-specific configuration parameters) of the at least one service link. For example, the at least one antenna polarization mode corresponding to the first NTN-specific configuration parameters may comprise at least one UL antenna polarization mode (e.g., ntn-PolarizationUL). The at least one UL antenna polarization mode/information (e.g., ntn-PolarizationUL) may indicate polarization information/mode(s) for UL transmissions (e.g., PUSCH/PUCCH/PRACH/SRS transmissions), between the base station and the wireless device, on/via a second service link (e.g., the service link of a second cell corresponding to the NTN-specific configuration parameters) of the at least one service link. In an example, the first cell may be the same as the second cell. In another example, the first cell may be different than the second cell. For example, the first cell may be a scheduling cell and the second cell may be a scheduled cell.

As shown in FIG. 23, for receiving a DL signal (e.g., the DL signal, PDCCH/PDSCH/CSI-RS, and the like) at time/ occasion/interval T1, the wireless device may determine one or more DL antenna polarization modes among/from the plurality of DL antenna polarization modes. The wireless device may receive the DL signal based on the one or more DL antenna polarization modes among/from the plurality of DL antenna polarization modes. For example, using the one or more DL antenna polarization modes for receiving the DL signal, the wireless device and/or the base station may improve reception quality (e.g., reducing decoding delay and/or reducing consumed transmission power at the base station and/or improving diversity). In another example, the wireless device and/or the base station may improve data rate (e.g., by using independent data for each polarization mode of the one or more DL antenna polarization modes). For example, the wireless device may receive one or more retransmissions (e.g., including an initial transmission) of the DL signal based on the one or more DL antenna polarization modes (e.g., each retransmission may be based on an DL antenna polarization mode of the one or more DL antenna polarization modes).

For example, the receiving the DL signal may comprise one or more repetitions. The wireless device may use/ determine, for receiving each repetition of the DL signal, a DL antenna polarization mode among/from the plurality of DL antenna polarization modes (e.g., a first set of repetitions of the DL signal may be based on a first DL antenna polarization mode among/from the plurality of DL antenna polarization modes and a second set of repetitions of the DL signal may be based on a second DL antenna polarization mode among/from the plurality of DL antenna polarization modes). For example, the one or more DL antenna polarization modes among/from the plurality of DL antenna polarization modes may comprise the first DL antenna polarization mode and/or the second DL antenna polarization mode. In some cases, the base station may transmit the first set of repetitions of the DL signal via a first service link of the at least one service link based on the first DL antenna polarization mode and/or the second set of repetitions of the DL signal via a second service link of the at least one service link based on the second DL antenna polarization mode. For example, the first service link may be different than the second service link. In some cases, the first service link may be the same as the second service link. In some implementations, the first service link and the second service link may correspond to a same cell of the one or more cells. In other implementations, the first service link and the second service link may correspond to different cells of the one or more cells.

In some cases, the determining the one or more DL antenna polarization modes among/from the plurality of DL antenna polarization modes, e.g., for receiving the DL signal, may be based on determining from a first NTN node of the at least one NTN node the wireless device is receiving the DL signal (e.g., determining a service link corresponding to the first NTN node for receiving the DL signal). For example, the wireless device may use the DL antenna polarization mode corresponding to the first NTN node (or the service link) for receiving the DL signal.

In some cases, the determining the one or more DL antenna polarization modes among/from the plurality of DL antenna polarization modes, e.g., for receiving the DL signal, may be based on determining from a first cell the wireless device is receiving the DL signal (e.g., determining a service link corresponding to the first cell for receiving the DL signal). For example, the wireless device may use the DL antenna polarization mode corresponding to the first cell (or the service link) for receiving the DL signal.

In some other cases, the determining the one or more DL antenna polarization modes among/from the plurality of DL antenna polarization modes, e.g., for receiving the DL signal, may be based on configuration of one or more BWPs. For example, the base station (e.g., via the one or more configuration parameters) configure a DL BWP (e.g., a dedicated BWP, and/or a default BWP, and/or an initial BWP) for the one or more DL antenna polarization modes among/from the plurality of DL antenna polarization modes. For receiving the DL signal via/using/on/based on the DL BWP, the wireless device may use the one or more DL antenna polarization modes among/from the plurality of DL antenna polarization modes.

In some other cases, the determining the one or more DL antenna polarization modes among/from the plurality of DL antenna polarization modes, e.g., for receiving the DL signal, may be based on configuration of PDSCH (e.g., PDSCH-Config and/or PDSCH-ConfigCommon and/or PDSCH-ServingCellConfig and/or SPS-Config) and/or configuration of PDCCH (e.g., PDCCH-Config and/or DCCH-ConfigSIB1 and/or PDCCH-ConfigCommon), e.g., indicated by the one or more configuration parameters. For example, the configuration of the PDCCH may indicate one or more search space sets used during a PDCCH monitoring occasion, e.g., for receiving the DCI) corresponding to (or associated with) one or more DL antenna polarization modes. In some cases, the one or more search space sets may comprise one or more common search space sets and/or one or more UE-specific search space sets. For example, one or more SPS configuration parameters (e.g., SPS-Config) may correspond to the one or more DL antenna polarization modes among/from the plurality of DL antenna polarization modes. The wireless device may receive SPS PDSCH (e.g., the DL signal) via the one or more DL antenna polarization modes among/from the plurality of DL antenna polarization modes. In some cases, each SPS configuration of the one or more SPS configuration parameters may correspond to a DL antenna polarization mode of the one or more DL antenna polarization modes.

In some examples, the one or more configuration parameters may configure at least one DL polarization pattern. For example, a DL polarization pattern of the plurality of DL antenna polarization modes may correspond to a Serving Cell and/or a service link of the Serving Cell and/or an NTN node of the Serving Cell and/or one or more search space sets of the configuration of the PDCCH. The DL polarization pattern may indicate/configure a pattern that the antenna polarization of the NTN node of the Serving Cell or the service link may change from a first DL polarization mode of the plurality of DL antenna polarization modes (e.g., left circular) to a second DL polarization mode of the plurality of DL antenna polarization modes (e.g., right circular). The DL polarization pattern may comprise a first DL window and a second DL window/duration/period. The first DL window may be for the DL transmissions/receptions (e.g., by the wireless device/the base station) on the service link based on the first DL polarization mode of the plurality of DL antenna polarization modes. The second DL window may be for the DL transmissions/receptions (e.g., by the wireless device/the base station) on the service link based on the second DL polarization mode of the plurality of DL antenna polarization modes. In some cases, the DL polarization pattern may be different than the UL polarization pattern. In some other cases, the DL polarization pattern may be the same as the UL polarization pattern.

In an example embodiment, in response to determining the reception occasion/time/interval of the DL signal being in/within/during the first DL window, the wireless device may receive the DL signal based on the first DL polarization mode of the plurality of DL antenna polarization modes. For example, in response to determining the reception occasion/time/interval of the DL signal being in/within/during the second DL window, the wireless device may receive the DL signal based on the second DL polarization mode of the plurality of DL antenna polarization modes.

In an embodiment, the one or more configuration parameters may indicate/configure a first configuration parameter. In response to determining the first configuration parameter being indicated/configured (or being enabled or not being disabled or not being absent from the one or more configuration parameters), the wireless device may determine the one or more DL antenna polarization modes among/from the plurality of DL antenna polarization modes, e.g., for receiving the DL signal. In some cases, the UE capability message of the wireless device may indicate a capability for the determining the one or more DL antenna polarization modes among/from the plurality of DL antenna polarization modes, e.g., for receiving the DL signal. For example, the base station may, in response to receiving the UE capability message of the wireless device, may configure the wireless device (e.g., as discussed above) for the determining the one or more DL antenna polarization modes among/from the plurality of DL antenna polarization modes, e.g., for receiving the DL signal.

As shown in FIG. 23, for transmitting an UL signal (e.g., the UL signal, or PUCCH/PUSCH/SRS/PRACH, and the like) at time/occasion/interval T2, the wireless device may determine one or more UL antenna polarization modes among/from the plurality of UL antenna polarization modes. In some cases, the base station may, e.g., via the DL signal (e.g., the DCI) may trigger/schedule the transmission of the UL signal (e.g., a PRACH order, and/or HARQ-ACK information bit, and/or CSI report, and/or aperiodic SRS transmission, and/or PUSCH). In some other cases, the wireless device may transmit the UL signal based on the one or more configuration parameters (e.g., PUCCH-Config, PUSCH-Config, PUSCH-ConfigCommon, ConfiguredGrantConfig, or the like).

The wireless device may transmit the UL signal based on the one or more UL antenna polarization modes among/from the plurality of UL antenna polarization modes. For example, using the one or more UL antenna polarization modes for receiving the UL signal, the wireless device and/or the base station may improve transmission quality (e.g., reducing decoding delay and/or reducing consumed transmission power at the base station and/or improving diversity). In another example, the wireless device and/or the base station may improve data rate (e.g., by using independent data for each polarization mode of the one or more UL antenna polarization modes). For example, the wireless device may transmit one or more retransmissions (e.g., including an initial transmission) the UL signal based on the one or more UL antenna polarization modes (e.g., each retransmission may be based on an UL antenna polarization mode of the one or more UL antenna polarization modes).

For example, the transmitting the UL signal may comprise one or more repetitions. The wireless device may use/determine, for receiving each repetition of the UL signal, an UL antenna polarization mode among/from the plurality of UL antenna polarization modes (e.g., a first set of repetitions of the UL signal may be based on a first UL antenna polarization mode among/from the plurality of UL antenna polarization modes and a second set of repetitions of the UL signal may be based on a second UL antenna polarization mode among/from the plurality of UL antenna polarization modes). For example, the one or more DL antenna polarization modes among/from the plurality of UL antenna polarization modes may comprise the first UL antenna polarization mode and/or the second UL antenna polarization mode. In some cases, the wireless device may transmit the first set of repetitions of the UL signal via a first service link of the at least one service link based on the first UL antenna polarization mode and/or the second set of repetitions of the UL signal via a second service link of the at least one service link based on the second UL antenna polarization mode. For example, the first service link may be different than the second service link. In some cases, the first service link may be the same as the second service link. In some implementations, the first service link and the second service link may correspond to a same cell of the one or more cells. In other implementations, the first service link and the second service link may correspond to different cells of the one or more cells.

In some cases, the determining the one or more UL antenna polarization modes among/from the plurality of UL antenna polarization modes, e.g., for transmitting the UL signal, may be based on determining from a first NTN node of the at least one NTN node the wireless device is receiving the UL signal (e.g., determining a service link corresponding to the first NTN node for transmitting the UL signal). For example, the wireless device may use the UL antenna polarization mode corresponding to the first NTN node (or the service link) for transmitting the UL signal.

In some cases, the determining the one or more UL antenna polarization modes among/from the plurality of UL antenna polarization modes, e.g., for transmitting the UL signal, may be based on determining from a first cell the wireless device is transmitting the UL signal (e.g., determining a service link corresponding to the first cell for transmitting the UL signal). For example, the wireless device may use the UL antenna polarization mode corresponding to the first cell (or the service link) for transmitting the UL signal.

In some other cases, the determining the one or more UL antenna polarization modes among/from the plurality of UL antenna polarization modes, e.g., for transmitting the UL signal, may be based on configuration of the one or more BWPs. For example, the base station (e.g., via the one or more configuration parameters) configure an UL BWP (e.g., a dedicated UL BWP, and/or a default UL BWP, and/or an initial UL BWP) for the one or more UL antenna polarization modes among/from the plurality of UL antenna polarization modes. For transmitting the UL signal via/using/on/based on the UL BWP, the wireless device may use the one or more UL antenna polarization modes among/from the plurality of UL antenna polarization modes.

In some other cases, the determining the one or more UL antenna polarization modes among/from the plurality of UL antenna polarization modes, e.g., for transmitting the UL signal, may be based on configuration of PUSCH (e.g., PUSCH-Config and/or PUSCH-ConfigCommon and/or MsgA-PUSCH-Config and/or PUSCH-ServingCellConfig and/or CG-Config) and/or configuration of PUCCH (e.g., PUCCH-Config and/or PUCCH-ConfigCommon and/or SR configurations), e.g., indicated by the one or more configuration parameters. For example, one or more CG configuration parameters (e.g., CG-Config) may correspond to the one or more UL antenna polarization modes among/from the plurality of UL antenna polarization modes. The wireless device may transmit a CG PUSCH (e.g., the UL signal) via the one or more UL antenna polarization modes among/from the plurality of UL antenna polarization modes. In some cases, each CG configuration of the one or more CG configuration parameters may correspond to an UL antenna polarization mode of the one or more UL antenna polarization modes.

In some examples, the one or more configuration parameters may configure at least one UL polarization pattern. For example, an UL polarization pattern of the plurality of UL antenna polarization modes may correspond to a Serving Cell and/or a service link of the Serving Cell and/or an NTN node of the Serving Cell and/or the configurations of PUSCH/PUCCH. The UL polarization pattern may indicate/configure a pattern that the antenna polarization of the NTN node of the Serving Cell or the service link may change from a first UL polarization mode of the plurality of UL antenna polarization modes (e.g., left circular) to a second UL polarization mode of the plurality of UL antenna polarization modes (e.g., right circular). The UL polarization pattern may comprise a first UL window and a second UL window/duration/period. The first UL window may be for the UL transmissions/receptions (e.g., by the wireless device/the base station) on the service link based on the first UL polarization mode of the plurality of UL antenna polarization modes. The second UL window may be for the UL transmissions/receptions (e.g., by the wireless device/the base station) on the service link based on the second UL polarization mode of the plurality of UL antenna polarization modes.

In some cases, the DL polarization pattern may be different than the UL polarization pattern. In some other cases, the DL polarization pattern may be the same as the UL polarization pattern.

In an example embodiment, in response to determining the reception occasion/time/interval of the UL signal being in/within/during the first UL window, the wireless device may transmit the UL signal based on the first UL polarization mode of the plurality of UL antenna polarization modes. For example, in response to determining the reception occasion/time/interval of the UL signal being in/within/during the second UL window, the wireless device may transmit the UL signal based on the second UL polarization mode of the plurality of UL antenna polarization modes.

In some cases, the determining the one or more UL antenna polarization modes among/from the plurality of UL antenna polarization modes, e.g., for transmitting the UL signal, may be based on the DL signal. For example, the DL signal may be the PDCCH (e.g., carrying the DCI) scheduling the transmission of the UL signal. The DCI may indicate (e.g., via one or more polarization mode fields and/or reusing/repurposing one or more fields of the DCI) the one or more UL antenna polarization modes for the transmission of the UL signal. In some other cases, the one or more configuration parameters may configure a one-to-one mapping between a reception occasion of the DL signal (e.g., PDCCH monitoring occasion) and the one or more UL antenna polarization modes for the transmission of the UL signal.

In an embodiment, the one or more configuration parameters may indicate/configure a second configuration parameter. In response to determining the second configuration parameter being indicated/configured (or being enabled or not being disabled or not being absent from the one or more configuration parameters), the wireless device may determine the one or more UL antenna polarization modes among/from the plurality of DL antenna polarization modes, e.g., for transmitting the UL signal. In some cases, the UE capability message of the wireless device may indicate a capability for the determining the one or more UL antenna polarization modes among/from the plurality of UL antenna polarization modes, e.g., for transmitting the DL signal. For example, the base station may, in response to receiving the UE capability message of the wireless device, may configure the wireless device (e.g., as discussed above) for the determining the one or more DL antenna polarization modes among/from the plurality of DL antenna polarization modes, e.g., for transmitting the DL signal.

Figure 24:
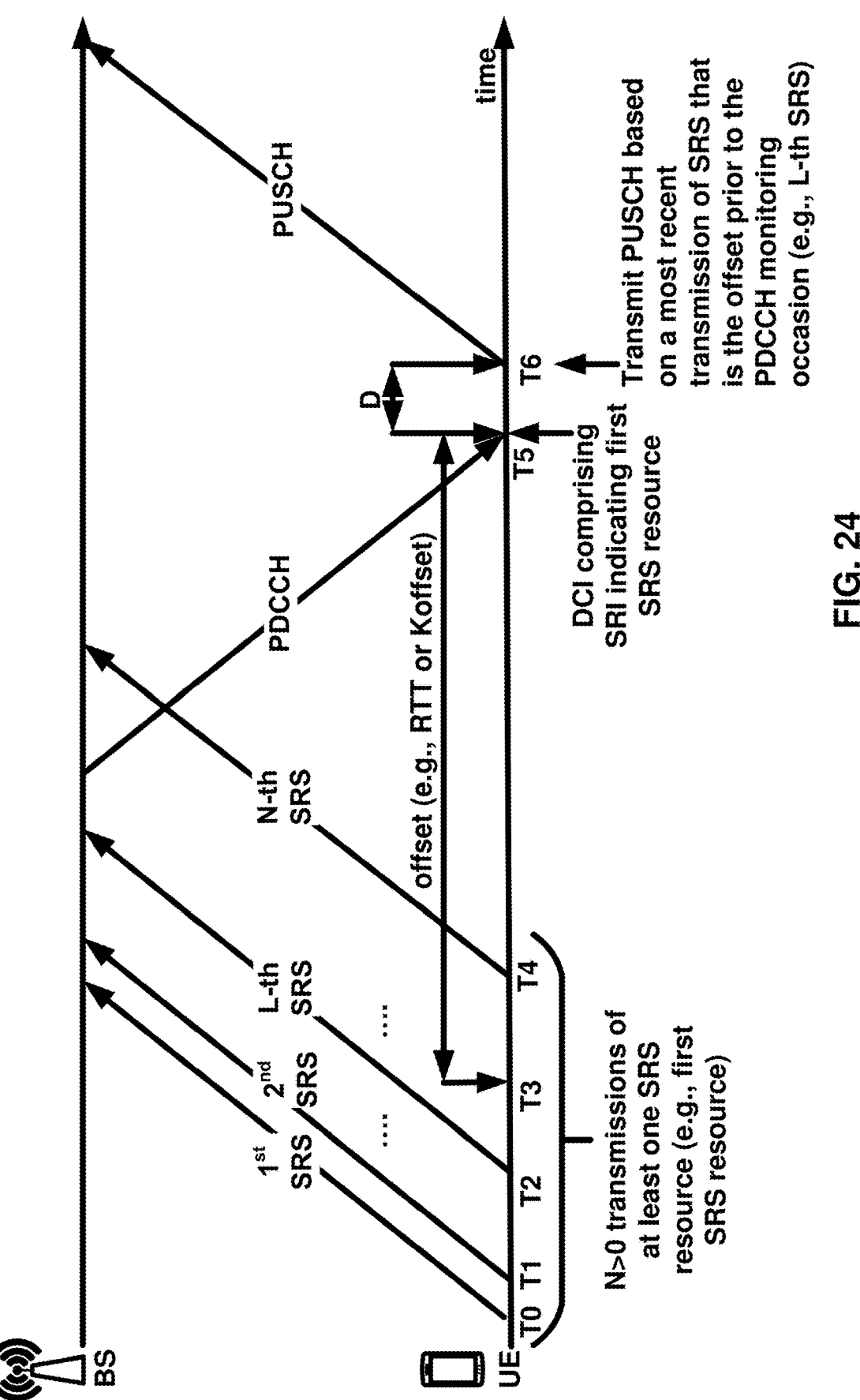
FIG. 24 shows an example embodiment of a procedure for uplink/downlink transmission in wireless communications systems per an aspect of the present disclosure.

FIG. 24 shows an example embodiment of a procedure for uplink/downlink transmission in wireless communications systems per an aspect of the present disclosure. In some scenarios, FIG. 24 may show an example embodiment of a procedure for determining an uplink spatial domain transmission filter for PUSCH transmission (e.g., at a wireless device) and/or PUSCH reception (e.g., at a base station). For example, FIG. 24 may illustrate an example of an uplink PUSCH transmission and/or SRS transmission at the wireless device in an RRC connected state/mode (e.g., an RRC_CONNECTED state) and/or in an RRC non-connected state/mode (e.g., an RRC_INACTIVE/IDLE state or an RRC_IDLE state). For example, FIG. 24 may show an example embodiment of a codebook-based PUSCH transmission or a non-codebook-based PUSCH transmission.

The wireless device may, for example, communicate with the base station via a non-terrestrial network (NTN), e.g., the wireless device and the base station may operate in the NTN and/or the base station may be an NTN base station and/or a cell (e.g., a Serving Cell of one or more Serving Cells) may be part of the NTN. For example, the cell may be a Serving Cell or a non-Serving Cell. For example, the one or more configuration parameters may comprise the one or more NTN configuration parameters. The one or more configuration parameters may, for example, comprise one or more serving cell (e.g., the one or more Serving Cells or the one or more cells) configuration parameters.

The base station may configure the wireless device with one or more SRS resource sets (e.g., using a higher layer parameter SRS-ResourceSet). For example, the one or more configuration parameters may comprise the one or more SRS configuration parameters (e.g., SRS-Config) configuring/indicating the one or more SRS resource sets. The one or more SRS resource sets may configure the wireless device with one or more SRS resources (e.g., using a higher layer parameter SRS-Resource). In some implementations, a first SRS resource set of the one or more SRS resource sets may comprise one or more (or at least one) first SRS resources. In some other implementations, a second SRS resource set of the one or more SRS resource sets may comprise one or more (or at least one) second SRS resources (e.g., using a higher layer parameter SRS-Resource).

In an example, an SRS resource set (e.g., a first SRS resource set) of the one or more SRS resource sets may comprise one or more SRS resources (e.g., K>1 SRS resources). For example, the wireless device may use an SRS resource (e.g., a first SRS resource) of the one or more SRS resources for performing UL transmissions to the base station. The one or more SRS configuration parameters may configure the (first) SRS resource may with at least one of the following: srs-ResourceId identifying corresponding SRS resource configuration identity; and/or a time domain behavior of SRS resource configuration (e.g., periodic, semi-persistent, aperiodic SRS transmission) as indicated by the higher layer parameter resource Type, and/or spatialRelationInfo for indicating an indicator/ID of a reference RS (e.g., ssb-Index, csi-RS-Index, srs), and/or a number of SRS ports (e.g., nrofSRS-Ports).

For example, an SRS resource set (e.g., the first SRS resource set or the second SRS resource set) may comprise a 'usage' field indicating whether the SRS resource set is used for beam management ('usage'='beamManagement'), codebook-based (PUSCH or uplink) transmission ('usage'='codebook'), or non-codebook-based (PUSCH or uplink) transmission ('usage'='nonCodebook'), or antenna switching ('usage'='antenna Switching'). In some cases, at most (or only) one SRS resource set (e.g., the first SRS resource set or the second SRS resource set) may be configured for the non-codebook-based (PUSCH or uplink) transmission ('usage'='nonCodebook'). A maximum quantity of SRS resources that may be configured for the non-codebook-based (PUSCH or uplink) transmission may be a first quantity/value/number (e.g., 4). For example, a maximum quantity of configured SRS resources (e.g., across the one or more SRS resource sets) for the codebook-based (PUSCH or uplink) transmission may be a second quantity/value/number (e.g., 2). When aperiodic SRS is configured for the wireless device, an SRS request field in a DCI may trigger a transmission of aperiodic SRS resources.

For example, the one or more configuration parameters may comprise one or more PUSCH configuration parameters (e.g., PUSCH-Config). The one or more PUSCH configuration parameters may comprise 'txConfig' field indicating a codebook-based (PUSCH) transmission ('usage'='codebook') or a non-codebook-based (PUSCH) transmission ('usage'='nonCodebook').

As shown in FIG. 24, the wireless device may, to the base station, transmit one or more (e.g., N>0) SRS transmissions. For example, the wireless device may transmit the one or more (e.g., N>0) SRS transmissions via/using/in/based on (or corresponding to) at least one SRS resource of the one or more SRS resources (e.g., the one or more first SRS resources and/or the one or more second SRS resources). For example, the at least one SRS resource may comprise a first SRS resource, e.g., with a first SRS resource ID (e.g., srs-ResourceId), e.g., corresponding to a first Serving Cell (or a cell of the one or more cells) and/or a first service link of the first Serving Cell (or the first service link of the at least one service link). In an example, the first SRS resource (or the at least one SRS resource) may correspond to the one or more first SRS resources (e.g., the one or more first SRS resources may comprise the first SRS resource). In another example, the first SRS resource (or the at least one SRS resource) may correspond to the one or more first SRS resources and/or the one or more second SRS resources (e.g., the one or more first SRS resources may comprise the first SRS resource or the one or more second SRS resources may comprise the first SRS resource).

In an example, the at least one SRS resource (e.g., the first SRS resource) may correspond to an ID of a reference SS/PBCH block (SSB) (e.g., via an 'ssb-Index' indicated by a spatialRelationInfo of the at least one SRS resource). The wireless device may transmit the at least one SRS resource (e.g., the first SRS resource) with a same spatial domain transmission filter/beam (and/or antenna polarization mode) used for a reception of the reference SS/PBCH block (SSB), for example, based on beam correspondence capability of the wireless device.

In another example, the at least one SRS resource (e.g., the first SRS resource) may correspond to an ID of a reference (periodic or semi-persistent) CSI-RS (e.g., via a 'csi-RS-Index' indicated by a spatialRelationInfo of the at least one SRS resource). The wireless device may transmit the at least one SRS resource (e.g., the first SRS resource) with a same spatial domain transmission filter/beam (and/or antenna polarization mode) used for a reception of the reference (periodic or semi-persistent) CSI-RS, for example, based on beam correspondence capability of the wireless device.

In yet another example, the at least one SRS resource (e.g., the first SRS resource) may correspond to an ID of a reference (periodic) SRS (e.g., via a 'srs' indicated by a spatialRelationInfo of the at least one SRS resource). The wireless device may transmit the at least one SRS resource (e.g., the first SRS resource) with a same spatial domain transmission filter/beam (and/or antenna polarization mode) used for a reception of the reference (periodic) SRS, for example, based on beam correspondence capability of the wireless device.

In some examples, the one or more configuration parameters (e.g., the one or more SRS configuration parameters) may indicate/configure a spatial domain transmission filter/beam, for transmission of the at least one SRS resource (e.g., the first SRS resource). In some cases, the wireless device may, e.g., prior to the transmission of at least one SRS resource (e.g., the first SRS resource), receive a MAC CE (e.g., an activation command, e.g., SP SRS Activation/Deactivation MAC CE and/or Enhanced SP/AP SRS Spatial Relation Indication MAC CE, or the like) from the base station indicating (or activating or configuring) the spatial domain transmission filter/beam for transmission of the at least one SRS resource (e.g., the first SRS resource). The MAC CE may indicate one or more spatial relation assumptions by a list of references to reference signal IDs, one per element of an activated SRS resource set, e.g., by the MAC CE. Each reference signal ID in the list of references may refer to a reference SS/PBCH block, NZP CSI-RS resource configured on a Serving Cell indicated by Resource Serving Cell ID field in the activation command. In some examples, the Serving Cell may be the same as a cell corresponding to the (activated) SRS resource set. In some other examples, the one or more spatial relation assumptions may correspond to an uplink bandwidth part indicated by Resource BWP ID field in the activation command (e.g., if present) or bandwidth part of the (activated) SRS resource set.

For example, the first SRS resource (or the at least one SRS resource) may have at least one of the following time domain behaviors: a periodic time domain behavior (e.g., for a periodic SRS transmission), a semi-persistent time domain behavior (e.g., for a semi-persistent SRS transmission), and/or aperiodic time domain behavior (e.g., for an aperiodic SRS transmission).

In some cases, the wireless device may transmit the one or more SRS transmissions via/using/based on the first SRS resource and/or one or more third SRS resources (e.g., the at least one SRS resource may comprise the first SRS resource and/or the one or more third SRS resource). The one or more third SRS resources may correspond to a second Serving Cell (e.g., the same as the first Serving Cell or different than the first Serving Cell) and/or a second service link of the first Serving Cell (or the second service link of the at least one service link). The second service link of the first Serving Cell may be different from the first service link of the first Serving Cell or may be the same as the first service link of the first Serving Cell. For example, the at least one SRS resource may comprise the first SRS resource and/or the one or more third SRS resources. The one or more third SRS resources may not comprise the first SRS resource (e.g., SRS resource ID of each SRS resource of the one or more third SRS resources may be different than the first SRS resource ID of the first SRS resource). The one or more third SRS resources may, for example, have different time domain behavior (e.g., periodic, semi-persistent, aperiodic) than the time domain behavior of the first SRS resource. In some cases, an (or each) SRS resource of the one or more third SRS resources may have the same time domain behavior of the first SRS resource. For example, the wireless device may simultaneously transmit in a same symbol (and/or a same resource blocks) at least one SRS transmission of the one or more SRS transmissions. For example, each of the at least one SRS transmission may correspond to (or be via) different SRS resource(s) among the first SRS resource and one or more third SRS resources. In some implementations, the one or more SRS configuration parameters may indicate/configure a maximum quantity/number of SRS resources for simultaneous transmission in the same symbol (e.g., based on the wireless device capabilities).

As shown in FIG. 24, the wireless device may transmit (e.g., to the base station on at least one cell, e.g., the first Serving Cell and/or the second Serving Cell, and/or via the first service link and/or the second service link) the one or more SRS transmissions during (or on or at) T1, T2, . . . , T4 times/occasions (or SRS transmission intervals or symbols or slots).

In some cases, when the time domain behavior of the first SRS resource is semi-persistent (e.g., for the semi-persistent SRS transmission), the wireless device may, prior to starting the transmission of the one or more second SRS transmissions via the first SRS resource, receive (not shown in FIG. 24) a MAC CE (e.g., a SP SRS Activation MAC CE), from the base station (e.g., on a first cell, e.g., the Serving Cell), activating the at least one SRS resource (e.g., activating the first SRS resource and/or the one or more third SRS resources) on the at least one cell (e.g., comprising a second cell, e.g., the first Serving Cell or the second Serving Cell). The wireless device may, to the base station on the at least one cell (e.g., the second cell), transmit the one or more SRS transmissions via the (activated) the at least one (e.g., the first) SRS resource. For example, the second cell may be the first cell. In some cases, the second cell may be different than the first cell.

In some other cases, when the time domain behavior of the first SRS resource is aperiodic (e.g., for the aperiodic SRS transmission), the wireless device may, e.g., prior to starting the transmission of the one or more second SRS transmissions via the first SRS resource, receive (not shown in FIG. 24) a first DCI (e.g., with/having a first DCI format, e.g., DCI format 1_1, 1_2, 0_1, 0_2, or 2_3), from the base station (e.g., on the first cell), triggering/requesting (e.g., via/based on 'SRS request' field of the first DCI) the one or more SRS transmissions of the first SRS resource (e.g., on the at least one cell). The first DCI may be a downlink DCI, an uplink DCI, or a group common DCI. The wireless device may transmit to the base station on the at least one cell (e.g., the second cell) the one or more SRS transmissions via the (requested/triggered) first SRS resource.

For example, the wireless device may receive the first DCI (e.g., triggering the aperiodic SRS transmission of the at least one SRS resource, e.g., of an SRS resource set) in a (downlink) slot n. In some cases, the one or more SRS configuration parameters may configure the at least one SRS resource of the SRS resource set with parameter availableSlotOffset (e.g., across one or more BWPs, e.g., an active BWP). For example, the one or more configuration parameters may configure the one or more BWPs. In some cases, a component carrier may comprise the one or more BWPs.

In an example embodiment, based on the embodiment of FIG. 22 and FIG. 23, the wireless device may transmit the aperiodic SRS transmission in/via/using each of the at least one SRS resource based on the one or more NTN configuration parameters, e.g., the selected/determine cell/UE-specific timing offset (e.g., $K_{00000}$) and/or the at least one antenna polarization mode and/or the selected/determined open-loop TA value (or the TA value). For example, the wireless device may transmit the aperiodic SRS transmission in/via/using each of the at least one SRS resource in one or more available slot (e.g., for the aperiodic SRS transmission) counting from a slot $K_0$. For example, $$K_0 = \left\lfloor n \cdot \frac{2^{\mu_{\square\square\square}}}{2^{\mu_{\square\square\square\square\square}}} \right\rfloor + k + K_{offset} \cdot \frac{2^{\mu_{\square\square\square}}}{2^{\mu_{\square\square\square\square\square\square}}} + a_{CA},$$

where k is configured via higher layer parameter slotOffset for the triggered SRS resources set and is based on the subcarrier spacing of the triggered SRS transmission, $\mu_{SRS}$ and $\mu_{PDCCH}$ are the subcarrier spacing configurations for triggered SRS and PDCCH carrying the aperiodic SRS triggering command, respectively. For example, when the one or more configuration parameters indicate/configure the ca-SlotOffset (e.g., for at least one of a triggered cell, e.g., the cell the wireless device is receiving the first DCI, and a triggering cell, e.g., the cell the wireless device is transmitting the aperiodic SRS), the wireless device may determine parameter $a_{00}$ based on the first carrier aggregation slot offset (e.g., ca-SlotOffset) of the first cell (e.g., the scheduling cell, e.g., the cell the wireless device receives the first DCI) and/or the second carrier aggregation slot offset (e.g., ca-SlotOffset) of the second cell (e.g., the scheduled cell, e.g., the cell the wireless device transmits the aperiodic SRS). For example, an available slot of the one or more available slots may be at least the first time interval from the last/final/ending/lates symbol of the PDCCH triggering the aperiodic SRS transmission. For example, an available slot of the one or more available slots may be based on the parameter availableSlotOffset of the triggered SRS resource set. In another example, an available slot of the one or more available slots may be based on an 'slot offset indicator' field of the first DCI triggering the aperiodic SRS transmission (e.g., when at least two SRS resource sets across the one or more BWPs are configured and at least one SRS resource set is configured with availableSlotOffset parameter of more than one values). In some other cases, an available slot of the one or more available slots may be an UL slot.

In some scenarios, an available slot of the one or more available slots may be based on an antenna polarization mode for transmission of the aperiodic SRS triggered by the first DCI. For example, the first DCI and/or the PDCCH triggering the aperiodic SRS transmission may indicate the antenna polarization mode. In some aspects, a triggered SRS resource for the aperiodic SRS transmission may be associated with the antenna polarization mode, e.g., via an indication (e.g., of the one or more SRS configuration parameters) indicating the antenna polarization mode. In an example, in/during the available slot an antenna polarization mode of the NTN node (e.g., for DL transmission) may match with an antenna polarization mode of the wireless device (e.g., for UL transmission, e.g., the aperiodic SRS transmission).

In some other cases, the one or more SRS configuration parameters may configure the at least one SRS resource of the SRS resource set such that none of the at least one SRS resource of the SRS resource set being configured with the parameter availableSlotOffset (e.g., across one or more BWPs, e.g., an active BWP), e.g., the parameter availableSlotOffset (e.g., across one or more BWPs, e.g., an active BWP) being absent from the at least one SRS resource of the SRS resource set. The wireless device may transmit the aperiodic SRS transmission in/via/using each of the at least one SRS resource based on the one or more NTN configuration parameters, e.g., e.g., the selected/determine cell/UE-specific timing offset (e.g., $K_{00000}$) and/or the at least one antenna polarization mode and/or the selected/determined open-loop TA value (or the TA value). For example, the wireless device may transmit the aperiodic SRS transmission in/via/using each of the at least one SRS resource in the slot $K_0$.

For example, as shown in FIG. 24, the wireless device may receive a DCI (e.g., with a DCI format 0_1 or a DCI format 0_2 or a DCI format 0_0 or the like) from the base station on a third cell of the one or more cells (e.g., the Serving Cell) and/or via the third service link of the at least one service link, e.g., at time (or occasion or slot or symbol or time interval) T5. The third cell may be the first cell or may be different than the first cell. For example, the third cell may be the second cell or may be different than the second cell. For example, the wireless device may receive the DCI based on/by/via monitoring PDCCH (e.g., monitoring one or more PDCCH candidates), e.g., via/during/at/ on a PDCCH (monitoring occasion).

The DCI may be different than the first DCI triggering/ requesting the one or more SRS transmissions of the first SRS resource. The DCI may, for example, be the first DCI. The wireless device may, to receive the DCI in/via/using the PDCCH monitoring occasion, monitor the one or more PDCCH candidates in/during/on at least one search space set of the one or more search space sets.

For example, the DCI schedules/indicates a PUSCH transmission (e.g., on a fourth cell of the one or more cells and/or via a fourth service link of the at least one service link). The fourth cell may be the same as the third cell. The fourth cell (e.g., a scheduled cell) may be different than the third cell (e.g., a scheduling cell). In some cases, the fourth service link may be the same as the third service link. In some other cases, the fourth service link may be different than the third service link. The PUSCH transmission may be for transmitting UL data (e.g., a transport block) to the base station. In some cases, the DCI may schedule the wireless device to transmit the PUSCH for transmission of at least one transport block and no CSI report. In some cases, the DCI may schedule the wireless device to transmit the PUSCH for transmission of at least one transport block and one or more CSI reports. In yet some other cases, the DCI may schedule the wireless device to transmit the PUSCH for transmission of the one or more CSI reports and no transport block. In some other cases, the PUSCH transmission may be for transmitting the triggered aperiodic SRS transmission without UL data and without CSI report.

For example, (e.g., similar to the discussion above for the transmission of the UL signal in response to the receiving the DL message in FIG. 22) the wireless device may determine a transmission time/occasion/interval for transmitting the PUSCH based on a TA value of the at least one TA value, and/or a cell-specific timing offset of the at least one cell-specific timing offset, and/or a UE-specific timing offset of the at least one UE-specific timing offset, and/or an open-loop TA value of the at least one open-loop TA value. For example, to determine the transmission time/occasion/ interval of the PUSCH (e.g., with respect to the PDCCH monitoring occasion), the wireless device may, based on an NTN-specific configuration parameters corresponding to a cell (e.g., the third cell of the one or more cells and/or the fourth cell of the one or more cells) and/or a TAG and/or a service link (e.g., the third service link of the at least one service link and/or the fourth service link of the at least one service link), determine/select/choose the TA value of the at least one TA value, and/or the cell-specific timing offset of the at least one cell-specific timing offset, and/or the UE-specific timing offset of the at least one UE-specific timing offset, and/or the open-loop TA value of the at least one open-loop TA value. For example, the wireless device may determine parameter D for transmitting the PUSCH to the base station via the third cell of the one or more cells and/or the third service link of the at least one service link. For example, the fourth cell and/or the fourth service link may correspond to the TAG.

In an example embodiment, as shown in FIG. 24, the wireless device may, for transmitting the PUSCH to the base station (e.g., on the fourth cell and/or the fourth service link), may identify/determine an SRS resource based on the one or more NTN configuration parameters (e.g., corresponding to the fourth cell and/or the fourth service link). For example, the wireless device may identify/determine/select the SRS resource, among the at least one SRS resource (e.g., the first SRS resource and/or the one or more third SRS resource). For example, the (selected/identified/determined) SRS resource may be the first SRS resource. In some cases, an SRS transmission (e.g., a latest/final/ending/most recent SRS transmission) of the one or more SRS transmissions via/in/using the (selected/identified/determined) SRS resource may occur at least an offset (e.g., in milliseconds/ slots/symbols/subframes) prior the PDCCH monitoring occasion. In an example, the wireless device may, for transmitting the PUSCH, determine/identify an uplink spatial domain transmission filter based on the determined SRS transmission (e.g., the most recent SRS transmission) of the one or more SRS transmissions.

For example, the offset may not correspond to a processing complexity of the base station. For example, the offset may not be predefined. In some cases, the offset may be changed by a movement of an NTN node of the at least one NTN node, and/or a movement of the wireless device, and/or the like. For example, the wireless device may update the offset (via transmitting an updated value of the offset to the wireless device) in response to the movement of the NTN node. In some cases, the wireless device may update/ estimate/determine the offset in response to the movement of the NTN node and/or the movement of the wireless device.

In an example embodiment, the wireless device may determine the offset based on the one or more NTN configuration parameters (e.g., the one or more common delay/ TA parameters and/or the one or more ephemeris parameters). In some implementations, the wireless device may determine the offset based on a round-trip transmission delay (RTT) between the wireless device and the base station (e.g., a UE-gNB RTT). For example, the offset may be the selected/determined UE-gNB RTT of the at least one UE-gNB RTT (e.g., corresponding to the fourth cell and/or the fourth service link). In some cases, based on the (selected/determined) open-loop TA value (or the TA value), e.g., used, by the wireless device, for determining the transmission time/occasion of the PUSCH, the wireless device may determine/select the UE-gNB RTT of the at least one UE-gNB RTT.

Some example embodiments may allow the wireless device to determine/identify the uplink spatial domain transmission filter, for the PUSCH transmission, based on the propagation delay between the wireless device and the base station (e.g., the UE-gNB RTT). For example, in response to movement/displacement of the NTN node/payload (e.g., satellite) and/or movement/displacement of the wireless device, the wireless device may maintain/update the (selected) UE-gNB RTT (e.g., using the one or more NTN configuration parameters corresponding to the TAG and/or the fourth cell and/or the fourth service link) for determining/identifying the uplink spatial domain transmission filter, for the PUSCH transmission.

In an example embodiment, the wireless device may determine the offset based on a timing offset of the NTN (e.g., $K_{offset}$), e.g., a cell-specific timing offset of the at least one cell-specific timing offset and/or a UE-specific timing offset of the at least one UE-specific timing offset. In some examples, the timing offset of the NTN may be the selected/ determined cell-specific timing offset of the at least one cell-specific timing offset (e.g., corresponding to the fourth cell and/or the fourth service link and/or the TAG). For example, the cell-specific timing offset may be used (or selected/determined), by the wireless device, for determining the transmission time/occasion of the PUSCH. In some other examples, the timing offset of the NTN may be based on the selected/determined UE-specific timing offset (e.g., corresponding to the fourth cell and/or the fourth service link and/or the TAG and/or based on the differential timing offset).

In an example embodiment, as shown in FIG. 24 at/in/on time interval T6, the wireless device may transmit the PUSCH, e.g., to the base station on the fourth cell and/or the fourth service link, based on a most recent SRS transmission (e.g., L-th SRS transmission in FIG. 24), of the one or more SRS transmissions, that occurs a time the offset prior the PDCCH monitoring occasion (e.g., a last/final/ending/latest symbol of the PDCCH monitoring occasion). For example, the one or more SRS transmissions may be via the (selected/identified/determined) SRS resource (e.g., the first SRS resource). In an example, the wireless device may, for transmitting the PUSCH, determine/identify an uplink spatial domain transmission filter based on the most recent SRS transmission, of the one or more SRS transmissions, that occurs prior to an offset from the PDCCH monitoring occasion. For example, the uplink spatial domain transmission filter, for transmission of the PUSCH, may be used for the most recent SRS transmission, of the one or more SRS transmissions, that occurs prior to an offset from the PDCCH monitoring occasion. In some cases, a time difference between a transmission occasion (e.g., a last/final/ending/latest symbol) of the most recent SRS transmission and the PDCCH monitoring occasion (e.g., a last/final/ending/latest symbol of the PDCCH monitoring occasion) may be greater than or equal to the offset. For example, an amount of time (e.g., corresponding to the transmission occasion of the most recent SRS transmission) may occur the offset prior to the PDCCH monitoring occasion. The wireless device may transmit the PUSCH using a same antenna port(s) as SRS port(s) in an SRS resource (e.g., the first SRS resource and/or the one or more third SRS resource). For example, the SRS resource may be indicated by the DCI.

In the example shown in FIG. 24, the wireless device may transmit at least one SRS transmission, of the one or more SRS transmissions, after the most recent SRS transmission (e.g., L-th SRS transmission in FIG. 24), e.g., compared to a TN scenario, the most recent SRS transmission may not be a last/final/ending/latest SRS transmission of the one or more SRS transmissions prior to the PDCCH monitoring occasion. For example, the transmission of the PUSCH transmission may not be based on the last/final/ending/latest SRS transmission of the one or more SRS transmissions (e.g., after the most recent SRS transmission) prior to the PDCCH monitoring occasion.

In some cases, the wireless device may not transmit any SRS transmission, of the one or more SRS transmissions, after the most recent SRS transmission (e.g., an L-th SRS transmission depicted in FIG. 24), e.g., the most recent SRS transmission may be a last/final/ending/latest SRS transmission of the one or more SRS transmissions prior to the PDCCH monitoring occasion.

For example, the base station may receive the PUSCH based on a most recent reception of SRS of the one or more SRS transmissions (e.g., corresponding to the most recent transmission of the SRS at the wireless device) that occur prior to a transmission occasion/resource of the DCI (at the base station) scheduling the PUSCH transmission. For example, the base station may receive the PUSCH based on the most recent reception of the SRS that occurs the offset prior to the reception time/occasion/interval of the PUSCH.

In some examples, the DCI may comprise an SRI field. The wireless device may select/identify/determine the SRS resource (e.g., the first SRS resource) of the at least one SRS resource based on an SRI (value) indicated by the SRI field of the DCI. For example, the SRI may indicate (or correspond to) the SRS resource. The wireless device may transmit the PUSCH transmission based on the most recent SRS transmission (e.g., that occurs the offset prior to the PDCCH monitoring occasion) of the (selected/identified/ determined or first) SRS resource (e.g., indicated by the SRI field of the DCI and/or selected/identified/determined based on the one or more NTN configuration parameters). For example, the wireless device may identify/determine the uplink spatial domain transmission filter by the most recent SRS transmission (e.g., that occurs prior to/before the offset from the PDCCH monitoring occasion) of the (selected/identified/determined or first) SRS resource (e.g., indicated by the SRI field of the DCI and/or selected/identified/determined based on the one or more NTN configuration parameters).

In some examples, the DCI may not comprise the SRI field. The wireless device may transmit to the base station on the fourth cell and/or via the fourth service link, the PUSCH transmission based on the most recent SRS transmission (e.g., that occurs prior to an offset from the PDCCH monitoring occasion) of the (selected/identified/determined or first) SRS resource. For example, the one or more SRS configuration parameters may comprise only a single SRS resource (e.g., the first SRS resource). For example, the wireless device may identify/determine the uplink spatial domain transmission filter by the most recent SRS transmission (e.g., that occurs prior to the offset from the PDCCH monitoring occasion) of the (selected/identified/determined or first) SRS resource. In another example, the SRS resource may correspond to the fourth cell and/or the fourth service link.

In some other cases, the DCI may comprise at least two SRI field. For example, the at least two SRI field may comprise a first SRI field and a second SRI field. The wireless device may select/identify/determine one or more fourth SRS resources of the at least one SRS resource based on a first SRI indicated by the DCI (e.g., the first SRI field of the DCI). In another example, the wireless device may select/identify/determine one or more fourth SRS resources of the at least one SRS resource based on a second SRI indicated by the DCI (e.g., the second SRI field of the DCI). For example, the at least one SRS resource may comprise the one or more fourth SRS resources. In some cases, the one or more third SRS resource may comprise the one or more fourth SRS resources. The wireless device may transmit the PUSCH transmission based on a most recent SRS transmission (e.g., that occurs prior to an offset from the PDCCH monitoring occasion) of each (selected/identified/determined) SRS resource of the one or more fourth SRS resources (e.g., indicated by the at least one SRI field of the DCI and/or selected/identified/determined based on the one or more NTN configuration parameters). For example, the wireless device may identify/determine a first most recent SRS transmission (e.g., that occurs prior to an offset from the PDCCH monitoring occasion) of a first (selected/identified/determined) SRS resource of the one or more fourth SRS resources. In some cases, the wireless device may identify/determine a second most recent SRS transmission (e.g., that occurs prior to an offset from the PDCCH monitoring occasion) of a second (selected/identified/determined) SRS resource of the one or more fourth SRS resources. The wireless device may identify/determine the uplink spatial domain transmission filter by the most recent SRS (e.g., the first most recent SRS and/or the second most SRS) transmission (e.g., that occurs prior to the offset from the PDCCH monitoring occasion) of each (e.g., the first and/or the second) selected/identified/determined SRS resource of the one or more fourth SRS resources (e.g., indicated by the at least one SRI field of the DCI and/or selected/identified/determined based on the one or more NTN configuration parameters).

In some examples, the DCI may comprise a 'SRS resource set indicator' field indicting an SRS resource set (e.g., the first SRS resource set or the second SRS resource set), e.g., when the one or more SRS resource sets may comprise the first SRS resource set and the second SRS resource set. For example, for selecting/determining/identifying the SRS resource (or the one or more fourth SRS resources) of the at least one SRS resource, the wireless device may determine/identify/select the SRS resource set (e.g., the first SRS resource set or the second SRS resource set) based on the 'SRS resource set indicator' field of the DCI. For example, the wireless device may, for transmitting the PUSCH, may identify/determine the SRS resource (or the one or more fourth SRS resources) of the at least one SRS resource based on the one or more NTN configuration parameters and the selected/determined/identified the SRS resource set.

In some other examples, the DCI may not comprise the 'SRS resource set indicator' field. For example, the SRS resource set may comprise only a single SRS resource set (e.g., the first SRS resource set). For example, the wireless device may, for transmitting the PUSCH, identify/determine the SRS resource based on the one or more NTN configuration parameters and the single SRS resource set (e.g., the first SRS resource set). The wireless device may transmit the PUSCH transmission based on the most recent SRS transmission (e.g., that occurs prior to the offset from the PDCCH monitoring occasion) of the (selected/identified/determined or first) SRS resource. In another example, the (selected) SRS resource set may correspond to the fourth cell and/or the fourth service link.

In some examples, the wireless device may determine a bit-width of the SRI field (or the first SRI field and/or the second SRI field) of the DCI. For example, when the PUSCH transmission is based on a non-codebook-based PUSCH transmission (e.g., txConfig=nonCodebook) and the one or more SRS resource sets comprise the first SRS resource set and the second SRS resource set, the wireless device may determine the bit-width of the SRI field (or the first SRI field and/or the second SRI field) of the DCI based on a first number (or cardinality) of SRS resources of the SRS resource set (e.g., indicated by the 'SRS resource set indicator' field of the DCI). For example, the first number may be a number (or cardinality) of the one or more first SRS resources (e.g., when the selected/determined/identified the SRS resource set is the first SRS resource set) or a number (or cardinality) of the one or more second SRS resources (e.g., when the selected/determined/identified the SRS resource set is the second SRS resource set). In another examples, when the PUSCH transmission is based on the non-codebook PUSCH transmission (e.g., txConfig= nonCodebook) and the one or more SRS resource sets comprise the first SRS resource set, the wireless device may determine the bit-width of the SRI field (or the first SRI field and/or the second SRI field) of the DCI based on a second number (or cardinality) of SRS resources of the first SRS resource set (e.g., the number of configured SRS resources in the first SRS resource set configured by higher layer parameter srs-ResourceSetToAddModList (e.g., of the one or more SRS configuration parameters) and associated with the higher layer parameter usage of value 'nonCodeBook'.

For example, when the PUSCH transmission is based on a codebook-based PUSCH transmission (e.g., txConfig= codeBook) and the one or more SRS resource sets comprise the first SRS resource set and the second SRS resource set, the wireless device may determine the bit-width of the SRI field (or the first SRI field and/or the second SRI field) of the DCI based on a first number (or cardinality) of SRS resources of the SRS resource set (e.g., indicated by the 'SRS resource set indicator' field of the DCI). For example, the first number may be a number (or cardinality) of the one or more first SRS resources (e.g., when the selected/determined/identified the SRS resource set is the first SRS resource set) or a number (or cardinality) of the one or more second SRS resources (e.g., when the selected/determined/identified the SRS resource set is the second SRS resource set). In another examples, when the PUSCH transmission is based on the non-codebook PUSCH transmission (e.g., txConfig=codebook) and the one or more SRS resource sets comprise the first SRS resource set, the wireless device may determine the bit-width of the SRI field (or the first SRI field and/or the second SRI field) of the DCI based on a second number (or cardinality) of SRS resources of the first SRS resource set (e.g., the number of configured SRS resources in the first SRS resource set configured by higher layer parameter srs-ResourceSetToAddModList (e.g., of the one or more SRS configuration parameters) and associated with the higher layer parameter usage of value 'codeBook'.

For example, when txConfig=codebook, the wireless device may determine at least one PUSCH transmission precoder, and/or at least one transmitted precoding matrix indicator (TPMI), and/or a transmission rank. In some cases, the DCI may comprise at least one 'precoding information and number of layers' field indicating the at least one TPMI. For example, based on an SRI (e.g., indicated by the SRI field of the DCI, and/or the first SRI field of the DCI and/or the second SRI field of the DCI) and/or the at least one 'precoding information and number of layers' field of the DCI and/or at least one 'SRS resource set indicator' field of the DCI, the wireless device may determine the at least one PUSCH transmission precoder, and/or the at least one transmitted precoding matrix indicator (TPMI), and/or the transmission rank. For example, the wireless device may use the most recent SRS transmission that occurs the offset prior to the PDCCH monitoring occasion of the (selected/identified/determined or first) SRS resource (e.g., based on the SRI field of the DCI, and/or the first SRI field of the DCI and/or the second SRI field of the DCI). The one or more SRS configuration parameters (e.g., SRS-config) may indicate applicable SRS resource sets via one or more entries of higher layer parameter srs-ResourceSetToAddModList (e.g., SRS-ResourceSet(s) applicable for PUSCH scheduled by DCI format 0_1) and srs-Resource SetToAddModListDCI-0-2 (e.g., SRS-ResourceSet(s) applicable for PUSCH scheduled by DCI format 0_2). In some cases, at most one or two SRS resource sets may be configured in srs-ResourceSetToAddModList with higher layer parameter usage in SRS-ResourceSet set to 'codebook', and at most one or two SRS resource sets may be configured in srs-ResourceSetToAddModListDCI-0-2 with higher layer parameter usage in SRS-ResourceSet set to 'codebook'. A TPMI of the at least one TPMI may indicate a precoder to be applied over one or more layers $\{0 \ . \ . \ . \ v-1\}$. For example, the TPMI may correspond to the SRS resource selected by the SRI (e.g., when multiple SRS resources are configured). When a single SRS resource is configured by the one or more SRS configuration parameters, the TPMI may indicate the precoder to be applied over the layers $\{0 \ . \ . \ . \ v-1\}$ corresponding to the single SRS resource. For example, the wireless device may, for transmitting the PUSCH, determine the PUSCH transmission precoder from an uplink codebook. The uplink codebook may comprise a number of antenna ports, e.g., indicated by nrofSRS-Ports in SRS-Config.

In an example embodiment, the wireless device may not transmit (e.g., may not be expected to transmit) the one or more SRS transmissions (e.g., in the same OFDM symbol or slot or subframe or a time duration), e.g., corresponding to the first SRS resource and/or the one or more third SRS resources, with different spatial relations and/or with different (UL) antenna polarization modes.

In an example embodiment, the wireless device may, for transmitting the PUSCH to the base station, may identify/ determine an SRS resource (e.g., the one or more fourth SRS resources or the first SRS resource) of the at least one SRS resource based on the at least one antenna polarization mode of the one or more NTN configuration parameters. The wireless device may transmit the PUSCH transmission based on a most recent SRS transmission (e.g., that occurs prior to the offset from the PDCCH monitoring occasion) of the selected/identified/determined SRS resource. For example, the wireless device may transmit the PUSCH transmission based on the at least one antenna polarization mode (e.g., the UL polarization pattern), e.g., with accordance to discussion of FIG. 23.

In an example embodiment, the wireless device may identify/determine/select the SRS resource, among at least one SRS resource (e.g., the first SRS resource and/or the one or more third SRS resource), based on an antenna polarization mode (e.g., a right-hand circular polarization (rhcp), a left-hand circular polarization (lhcp), or a linear, or the like). In some cases, the selected/determined/identified SRS resource set may be associated with a first antenna polarization mode (e.g., the rhcp, the lhcp, or the linear, or the like). For example, the first antenna polarization mode may correspond to the UL (or DL) polarization pattern of a service link of the Serving Cell.

In some cases, the wireless device may, to determine the first antenna polarization window, determine whether the transmission of the PUSCH is during the first UL window or the second UL window. For example, the wireless device may determine the first antenna polarization mode based on an antenna polarization mode that is used for the transmission of the PUSCH (e.g., during the first UL window or the second UL window).

For example, an (each) SRS resource set (e.g., the first SRS resource set and/or the second SRS resource set) of the one or more SRS resource sets may comprise an antenna polarization mode field, e.g., indicating supporting/valid antenna polarization mode for transmitting (e.g., by the wireless device) and/or receiving (by the base station via the NTN node/payload or the service link or the Serving Cell) each SRS resource of the SRS resource set (e.g., the one or more first SRS resources of the first SRS resource set and/or the one or more second SRS resources of the second SRS resource set). In some cases, the field for the antenna polarization mode of the SRS resource set may indicate the first antenna polarization mode. In some cases, an SRS transmission (e.g., a latest/final/ending/most recent SRS transmission) of the one or more SRS transmissions via/ using the (selected/identified/determined) SRS resource may occur at least an offset prior to an offset from the PDCCH monitoring occasion. For example, the wireless device may transmit the PUSCH based on the first antenna polarization mode.

In an example embodiment, the first antenna polarization mode may correspond to an antenna polarization mode of the wireless device (e.g., the rhcp, the lhcp, or the linear, or the like) and/or an antenna polarization mode of the NTN node/payload (e.g., the rhcp, the lhcp, or the linear, or the like). For example, the first antenna polarization mode may be one of the at least one antenna polarization mode. In some cases, the UE-capability message may comprise an antenna polarization capability of the wireless device (e.g., for UL transmission on the service link and/or for DL transmission on the service link). For example, the antenna polarization capability may comprise/indicate the antenna polarization mode of the wireless device.

In some other cases, an (or each) SRS resource configured by the one or more SRS configuration parameters may correspond to (or be associated with) an antenna polarization mode (e.g., the rhcp, the lhcp, or the linear, or the like), e.g., via an indication indicating the antenna polarization mode. For example, the selected/identified/determined (e.g., the first) SRS resource set for the transmission of the PUSCH may be associated with (or correspond to) an antenna polarization mode of the selected/identified SRS resource from the at least one SRS resource.

For example, a first plurality of SRS resources of the first SRS resource set (or the one or more first/second SRS resources) may correspond to (or be associated with) a first antenna polarization mode (e.g., the rhcp, the lhcp, or the linear, or the like), e.g., via a first indication (e.g., of the one or more SRS configuration parameters) indicating the antenna polarization mode. A second plurality of SRS resources of the first SRS resource set (or the one or more first/second SRS resources) may correspond to (or be associated with) a second antenna polarization mode (e.g., e.g., different than the first antenna polarization mode), e.g., via a second indication (e.g., of the one or more SRS configuration parameters) indicating the antenna polarization mode. In some cases, a third plurality of SRS resources of the first SRS resource set (or the one or more first/second SRS resources) may correspond to (or be associated with) a third antenna polarization mode (e.g., the rhcp, the lhcp, or the linear, or the like), e.g., via a third indication (e.g., of the one or more SRS configuration parameters) indicating the antenna polarization mode. For example, the third antenna polarization mode may be different than the first antenna polarization mode and/or the second antenna polarization mode. In some cases, the at least one antenna polarization mode (e.g., indicated by the one or more configuration parameters) may comprise at least one the first antenna polarization mode and/or the second antenna polarization mode and/or the third antenna polarization mode. In some other cases, the one or more SRS configuration parameters may comprise at least one of the first indication and/or the second indication and/or the third indication.

In an example embodiment, the wireless device may determine/identify the most recent SRS transmission based on determining an antenna polarization mode (e.g., a right-hand circular polarization (rhcp), a left-hand circular polarization (lhcp), or a linear, or the like) from the first antenna polarization mode and/or the second antenna polarization mode and/or the third antenna polarization mode. For example, the most recent SRS transmission of the one or more SRS transmissions may occur the offset prior to the PDCCH monitoring occasion. In an example embodiment, the wireless device may determine/identify/select the antenna polarization mode (e.g., among the first antenna polarization mode and/or the second antenna polarization mode and/or the third antenna polarization mode) based on the at least one UL/DL antenna polarization modes of the one or more NTN configuration parameters. For example, the wireless device may determine the antenna polarization mode being the same as an antenna polarization mode (e.g., the rhcp, the lhcp, or the linear, or the like) used for the most recent transmission of the SRS transmission (e.g., of the selected/determined/identified SRS resource of the at least one SRS resource, e.g., the first SRS resource). In an example embodiment, the wireless device may determine/identify the antenna polarization mode (used for the most recent transmission of the SRS transmission that occurs the offset prior to the PDCCH monitoring occasion) based on an antenna polarization mode used for transmitting the PUSCH. For example, the antenna polarization mode may be based on an antenna polarization mode of an RS resource (e.g., SSB and/or CSI-RS). In some cases, the antenna polarization mode may be used for the PDCCH monitoring occasion (e.g., the at least one search space set), e.g., during the first DL window or the second DL window. In an example embodiment, the wireless device may determine/identify the antenna polarization mode based on the DCI, e.g., whether the DCI is received during the first DL window or the second DL window. For example, the DCI may indicate the antenna polarization mode.

In some implementations, the one or more SRS configuration parameters may indicate/configure a maximum quantity/number of SRS resources for simultaneous transmission in the same symbol (e.g., based on the wireless device polarization capabilities and/or the polarization mode of the NTN node).

In some implementations the at least one positioning SRS resource (e.g., of a cell, e.g., a Serving Cell or a non-Serving Cell) may correspond to at least one antenna polarization mode (e.g., vertical horizontal, right-hand circular, or left-hand circular) of the wireless device and/or of an NTN node/payload (e.g., corresponding to the cell). For example, a positioning SRS resource of the at least one positioning SRS resource may correspond to the at least one antenna polarization mode (e.g., vertical horizontal, right-hand circular, or left-hand circular) of the wireless device and/or of the NTN node/payload (e.g., corresponding to the cell). A positioning SRS resource of the at least one positioning SRS resource may comprise an indication indicating the at least one antenna polarization mode (e.g., vertical horizontal, right-hand circular, or left-hand circular). In some other cases, a corresponding reference DL signal (e.g., SSB, CSR-RS, and/or SRS), e.g., indicated by a spatialRelationInfo of the at least one SRS resource (e.g., via an 'ssb-Index' indicated by)

In an example, an antenna polarization mode of an NTN node/payload of a Serving Cell (or a non-Serving Cell) may be based on the at least one antenna polarization mode of an NTN-specific configuration parameters. For example, the antenna polarization mode of an NTN node/payload may correspond to a DL antenna polarization mode on the corresponding service link (e.g., for DL transmission) or an UL antenna polarization mode on the corresponding service link (e.g., for UL transmission). In some cases, the UL antenna polarization mode of the NTN node/payload of a Serving Cell (or a non-Serving Cell) may be the same as the DL antenna polarization mode of the NTN node/payload of a Serving Cell (or a non-Serving Cell).

In an example embodiment, the wireless device may select the first SRS resource from the first SRS resource set (or the one or more first SRS resources) based on an antenna polarization mode (e.g., for transmitting the PUSCH) being the same as the antenna polarization mode of the selected/determined/identified SRS resource of the at least one SRS resource. For example, the antenna polarization mode of the selected/determined/identified SRS resource of the at least one SRS resource may be at least one of the first antenna polarization mode, the second antenna polarization mode, or the third antenna polarization mode. For example, the antenna polarization mode may be the antenna polarization mode for transmitting the PUSCH (e.g., indicated by the DCI and/or the one or more configuration parameters (e.g., PUSCH-Config). For example, the antenna polarization mode may be based on an antenna polarization mode of an RS resource (e.g., SSB and/or CSI-RS) and/or the PDCCH monitoring occasion (e.g., the at least one search space set). For example, the most recent SRS transmission of the one or more SRS transmissions via the first SRS resource may occur the offset prior to the PDCCH monitoring occasion.

In an example embodiment, the wireless device may determine a first (minimal) time interval/distance/duration, e.g., between a last/final/ending/lates symbol of a PDCCH triggering the aperiodic SRS transmission (e.g., the first DCI) and a first/initial/starting/earliest symbol of an SRS resource of the at least one SRS resource based on an antenna polarization mode/information. For example, the first time interval may be based on a switching time/interval from a first antenna polarization mode (e.g., for UL transmission or for DL transmissions, e.g., receiving the PDCCH monitoring and/or receiving one or more RS resources, e.g., SSB, CSI-RS, or the like) to a second antenna polarization mode (e.g., for UL transmission, e.g., the aperiodic SRS transmission and/or the one or more SRS transmissions), e.g., $T_{polarization, switch}$. In some cases, the first time interval may be based on the UL/DL polarization pattern. For example, the first time interval may further be based on a switching gap duration $T_{switch}$ (e.g., equals to the switching gap duration when the wireless device is configured with higher layer parameter uplink TxSwitchingOption set to 'dualUL' for uplink carrier aggregation). For an SRS resource of an (e.g., the first or the second) SRS resource set with usage of 'codebook' or 'antennaSwitching', the first time interval (e.g., between a last/final/ending/lates symbol of a PDCCH triggering the aperiodic SRS transmission and a first/initial/starting/earliest symbol of an SRS resource of the at least one SRS resource) may be a summation of $N_2$ symbols (e.g., a UE processing capability 1 and/or 2) and a first switching gap duration/distance/interval. For an SRS resource of an (e.g., the first or the second) SRS resource set with usage of 'nonCodebook' or 'beamManagement', the first time interval (e.g., between the last/final/ending/lates symbol of the PDCCH triggering the aperiodic SRS transmission and the first/initial/starting/earliest symbol of an SRS resource of the at least one SRS resource) may be a summation of $N_2+14$ symbols and the first switching gap duration/distance/interval. For example, the first switching gap duration may be based on the switching gap duration $T_{switch}$ and $T_{polarization, switch}$, e.g., a summation of $T_{switch}$ and $T_{polarization, switch}$, or a maximum of $T_{switch}$ and $T_{polarization, switch}$, or a minimum of $T_{switch}$ and $T_{polarization, switch}$, or the like. The first time interval unit of OFDM symbol is counted based on a minimum subcarrier spacing (e.g., $\min(\mu_{PDCCH}, \mu_{UL})$). In some cases, $\mu_{UL}$ may be based on $\mu_{SRS}$ and one or more subcarrier spacings (e.g., $\min(\mu_{UL,carrier1}, \mu_{UL,carrier2}, \mu_{SRS})$. $\mu_{SRS}$ and $\mu_{PDCCH}$ may be the subcarrier spacing configurations for triggered aperiodic SRS resource and the PDCCH carrying the triggering aperiodic SRS transmission.

Some example embodiments may improve efficiency of PUSCH transmission (e.g., uplink beam management) by reducing possibility of miss/wrong beam alignment (or antennal polarization) between the wireless device and/or the base station. Some example embodiments, e.g., for transmitting uplink signals (e.g., PUSCHs), may improve efficiency of uplink transmission (e.g., by reducing uplink transmission latency and/or consumed power of the wireless device for transmitting PUSCHs).

An example method comprising: receiving, by a wireless device from a base station, one or more configuration parameters indicating: at least one sounding reference signal (SRS) resource; one or more NTN configuration parameters for determining an offset based on a round-trip transmission delay (RTT) between the wireless device and the base station; transmitting one or more SRS transmissions via a first SRS resource of the at least one SRS resource; receiving, in a physical downlink control channel (PDCCH) monitoring occasion, a downlink control information (DCI) scheduling a physical uplink shared channel (PUSCH) transmission, wherein the DCI comprises an SRS resource indicator (SRI) field indicating the first SRS resource; and determining a most recent SRS transmission, of the one or more SRS transmissions, that occurs before the PDCCH monitoring occasion by an amount of time determined based on the offset; and transmitting the PUSCH transmission based on the most recent SRS transmission.

The above-example method, wherein the offset is the round-trip transmission delay (RTT) between the wireless device and the base station.

One or more of the above-example methods, wherein the determining the round-trip transmission delay (RTT) between the wireless device and the base station is based on at least one of: one or more satellite ephemeris information indicated by the one or more NTN configuration parameters; one or more common delay parameters indicated by the one or more NTN configuration parameters; or a medium access control (MAC) layer timing offset indicated by the one or more NTN configuration parameters.

One or more of the above-example methods, wherein offset is a cell-specific timing offset, wherein: the cell-specific timing offset is greater than the round-trip transmission delay (RTT) between the wireless device and the base station; and the one or more NTN configuration parameters indicate the cell-specific timing offset.

One or more of the above-example methods, wherein the offset is a user-equipment (UE) specific timing offset, wherein the UE specific timing offset is greater than the round-trip transmission delay (RTT) between the wireless device and the base station.

One or more of the above-example methods, further comprising: receiving a medium access control (MAC) control element (CE) indicating a differential timing offset; determining the UE-specific timing offset based on a cell-specific timing offset and the differential timing offset, wherein the one or more NTN configuration parameters indicate the cell-specific timing offset.

One or more of the above-example methods, wherein there is at least one SRS transmission of the one or more SRS transmissions between the most SRS recent SRS transmission of the at least one SRS transmission and the PDCCH monitoring occasion.

One or more of the above-example methods, wherein there is no SRS transmission between the most SRS recent SRS transmission of the at least one SRS transmission and the PDCCH monitoring occasion.

One or more of the above-example methods, wherein the transmitting the PUSCH is based on an uplink spatial domain transmission filter corresponding to the most SRS transmission, for example, the most recent SRS transmission.

One or more of the above-example methods, wherein the transmitting the PUSCH is with/using the spatial domain transmission filter/beam determined based on a spatial relation, of the first SRS resource, used for the most recent SRS transmission.

One or more of the above-example methods, wherein the one or more configuration parameters indicate, for the first SRS resource, the spatial relation.

One or more of the above-example methods, further comprising receiving a MAC-CE indicating, for the first SRS resource, the spatial relation.

One or more of the above-example methods, further comprising transmitting, via the first SRS resource, the most recent SRS transmission with/using the spatial domain transmission filter/beam.

One or more of the above-example methods, wherein the PUSCH transmission is a codebook-based PUSCH transmission or a non-codebook-based PUSCH transmission.

One or more of the above-example methods, wherein the determining the most recent SRS transmission is further based on an antenna polarization mode.

One or more of the above-example methods, wherein the antenna polarization mode is an antenna polarization mode of the wireless device.

The method of claim 11, wherein the antenna polarization mode is an antenna polarization mode of an NTN node, wherein the wireless device is communicating with a base station via the NTN node.

One or more of the above-example methods, wherein antenna polarization mode is indicated by the DCI.

One or more of the above-example methods, wherein the antenna polarization mode is used for the most recent transmission of the SRS transmission.

One or more of the above-example methods, wherein the antenna polarization mode is used for the transmission of the PUSCH.

One or more of the above-example methods, wherein the first SRS resource of the at least one SRS resource corresponds to the antenna polarization mode.

One or more of the above-example methods, wherein the one or more NTN configuration parameters indicate the antenna polarization mode.

One or more of the above-example methods, wherein the first SRS resource is a periodic SRS resource.

One or more of the above-example methods, wherein first SRS resource is a semi-persistent SRS resource.

One or more of the above-example methods, wherein first SRS resource is an aperiodic SRS resource.

An example method comprising: receiving, by a wireless device from a base station, one or more configuration parameters indicating: at least one sounding reference signal (SRS) resource; one or more NTN configuration parameters indicating an offset; transmitting one or more SRS transmissions via a first SRS resource of the at least one SRS resource; receiving, in a physical downlink control channel (PDCCH) monitoring occasion, a downlink control information (DCI) scheduling a physical uplink shared channel (PUSCH) transmission, wherein the DCI comprises an SRS resource indicator (SRI) field indicating the first SRS resource; and determining a most recent SRS transmission, of the one or more SRS transmissions, that occurs before the PDCCH monitoring occasion by an amount of time determined based on the offset; and transmitting the PUSCH transmission based on the most recent SRS transmission.

An example method comprising: receiving, by a wireless device from a base station, one or more configuration parameters indicating: at least one sounding reference signal (SRS) resource; one or more NTN configuration parameters indicating one or more offsets; transmitting one or more SRS transmissions via a first SRS resource of the at least one SRS resource; receiving, in a physical downlink control channel (PDCCH) monitoring occasion, a downlink control information (DCI) scheduling a physical uplink shared channel (PUSCH) transmission, wherein the DCI comprises an SRS resource indicator (SRI) field indicating the first SRS resource; and determining: an offset among the one or more offsets; and a most recent SRS transmission, of the one or more SRS transmissions, that occurs before the PDCCH monitoring occasion by an amount of time determined based on the offset; and transmitting the PUSCH transmission based on the most recent SRS transmission.

An example method comprising: receiving, by a wireless device from a base station, one or more configuration parameters indicating: at least one sounding reference signal (SRS) resource; one or more NTN configuration parameters of one or more cells for determining one or more offsets, wherein an offset of the one or more offset is determined based on a round-trip transmission delay (RTT) between corresponding to a cell of the one or more cells; transmitting one or more SRS transmissions via a first SRS resource of the at least one SRS resource; receiving, in a physical downlink control channel (PDCCH) monitoring occasion, a downlink control information (DCI) scheduling a physical uplink shared channel (PUSCH) transmission, wherein the DCI comprises an SRS resource indicator (SRI) field indicating the first SRS resource; and in response to receiving the PDCCH, determining: an offset from the one or more offsets; and a most recent SRS transmission, of the at least one SRS transmission, that occurs prior to the offset from the PDCCH monitoring occasion; and transmitting the PUSCH transmission based on the most recent SRS transmission An example method comprising: receiving, by a first wireless device from a first base station in a terrestrial network, one or more configuration parameters indicating at least one first sounding reference signal (SRS) resource; transmitting one or more first SRS transmissions via a second SRS resource of the at least one first SRS resource; receiving, in a first PDCCH monitoring occasion, a first DCI scheduling a first PUSCH transmission, wherein the first DCI comprises a first SRI field indicating the first SRS resource; determining a most recent SRS transmission, of the one or more first SRS transmissions, that occurs before the first PDCCH monitoring occasion; and transmitting the first PUSCH transmission based on the most recent SRS transmission.

An example method comprising: transmitting, by a base station to a wireless device, one or more configuration parameters indicating: at least one sounding reference signal (SRS) resource; one or more NTN configuration parameters for determining an offset based on a round-trip transmission delay (RTT) between the wireless device and the base station; receiving one or more SRS transmissions, from the wireless device, via a first SRS resource of the at least one SRS resource; transmitting, in a physical downlink control channel (PDCCH) monitoring occasion, a downlink control information (DCI) scheduling a physical uplink shared channel (PUSCH) transmission, wherein the DCI comprises an SRS resource indicator (SRI) field indicating the first SRS resource; determining a most recent SRS transmission, of the one or more SRS transmissions, that occurs before the PDCCH monitoring occasion; and receiving the PUSCH transmission based on the most recent SRS transmission.

The invention claimed is:

1. A method comprising:
receiving, by a wireless device, a system information block (SIB) message comprising:
one or more first non-terrestrial network (NTN) configuration parameters corresponding to a first NTN node of a cell;

one or more second NTN configuration parameters corresponding to a second NTN node of the cell; and
a plurality of NTN configurations parameters of NTN neighbor cells;
receiving a radio resource control (RRC) message comprising a sounding reference signal (SRS) configuration of the cell;
transmitting, via the first NTN node and based on the SRS configuration of the cell, a first SRS transmission using a first timing advance (TA) value of the wireless device, wherein the first TA value is determined based on the one or more first NTN configuration parameters; and
transmitting, via the second NTN node and based on the SRS configuration of the cell, a second SRS transmission using a second TA value of the wireless device, wherein the second TA value is determined based on the one or more second NTN configuration parameters.

2. The method of claim 1, wherein:
the transmitting the first SRS transmission is further based on a first antenna polarization mode, wherein the one or more first NTN configuration parameters indicate the first antenna polarization mode; and
the transmitting the second SRS transmission is further based on a second antenna polarization mode, wherein the one or more second NTN configuration parameters indicate the second antenna polarization mode.

3. The method of claim 1, wherein:
the transmitting the first SRS transmission is based on a first validity timer, corresponding to the first NTN node of the cell, being running, wherein the one or more first NTN configuration parameters indicate the first validity timer; and
the transmitting the second SRS transmission is based on a second validity timer, corresponding to the second NTN node of the cell, being running, wherein the one or more second NTN configuration parameters indicate the second validity timer.

4. The method of claim 1, wherein the RRC message indicates a spatial relation of at least one SRS resource indicated by the SRS configuration, wherein:
the transmitting the first SRS transmission is further based on the spatial relation; and
the transmitting the second SRS transmission is further based on the spatial relation.

5. The method of claim 1, wherein the SRS configuration indicates at least one periodic SRS resource, wherein the transmitting the first SRS transmission and the second SRS transmission are via the at least one periodic SRS resource.

6. The method of claim 1, wherein the at least one SRS configuration indicates at least one semi-persistent SRS resource, wherein the transmitting the first SRS transmission and the second SRS transmission are via the at least one semi-persistent SRS resource.

7. The method of claim 1, further comprising receiving a third message, via the cell, activating a semi-persistent SRS resource indicated by the SRS configuration, wherein the transmitting the first SRS transmission and the second SRS transmission is in response to the receiving the third message.

8. The method of claim 1, further comprising receiving a first downlink control information (DCI) indicating the first SRS transmission, wherein the transmitting the first SRS transmission:
is in response to the receiving the first DCI; and
is further based on a first cell-specific offset, wherein the one or more first NTN configuration parameters indicate the first cell-specific offset.

9. The method of claim 8, further comprising receiving a second DCI indicating the second SRS transmission, wherein the transmitting the second SRS transmission:

is in response to the receiving the second DCI; and is further based on a second cell-specific offset, wherein the one or more second NTN configuration parameters indicate the second cell-specific offset.

10. The method of claim 1, wherein the RRC message is a SIB1 message.

11. A wireless device comprising:

one or more processors; and memory storing instructions that, when executed by the one or more processors, cause the wireless device at least to perform:

receiving a system information block (SIB) message comprising:

one or more first non-terrestrial network (NTN) configuration parameters corresponding to a first NTN node of a cell;

one or more second NTN configuration parameters corresponding to a second NTN node of the cell; and a plurality of NTN configurations parameters of NTN neighbor cells;

receiving a radio resource control (RRC) message comprising a sounding reference signal (SRS) configuration of the cell;

transmitting, via the first NTN node and based on the SRS configuration of the cell, a first SRS transmission using a first timing advance (TA) value of the wireless device, wherein the first TA value is determined based on the one or more first NTN configuration parameters; and transmitting, via the second NTN node and based on the SRS configuration of the cell, a second SRS transmission using a second TA value of the wireless device, wherein the second TA value is determined based on the one or more second NTN configuration parameters.

12. The wireless device of claim 11, wherein the RRC message is a SIB1 message.

13. The wireless device of claim 11, wherein at least one SRS resource indicated by the SRS configuration comprises at least one SRS resource for positioning.

14. The wireless device of claim 11, wherein:

the one or more first NTN configuration parameters comprise a first ephemeris information of the first NTN node; and the one or more second NTN configuration parameters comprise a second ephemeris information of the second NTN node.

15. The wireless device of claim 11, wherein:

the one or more first NTN configuration parameters comprise one or more first common TA parameters; and the one or more second NTN configuration parameters comprise one or more second common TA parameters.

16. The wireless device of claim 11, wherein the first SIB message is a SIB 19 message.

17. The wireless device of claim 11, wherein the RRC message is a dedicated RRC message, wherein the dedicated RRC message is at least one of:

an RRC configuration message;

an RRC reconfiguration message;

an RRC setup message; or an RRC release message.

18. A non-transitory computer-readable medium comprising instructions that, when executed by one or more processors of a wireless device, cause the wireless device to perform:

receiving a system information block (SIB) message comprising:

one or more first non-terrestrial network (NTN) configuration parameters corresponding to a first NTN node of a cell;

one or more second NTN configuration parameters corresponding to a second NTN node of the cell; and a plurality of NTN configurations parameters of NTN neighbor cells;

receiving a radio resource control (RRC) message comprising a sounding reference signal (SRS) configuration of the cell;

transmitting, via the first NTN node and based on the SRS configuration of the cell, a first SRS transmission using a first timing advance (TA) value of the wireless device, wherein the first TA value is determined based on the one or more first NTN configuration parameters; and transmitting, via the second NTN node and based on the SRS configuration of the cell, a second SRS transmission using a second TA value of the wireless device, wherein the second TA value is determined based on the one or more second NTN configuration parameters.

19. The non-transitory computer-readable medium of claim 18, wherein the transmitting the first SRS transmission is further based on a first antenna polarization mode, wherein the one or more first NTN configuration parameters indicate the first antenna polarization mode; and the transmitting the second SRS transmission is further based on a second antenna polarization mode, wherein the one or more second NTN configuration parameters indicate the second antenna polarization mode.

20. The non-transitory computer-readable medium of claim 18, wherein:

the transmitting the first SRS transmission is based on a first validity timer, corresponding to the first NTN node of the cell, being running, wherein the one or more first NTN configuration parameters indicate the first validity timer; and the transmitting the second SRS transmission is based on a second validity timer, corresponding to the second NTN node of the cell, being running, wherein the one or more second NTN configuration parameters indicate the second validity timer.

* * * * *